(12) United States Patent
Yokoi

(10) Patent No.: US 7,320,066 B2
(45) Date of Patent: Jan. 15, 2008

(54) BRANCH PREDICTING APPARATUS AND BRANCH PREDICTING METHOD

(75) Inventor: Megumi Yokoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 11/065,712

(22) Filed: Feb. 25, 2005

(65) Prior Publication Data

US 2006/0149948 A1 Jul. 6, 2006

(30) Foreign Application Priority Data

Nov. 30, 2004 (JP) .............................. 2004-347194

(51) Int. Cl.
*G06F 9/38* (2006.01)
(52) U.S. Cl. ...................... 712/239; 712/238; 712/240
(58) Field of Classification Search ................ 712/240, 712/238, 239
See application file for complete search history.

(56) References Cited

U.S. PATENT DOCUMENTS

| | | |
|---|---|---|
| 4,459,659 A | 7/1984 | Kim |
| 5,193,205 A | 3/1993 | Matsuo et al. |
| 5,355,459 A | 10/1994 | Matsuo et al. |
| 5,526,498 A | 6/1996 | Matsuo et al. |
| 5,604,877 A | 2/1997 | Hoyt et al. |
| 5,701,449 A | 12/1997 | Matsuo et al. |
| 5,964,868 A | 10/1999 | Gochman et al. |
| 5,978,904 A | 11/1999 | Matsuo et al. |
| 6,151,673 A | 11/2000 | Matsuo et al. |
| 6,408,385 B1 | 6/2002 | Matsuo et al. |
| 2002/0188833 A1 | 12/2002 | Henry et al. |
| 2004/0003218 A1 | 1/2004 | Ukai |

FOREIGN PATENT DOCUMENTS

| | | |
|---|---|---|
| JP | 57-143642 | 9/1982 |
| JP | 1-258032 | 10/1989 |
| JP | 2004-38323 | 2/2004 |

OTHER PUBLICATIONS

EP Search Report for corresponding application EP 05251154.0-2211 dated Jul. 1, 2005.
U.S. Appl. No. 10/995,158, filed Nov. 24, 2004, Megumi Yokoi, et al.

*Primary Examiner*—William M. Treat
(74) *Attorney, Agent, or Firm*—Staas & Halsey LLP

(57) ABSTRACT

A branch history stores execution history information of branch instructions, and predicts presence of a branch instruction and a corresponding branch destination. A first return address stack stores, when an execution of a call instruction of a subroutine is completed, address information of a return destination of a corresponding return instruction. A second return address stack stores, when presence of a call instruction of a subroutine is predicted, address information of a return destination of a corresponding return instruction. An output selecting unit selects, when presence of a return instruction is predicted, if address information is stored in the second return address stack, the address information as a result of the branch prediction with a highest priority, and outputs the address information selected.

19 Claims, 47 Drawing Sheets

FIG.2E
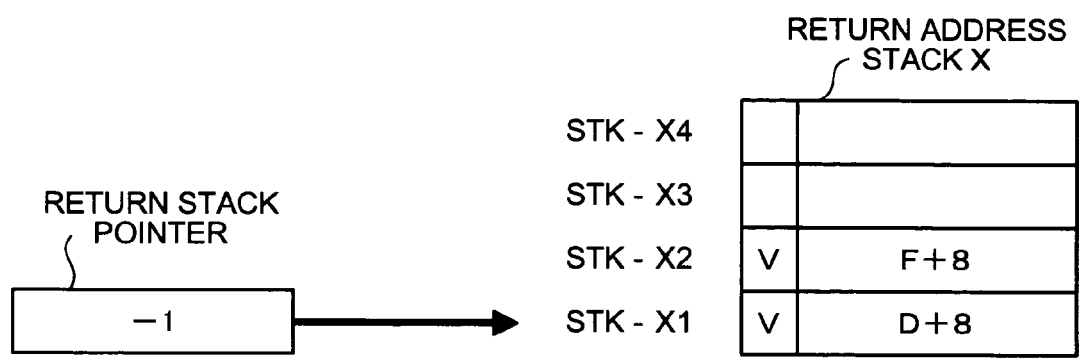
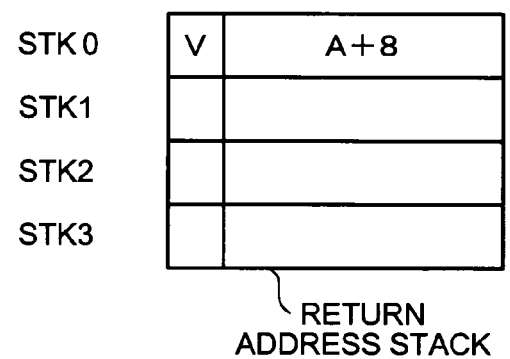

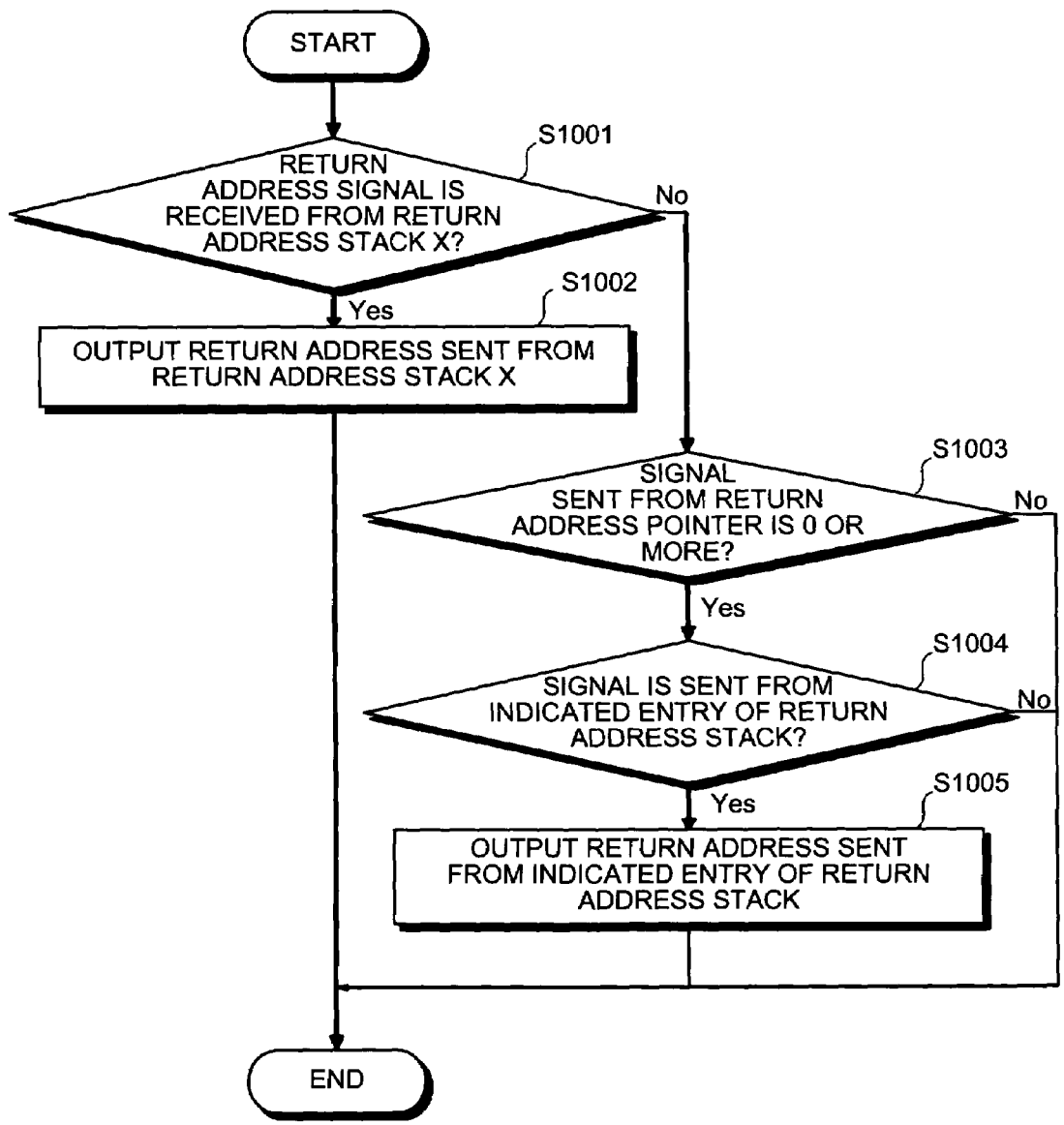

BRANCH PREDICTING APPARATUS AND BRANCH PREDICTING METHOD

BACKGROUND OF THE INVENTION

1) Field of the Invention

The present invention relates to a branch predicting apparatus and a branch predicting method that perform branch prediction in a processor of a pipeline system. In particular, the present invention relates to a branch predicting apparatus and a branch predicting method that can keep accuracy of a branch prediction high when plural call instructions are detected by a branch history prior to completion of execution of a call instruction.

2) Description of the Related Art

Conventionally, a method of branch prediction is widely used for speed-up of processing in a processor of a pipeline system. When a branch is present in a program, it is essentially necessary to stop a pipeline until the branch is defined. However, a processor for performing branch prediction predicts a branch and executes an instruction after the predicted branch speculatively.

The branch prediction has a significant advantage that, when a prediction comes true, it is possible to reduce processing time equivalent to time for waiting for a branch to be defined. However, when the prediction does not come true, since it is necessary to flush a pipeline and re-execute processing from a part where a branch instruction is given, the branch prediction also has a significant penalty. Therefore, accuracy of prediction is very important in the branch prediction.

In general, a branch history is used in the branch prediction. The branch history is a device that holds an address of a branch instruction executed in the past and an address of a branch destination branched by the branch instruction as a pair. Since the branch prediction using the branch history is based on a history in the past, the branch prediction is very effective when the same branch is repeated as in loop processing. However, the branch prediction is less effective for a branch according to a return instruction from a subroutine.

When a branch occurs according to the return instruction from the subroutine, a branch destination is an instruction next to a call instruction of the subroutine. However, in general, since the subroutine is called from various sections of a program, a return destination of the return instruction is not fixed. Therefore, even if the branch destination is predicted according to a history in the past, the prediction is not always correct.

Thus, in a method widely adopted, an address of a return destination according to a return instruction is stored in a return address stack when a call instruction of a subroutine is executed and, concerning the return instruction, branch prediction is performed for the return address stack preferentially over a branch history, whereby accuracy of a prediction is improved.

After the execution of the call instruction is completed, the return address stack stores an address of a return destination of a return instruction corresponding to the call instruction. Therefore, when the return instruction is detected by the branch history because of read-ahead or the like of an instruction stream before the execution of the call instruction is completed, there is a problem in that the address of the return destination is not stored in the return address stack and accuracy of branch prediction falls.

Thus, in Japanese Patent Application No. 2004-222399, the inventor proposes a technique for realizing highly accurate branch prediction even in the case described above by providing a second return address stack and storing an address of a return destination of a return instruction in a second return address stack at a stage when a call instruction is detected by a branch history.

However, the technique proposed in the above literature has a problem in that it is not taken into account that, after a call instruction is detected by the branch history, another call instruction is detected by the branch history until the execution of the call instruction is completed. Only one entry for storing an address of a return destination of a return instruction is provided in the second return address stack. Thus, when there are plural call instructions that have been detected by the branch history but execution of which has not been completed, addresses other than an address of a return destination of a return instruction corresponding to a call instruction detected last are discarded and accuracy of prediction of a branch destination falls.

SUMMARY OF THE INVENTION

It is an object of the present invention to solve at least the above problems in the conventional technology.

A branch predicting apparatus according to one aspect of the present invention, which performs a branch prediction in a pipeline processor, includes a branch history that stores execution history information of branch instructions including a call instruction and a return instruction, and searches through the execution history information to predict presence of a branch instruction and a branch destination corresponding to the branch instruction; a first return address stack that stores, when an execution of a call instruction of a subroutine is completed, address information of a return destination of a return instruction corresponding to the call instruction; a second return address stack that stores, when presence of a call instruction of a subroutine is predicted by the branch history, address information of a return destination of a return instruction corresponding to the call instruction; and an output selecting unit that selects, when presence of a return instruction is predicted by the branch history, if address information is stored in the second return address stack, the address information stored in the second return address stack as a result of the branch prediction with a highest priority, and outputs the address information selected.

A branch predicting method according to another aspect of the present invention, which is for performing a branch prediction in a pipeline processor, includes predicting presence of a branch instruction and a branch destination corresponding to the branch instruction using a branch history that stores execution history information of branch instructions including a call instruction and a return instruction; a first storing including storing, when presence of a call instruction of a subroutine is predicted at the predicting, address information of a return destination of a return instruction corresponding to the call instruction in a storing unit; a second storing including storing, when an execution of a call instruction of a subroutine is completed, address information of a return destination of a return instruction corresponding to the call instruction in the storing unit; and a output selecting including selecting, when presence of a return instruction is predicted at the predicting, if the address information is stored at the second storing, the address information stored at the first storing as a result of the branch prediction with a highest priority, and outputting the address information selected.

BRIEF DESCRIPTION OF THE DRAWINGS

FIGS. 2A to 2E are explanatory diagrams for explaining an operation of the branch predicting apparatus according to the present embodiment;

FIG. 4 is a flowchart of a processing procedure of a return address selection circuit shown in FIG. 3;

DETAILED DESCRIPTION

Exemplary embodiments according to the present invention will be explained in detail with reference to the accompanying drawings.

Figure 1:
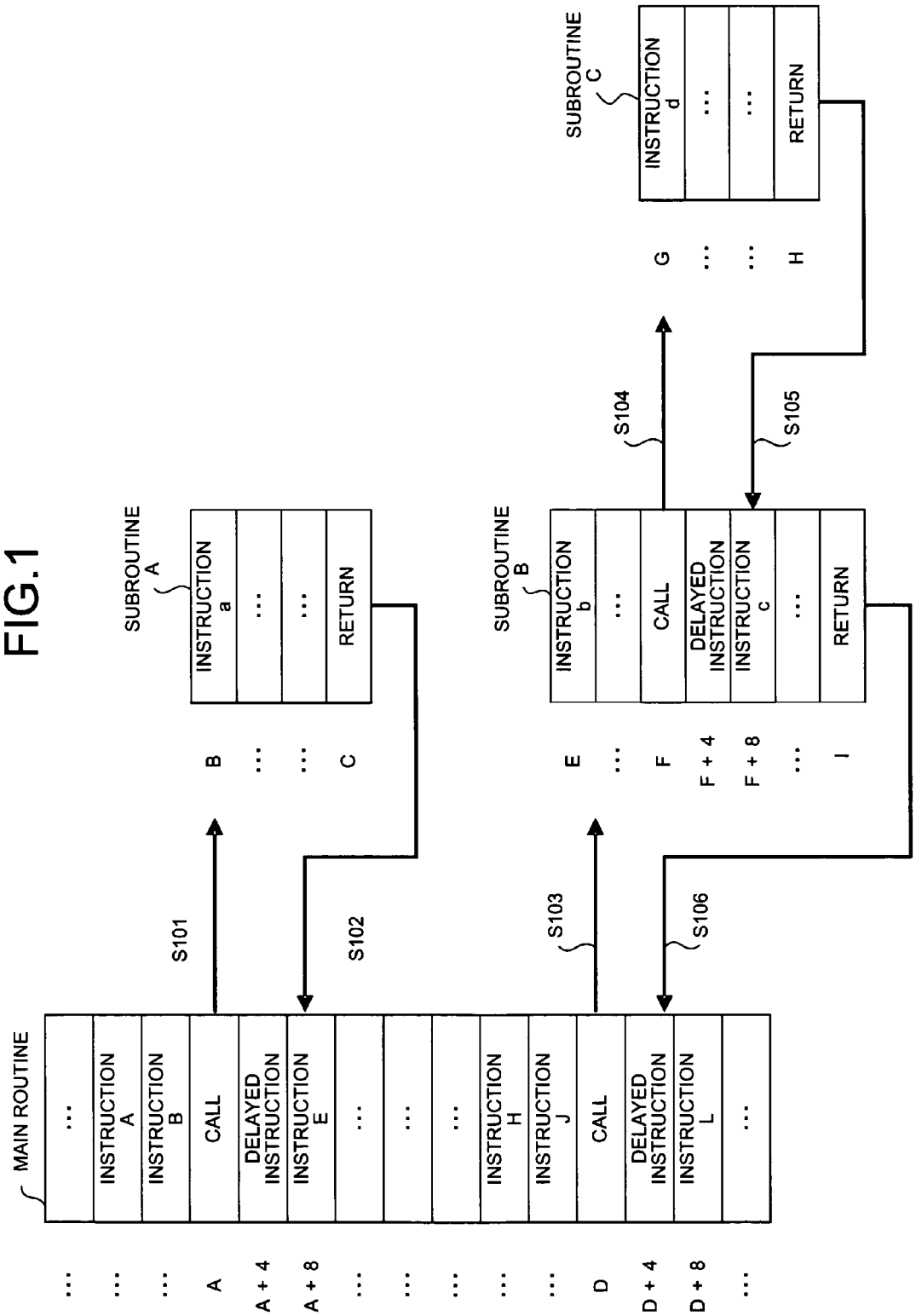
FIG. 1 is a sample diagram of an instruction stream for explaining an operation of a branch predicting apparatus according to an embodiment of the present invention.

FIG. 1 is a sample diagram of an instruction stream for explaining an operation of the branch predicting apparatus according to a embodiment of the present invention. As shown in the figure, a main routine calls a subroutine A according to a call instruction in an address A (step S101). After executing several instructions, the subroutine A returns to the main routine according to a return instruction in an address C (step S102). An address of a destination to which the subroutine A returns according to the return instruction is an 8-byte-address after the address of the call instruction, that is, A+8.

Here, the address of the return destination of the return instruction is the address of the call instruction plus 8 because a processor for executing this instruction stream has a specification in which there is an instruction length of 4 bytes and the call instruction is always accompanied by a delayed instruction. Therefore, depending on a specification of the processor, it is possible that the address of the return destination of the return instruction is the address of the call instruction plus 4 or the address of the call instruction plus 16. However, in the explanation in this specification, it is assumed that the address of the return destination of the return instruction is the address of the call instruction plus 8.

The main routine calls a subroutine B according to a call instruction in an address D (step S103). After executing several instructions, the subroutine B calls a subroutine C according to a call instruction in an address F (step S104). After executing several instructions, the subroutine C returns to the subroutine B according to a return instruction in an address H (step S105). An address of a return destination is F+8. After executing several instructions, the subroutine B returns to the main routine according to a return instruction in an address I (step S106). An address of a return destination is D+8.

Figure 2A:
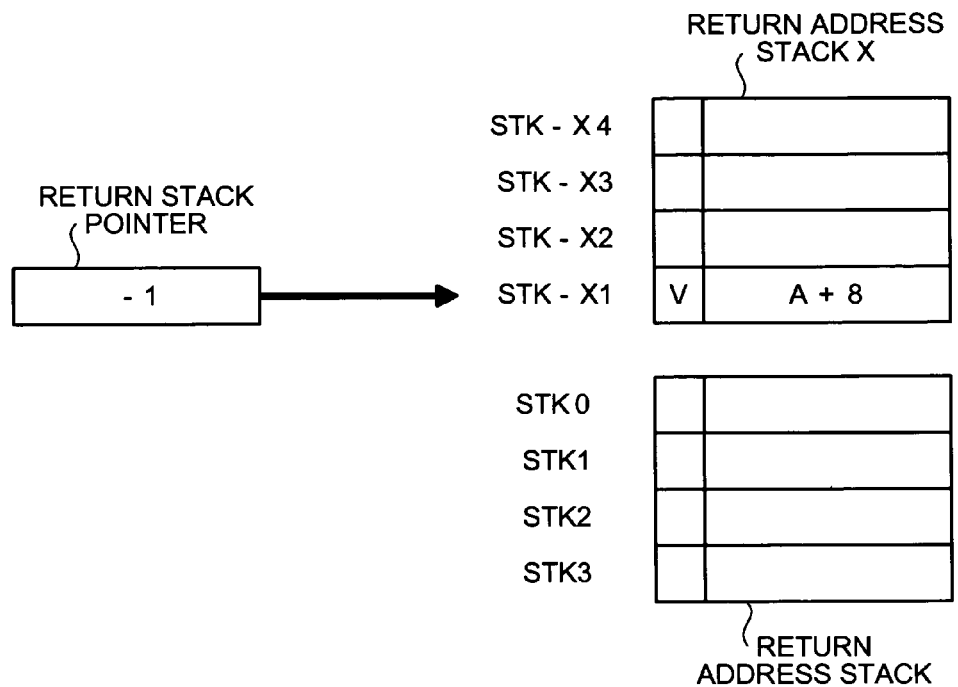

Next, an outline of the branch prediction system according to the present embodiment will be explained with a case in which the instruction stream shown in FIG. 1 is executed as an example. FIGS. 2A to 2E are explanatory diagrams for explaining an operation of the branch predicting apparatus according to the present embodiment. FIG. 2A shows a scene in which a call instruction is detected in an address A by a branch history. Note that it is assumed that the branch predicting apparatus is in an initial state before the call instruction is detected in the address A.

As shown in the figure, a return address stack, a returns address stack X, and a return stack pointer are present in this branch predicting apparatus. The return address stack is a generally-used return address stack and is a device in which, when execution of a call instruction is completed by an execution unit, an address of a return destination of a return instruction corresponding to the call instruction is stored.

The return address stack has plural entries, and an address of a return destination of a return instruction is pushed to a top entry STK0 every time the execution of the call instruction is completed by the execution unit. For example, in a scene in which execution of two call instructions is completed by the execution unit, an address of a return destination of a return instruction corresponding to the call instruction executed second is stored in the top entry STK0, and an address of a return destination of a return instruction corresponding to the call instruction executed first is stored in a second entry STK1. In addition, the return address stack performs a pop operation every time the execution of the return instruction is completed by the execution unit and discards a content of a latest entry.

The return address stack X is a second return address stack that is provided to improve prediction accuracy when, before execution of a call instruction is completed by the execution unit, a return instruction corresponding to the call instruction is detected by the branch history. In addition, the return address stack X is a device in which, when a called instruction is detected by the branch history, an address of a return destination of a return instruction corresponding to the call instruction is stored.

In the patent document 1, the return address stack X has only one entry. However, it is assumed that the return address stack X has plural entries according to the present embodiment. The return address stack X stores an address of a return destination of a return instruction in order from a top entry STK-X1 every time a call instruction is detected by the branch history. For example, in a scene in which two call instructions are detected by the branch history, an address of a return destination of a return instruction corresponding to the call instruction detected first is stored in the top entry STK-X1, and an address of a return destination of a return instruction corresponding to the call instruction detected next is stored in a second entry STK-X2.

The return address stack X performs a shift operation to expel a content of an oldest entry every time the execution of the call instruction is completed by the execution unit. In addition, when any one of the entries is used for branch prediction, the return address stack X sets a valid bit of the entry to OFF to invalidate the entry.

The return stack pointer is a device that decides which of the entries in the two return address stacks is an entry for which a branch prediction result is acquired. The return stack pointer holds a value 0 in an initial state. The value is decremented by one every time a call instruction is detected by the branch history and incremented by one every time a return instruction is detected by the branch history. In addition, the value is incremented by one every time the execution of the call instruction is completed by the execution unit and decremented by one every time the execution of the return instruction is completed by the execution unit.

When a value of the return stack point is 0 or more, this means that an entry, for which a branch prediction result is acquired, is present in the return address stack. When the value is 0, SKT0 at the top of the return address stack is the entry for which a branch prediction result is acquired. The entry, for which a branch prediction result is acquired, moves to the next entry every time the value of the return stack pointer increases by one in a positive direction. For example, when the value of the return stack pointer is 3, STK3 of the return address stack is the entry for which a branch prediction result is acquired.

When a value of the return stack pointer is negative, this means that an entry, for which a branch prediction result is acquired, is present in the return address stack X. In the patent document 1, since it is assumed that there is only one entry in the return address stack X, there is no description about a correspondence between the return address stack X and the entry at the time when a value of the return stack pointer is 0.

According to the present embodiment, when a value of the return stack pointer is −1, STK-Z1 at the top of the return address stack X is an entry for which a branch prediction result is acquired, and the entry, for which a branch prediction result is acquired, moves to the next entry every time the value of the return stack pointer increases by one in a negative direction. For example, when the value of the stack pointer is −3, STK-X3 of the return address stack X is the entry for which a branch prediction result is acquired.

FIG. 2A is a scene in which a call instruction is detected in the address A. Thus, A+8 is stored in STK-X1 at the top of the return address X as an address of a return destination and the value of the return pointer is decremented by one to −1. Here, when it is assumed that a return instruction in the address C is detected by the branch history, the value of the return stack pointer is −1. Thus, the value stored in STK-X1, that is, A+8 is acquired as a branch prediction result. A+8 is a correct address as a branch destination of the return instruction in the address C.

At this stage, since execution of the call instruction has not been completed, an address of a branch destination is not stored in the return address stack. However, the return address stack X is made capable of effectively functioning to perform correct branch prediction.

Figure 2B:
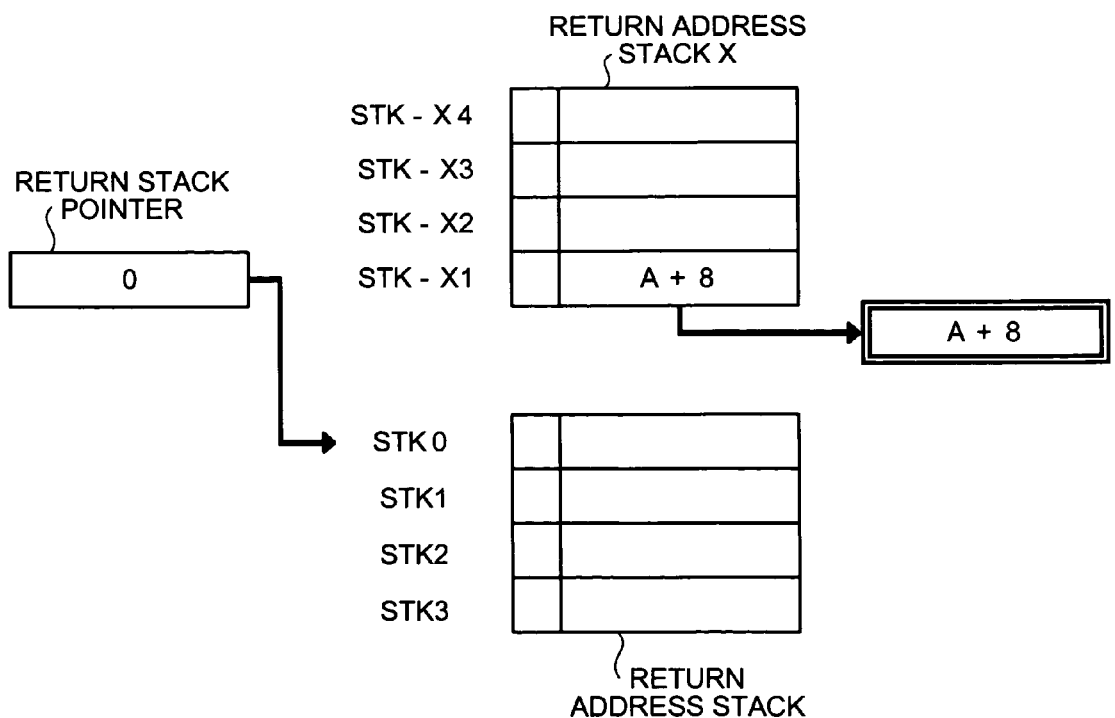
Figure 2C:
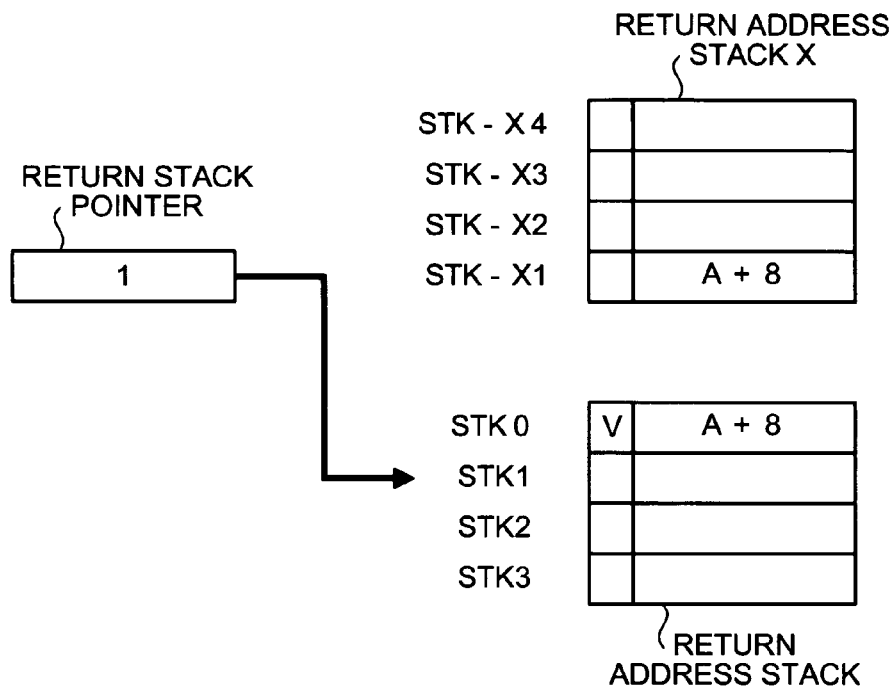

FIG. 2B shows a scene after a return instruction is detected in the address C. Since STK-X1 is used for branch prediction, a valid bit thereof is set to OFF and STK-X1 is invalidated. In addition, the value of the return stack pointer is incremented by one to 0 according to the detection of the return instruction. FIG. 2C shows a scene in which execution of a call instruction in the address A is subsequently completed. In response to the completion of the execution of the call instruction, the address A+8 of the return destination is stored in SKT0 at the top of the return address stack and the value of the return stack pointer is incremented by one to 1.

Figure 2D:
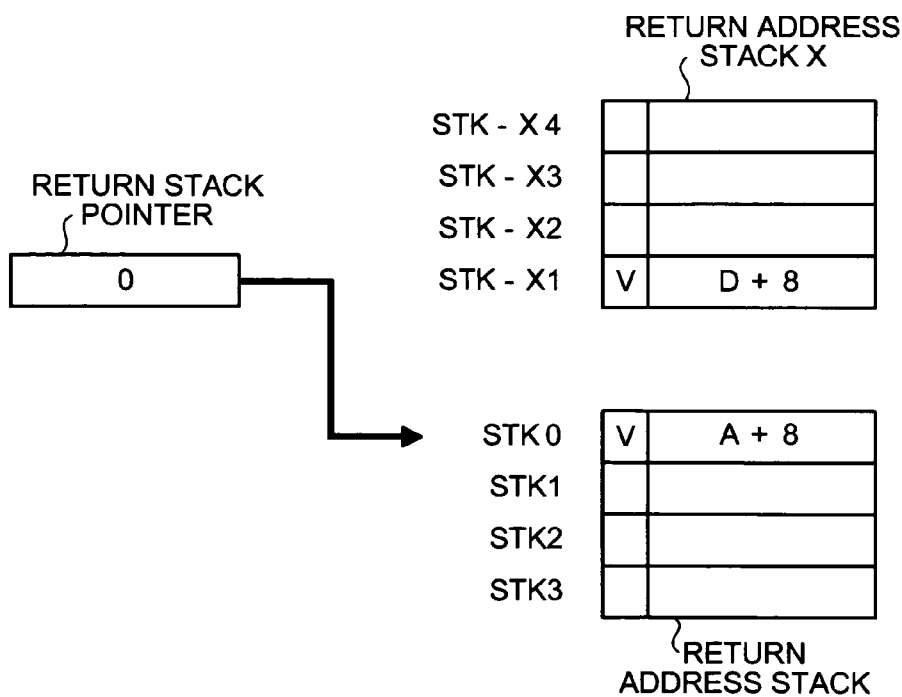

FIG. 2D shows a scene in which a call instruction is subsequently detected in the address D. In response to the detection of the call instruction, an address D+8 of a return destination is stored in STK-X1 at the top of the return address stack X and the value of the return stack pointer is decremented by one to 0. FIG. 2E shows a scene in which a call instruction is subsequently detected in the address F. In response to the detection of the call instruction, an address F+8 of a return destination is stored in STK-X2 of the second entry in the return address stack X and the value of the return stack pointer is decremented by one to −1.

Here, when it is assumed that a return instruction in the address H is detected by the branch history, since the value of the return stack pointer is −1, the value stored in STK-X1, that is, D+8 is acquired as a branch prediction result. Since D+8 is not an address of a branch destination of the return instruction in the address H, wrong branch prediction is performed.

In the scene in FIG. 2E, addresses of two return destinations are stored in the return address stack X. However, it is seen from the order of execution of the instruction stream in FIG. 1 that a call instruction in the address D is always detected earlier than a call instruction in the address F. In other words, in the return address stack X, D+8, which is a return destination of a return instruction corresponding to the call instruction in the address D, is stored first and F+8, which is a return destination of a return instruction corresponding to the call instruction in the address F is stored next.

Similarly, it is seen from the order of execution of the instruction stream in FIG. 1 that a return instruction in the address H is always detected earlier than a return instruction in the address I. In other words, F+8, which is a return destination of the return instruction in the address H, should be used in branch prediction earlier than D+8 that is a return destination of the return instruction in the address I.

Therefore, it is seen that addresses of return addresses stored in the return address stack X only have to be used from one stored last regardless of a value of the return stack pointer. In the scene in FIG. 2E, when it is considered that a return instruction in the address H is detected by the branch history, an address of a return destination stored last is F+8, which is a correct value as an address of a branch destination of the return instruction in the address H.

As an order for detection of a call instruction and completion of the execution of the call instruction, the detection is always performed earlier. In other words, an address of a branch destination of a return instruction is stored in the return address stack X before the address is stored in the return address stack. Since the completion of call instructions is always performed in order, a call instruction, a return destination of which is stored in the return address stack X, is executed after a call instruction, a return destination of which is stored in the return address stack.

Since return instructions should be detected in order from one corresponding to a call instruction executed last, an address of a return destination stored in the return address stack X is required to be used for branch prediction earlier than an address of a return destination stored in the return address stack. Therefore, it is seen that, when a valid entry is present in the return address stack X, it is necessary to acquire an address of a branch destination from the return address stack X regardless of a value of the return stack pointer.

For example, in the scene in FIG. 2D, when a return instruction in the address I is detected, if a branch destination is acquired according to a value of the return stack pointer, a wrong branch destination A+8 is acquired. In this case, since a valid entry is present in the return address stack X, a correct branch destination D+8 is acquired if an address registered last is acquired from the return address stack X.

As described above, in the branch prediction system according to the present embodiment, when a valid entry is present in the return address stack X, an address of a branch destination is acquired from a valid entry, a value of which is stored last in the return address stack X. By adopting this system, it is possible to perform highly accurate branch prediction even when there are plural call instructions that have been detected by the branch history but execution of which has not been completed.

Figure 3:
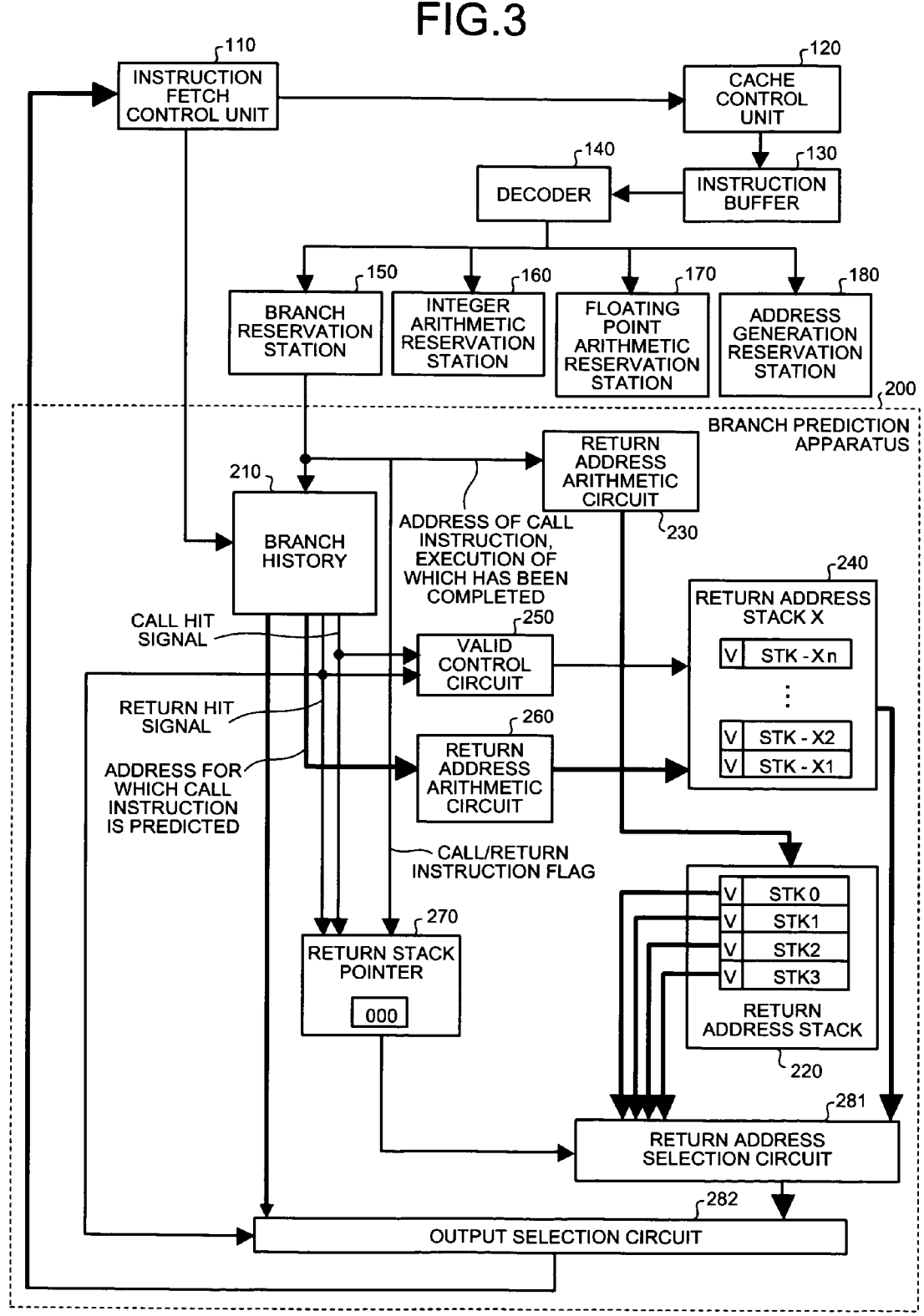
FIG. 3 is a block diagram of a structure of the branch predicting apparatus according to the present embodiment.

FIG. 3 is a block diagram of a structure of the branch predicting apparatus according to the present embodiment. As shown in the figure, a branch predicting apparatus 200 is connected to an instruction fetch control unit 110 and a branch reservation station 150.

The instruction fetch control unit 110 is a unit that controls acquisition of an instruction to be executed in pipeline. A request for acquisition of an instruction by the instruction fetch control unit 110 is sent to a cache control unit 120 for actual acquisition of an instruction and also sent to a branch history 210 in the branch predicting apparatus 200 for branch prediction.

The cache control unit 120 is a unit that acquires the instruction requested by the instruction fetch control unit 110 from a cache or a main storage. The instruction acquired by the cache control unit 120 is temporarily stored in an instruction buffer 130 and, then, decoded by a decoder 140 and sent to a reservation station corresponding to a type of the instruction.

As the reservation station, there are the branch reservation station 150, an integer arithmetic reservation station 160, a floating-point arithmetic reservation station 170, an address generation reservation station 180, and the like. A branch instruction is sent to the branch reservation station 150 and executed therein.

The branch predicting apparatus 200 includes the branch history 210, a return address stack 220, a return address arithmetic circuit 230, a return address stack X 240, a valid control circuit 250, a return address arithmetic circuit 260, a return stack pointer 270, a return address selection circuit 281, and an output selection circuit 282.

The branch history 210 is a device that stores an address of the branch instruction, which is executed in the branch reservation station 150, and a branch destination according to the instruction as a pair together with other information flags. A call instruction and a return instruction are types of the branch instruction, and results of branch of the instructions are stored in the branch history 210.

In addition, when the branch history 210 acquires an address of an instruction stream from the instruction fetch control unit 110, the branch history 210 refers to information in the branch history 210 itself and judges whether branch occurs according to an instruction included in the instruction stream. When it is judged that branch occurs, the branch history 210 sends information like an address of a branch destination to the output selection circuit 282.

The return address stack 220 is a device that stores an address of a return destination of a return instruction corresponding to a call instruction executed in the branch reservation station 150. Respective entries of the return address stack 220 include valid bits indicating validity of the entries. A valid entry in the return address stack 220 sends address information stored in the entry to the return address selection circuit 281. Note that, in the explanation of the present embodiment, it is assumed that the return address stack 220 includes four entries. However, the number of entries does not always have to be four.

The return address arithmetic circuit 230 is a circuit that performs an arithmetic operation for converting an address of a call instruction conveyed from the branch reservation station 150 into an address of a return destination of a return instruction and sends the address to the return address stack 220. As described already, in the processor explained according to the present embodiment, the address of the return destination of the return instruction is obtained by adding 8 to the address of the call instruction. However, in processors of other specifications, a conversion system may be different.

The return address stack X 240 is a device that, when a call instruction is detected by the branch history 210, stores an address of a return destination of a return instruction corresponding to the call instruction. Respective entries of the return address stack X 240 include valid bits indicating validity of the entries. The return address stack X 240 sends information on a valid entry, a value of which is stored last, to the return address selection circuit 281.

The valid control circuit 250 is a circuit that controls states of the valid bits in the entries of the return address stack X 240. The valid control circuit 250 changes the states of the valid bits in the entries of the return address stack X 240 according to a state of a call hit signal or the like from the branch history 210.

The return address arithmetic circuit 260 is a circuit that performs an arithmetic operation for converting an address of a call instruction detected by the branch history 210 into an address of a return destination of a return instruction and sends the address to the return address stack X 240. As in the case of the return address arithmetic circuit 230, in the processor explained according to the present embodiment, the address of the return destination of the return instruction is obtained by adding 8 to the address of the call instruction. However, in processors of other specifications, a conversion system may be different.

The return stack pointer 270 is a device that holds values indicating entries of a return address stack that should be used when a return instruction is detected. More specifically, when values held by the return stack pointer 270 are 000, 001, 010, and 011, this means that entries SKT0, SKT1, STK2, and STK3 of the return address stack 220 should be used for the values, respectively. Note that, when a valid entry is present in the return address stack X 240, branch prediction is performed using information held in the return address stack X 240 regardless of values held in the return stack pointer 270.

The return address selection circuit 281 is a circuit that selects an appropriate address of a branch destination based on information in the return address stack 220, the return address stack X 240, and the return stack pointer 270 and sends the address to the output selection circuit 282.

FIG. 4 is a flowchart of a processing procedure of the return address selection circuit 281 shown in FIG. 3. As shown in the figure, if valid address of a branch destination is sent from the return address stack X 240 (Yes in step S1001), the return address selection circuit 281 sends the address information to the output selection circuit 282 (step S1002). When there is no information from the return address stack X 240 (No in step S1001), if the return stack pointer 270 indicates a valid entry in the return address stack 220 (Yes in step S1003) and if address information is sent from the indicated entry (Yes in step S1004), the return address selection circuit 281 sends address information stored in the entry to the output selection circuit 282 (step S1005). If the return stack pointer 270 does not indicate a valid entry in the return address stack 200 or if address information is not sent from the indicated entry (No in step S1003 or No in step S1004), the return address selection circuit 281 does not send address information to the output selection circuit 282.

The output selection circuit 282 is a circuit that selects appropriate branch information from plural pieces of branch information and sends the branch information to the instruction fetch control unit 110. More specifically, when the branch history 210 has detected a return instruction, if address information is sent from the return address selection circuit 281, the output selection circuit 282 sends the address as an address of a return destination of the return instruction. Otherwise, the output selection circuit 282 sends an address sent by the branch history 210 as an address of a return destination of the return instruction.

Figure 5A:
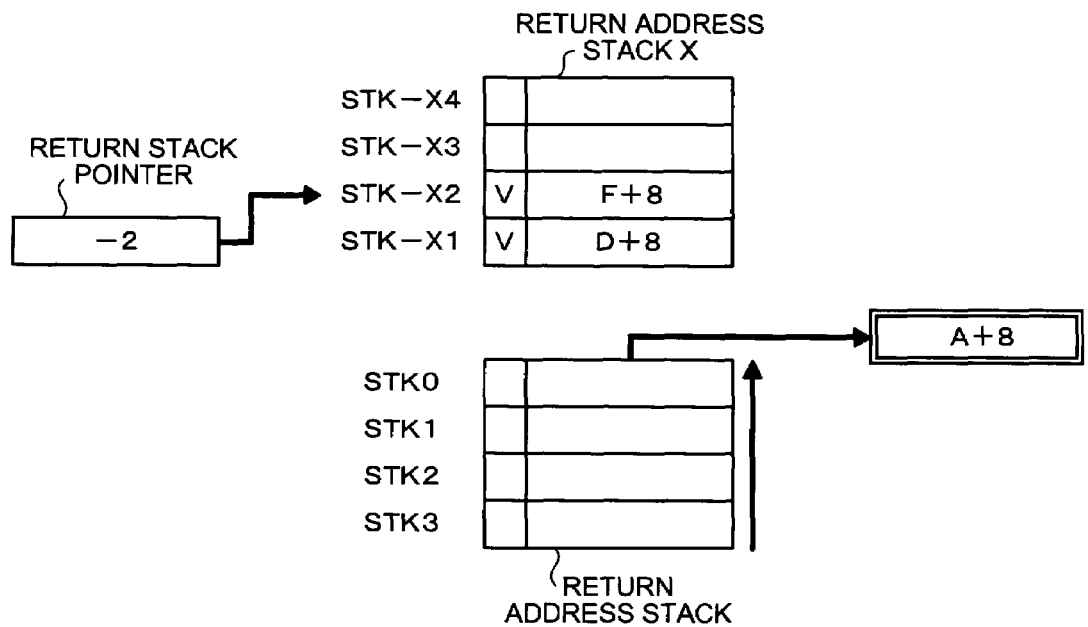
FIGS. 5A to 5C are explanatory diagrams for explaining an operation of the branch predicting apparatus according to the present embodiment.
Figure 5B:
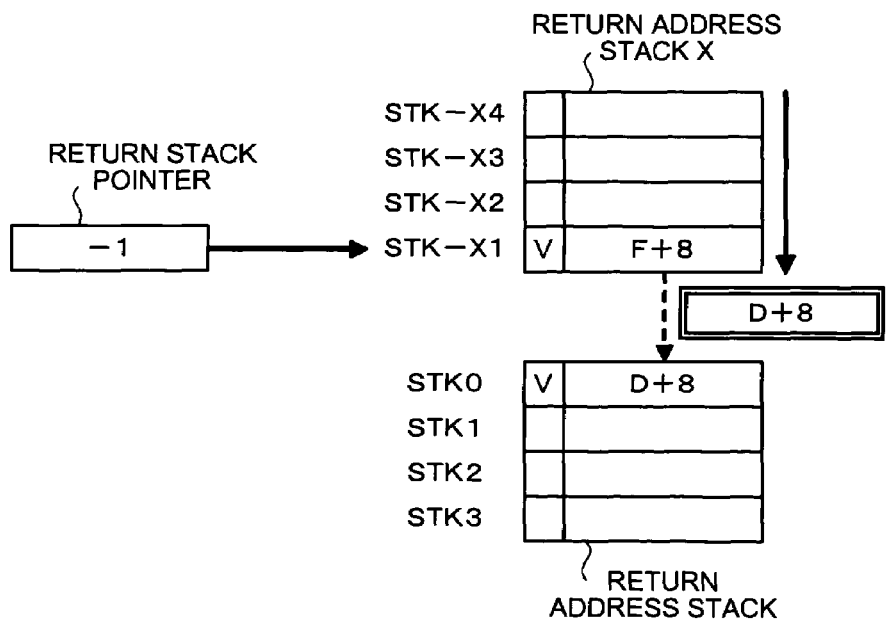
Figure 5C:
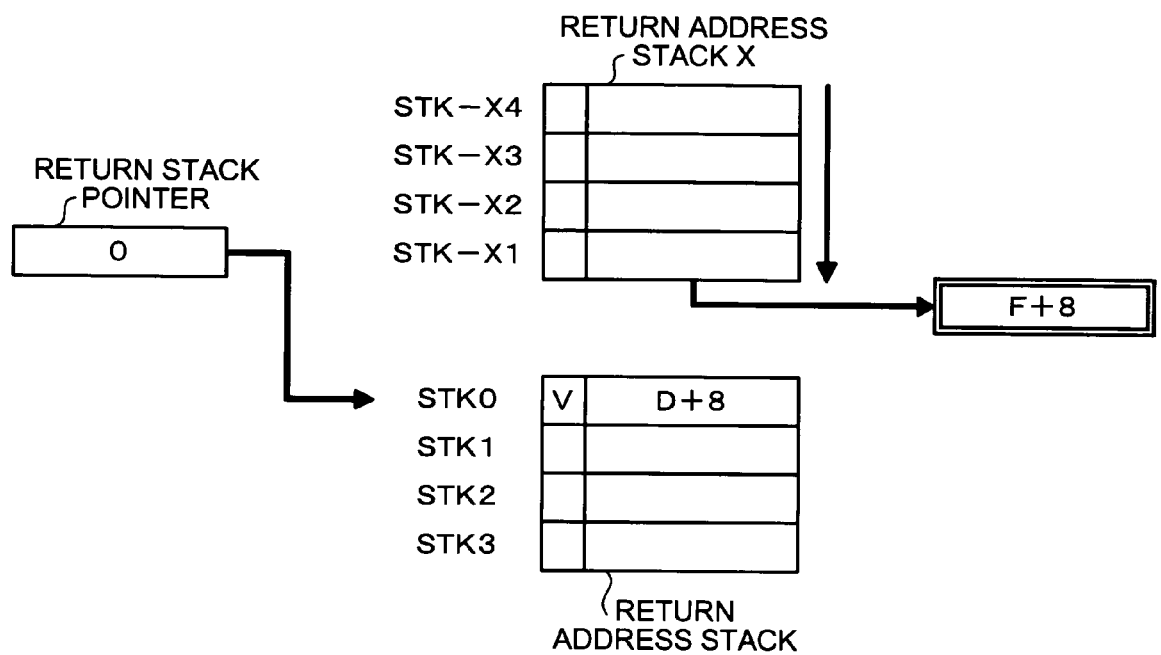

FIGS. 5A to 5C are explanatory diagram for explaining operations of the branch predicting apparatus 200 according to the present embodiment. FIG. 5A shows a scene in which execution of a return instruction in the address C is completed after the scene in FIG. 2E. In response to the completion of the execution of the return instruction, a hop operation is performed in the return address stack to discard a content of SKT0 at the top and the value of the return stack pointer is decremented by one to −2.

FIG. 5B shows a scene in which execution of a call instruction in the address D is subsequently completed. In response to the completion of the execution of the call instruction, the value of the return stack pointer is incremented by one to −1. In addition, in the return address stack X, a shift operation is performed to discard D+8 of STK-X1 at the top. On the other hand, in the return address stack, D+8 that is an address of a return destination of a return instruction corresponding to the call information, execution of which has been completed, is stored in a top entry STK0.

As described above, in the branch predicting apparatus 200 according to the present embodiment, an address of a return destination of a return instruction corresponding to a call instruction detected by the branch history is temporarily stored in the return address stack X and, when the execution of the call instruction is completed by the execution unit, the branch predicting apparatus 200 operates as if the address of the return destination of the return instruction moves from the return address stack X to the return address stack according to a shift operation.

In other words, if detection of a call instruction and a return instruction by the branch history is perfect, the return address stack X and the return address stack function as an integrated stack. Thus, it is possible to always accurately predict a branch destination of the return instruction corresponding to the call instruction detected by the branch history regardless of the extent to which execution of the call instruction and the return instruction has made progress.

FIG. 5C shows a scene in which a return instruction is subsequently detected in the address H. In this case, since a valid entry is present in the return address stack X, F+8, which is address information stored in the return address stack X last, is acquired as a branch prediction result. This is a scene after plural entries are stored in the return address stack X. The branch predicting apparatus 200 according to the present embodiment succeeds in accurately predicting a branch destination of a return instruction.

As described above, according to the first embodiment, when a valid entry is present in the return address stack X, an address of a branch destination is acquired from a valid entry, a value of which is stored in the return address stack X last, regardless of a value of the return stack pointer. Thus, it is possible to perform highly accurate branch prediction even when there are plural call instructions that have been detected by the branch history but execution of which has not been completed.

If the branch prediction system explained according to the first embodiment is used, it is possible to perform highly accurate branch prediction even when there are plural call instructions that have been detected by the branch history but execution of which has not been completed. However, there is a problem in that, to improve accuracy of branch prediction using this branch prediction system, entries in the number sufficient for the return address stack X have to be prepared, leading to an increase in cost.

Thus, according to a second embodiment of the present invention, a branch prediction system, which can perform branch prediction highly accurately when there are plural call instructions that have been detected by the branch history but execution of which has not been completed while holding down the number of entries in the return address stack X, will be explained.

Figure 6:
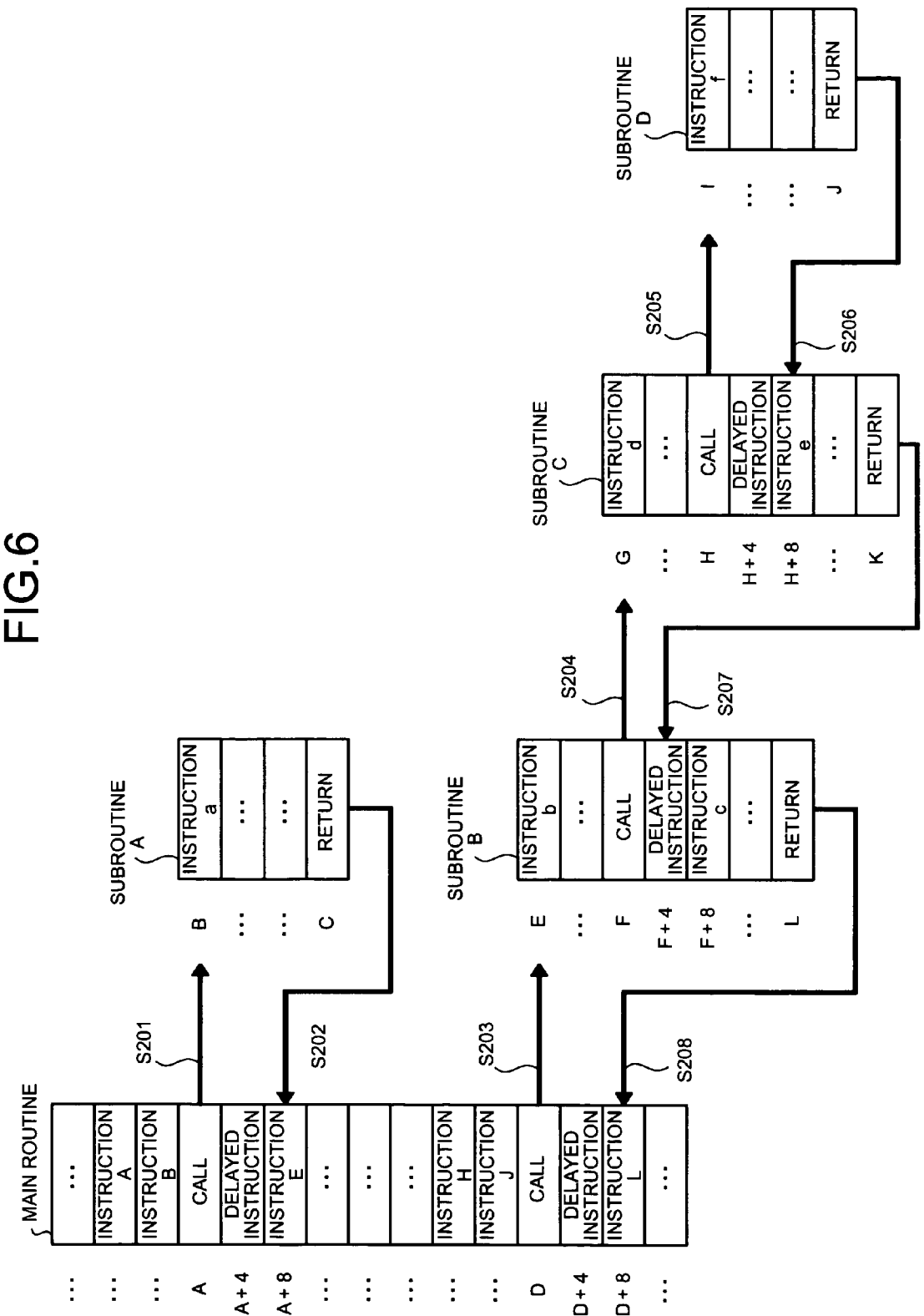
FIG. 6 is a sample diagram of an instruction stream for explaining an operation of a branch predicting apparatus according to an embodiment of the present invention.

FIG. 6 is a sample diagram of an instruction stream for explaining an operation of a branch predicting apparatus according to the second embodiment. As shown in the figure, a main routine calls a subroutine A according to a call instruction in an address A (step S201). After executing several instructions, the subroutine A returns to the main routine according to a return instruction in an address C (step S202). An address of a destination to which the subroutine A returns according to the return instruction is an 8-byte-address after the address of the call instruction, that is, A+8.

The main routine calls a subroutine B according to a call instruction in an address D (step S203). After executing several instructions, the subroutine B calls a subroutine C according to a call instruction in an address F (step S204). Then, after executing several instructions, the subroutine C calls a subroutine D according to a call instruction in an address H (step S205).

After executing several instructions, the subroutine D returns to the subroutine C according to a return instruction in an address J (step S206). An address of a return destination is H+8. After executing several instructions, the subroutine C returns to the subroutine B according to a return instruction in an address K (step S207). An address of a return destination is F+8. After executing several instructions, the subroutine B returns to the main routine according to a return instruction in an address L (step S208). An address of a return destination is D+8.

Next, an operation of a conventional branch predicting apparatus will be explained with a case in which the instruction stream shown in FIG. 6 is executed as an example. Here, so called the conventional branch predicting apparatus is the branch predicting apparatus explained according to the first embodiment. The branch predicting apparatus will be explained assuming that there are two entries in a return address stack.

Figure 7A:
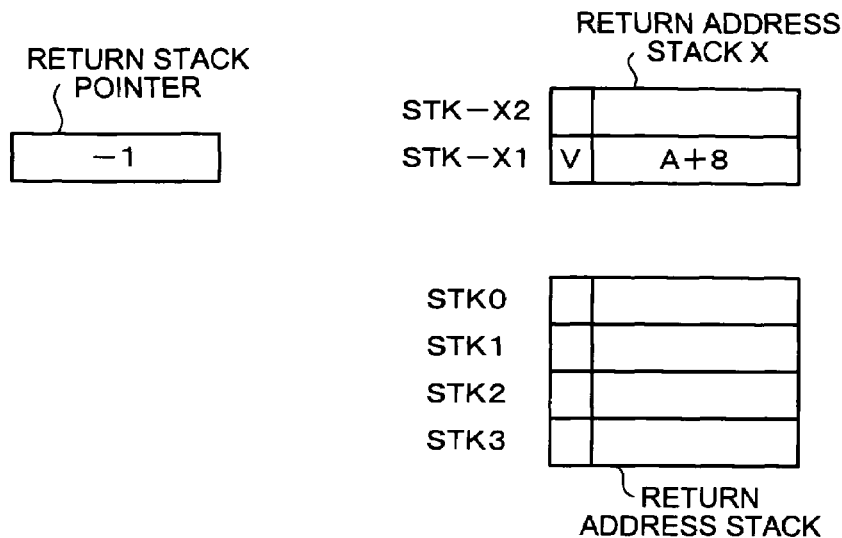
FIGS. 7A to 7H are explanatory diagrams for explaining an operation of a conventional branch predicting apparatus.

FIGS. 7A to 7H are explanatory diagrams for explaining operations of the conventional branch predicting apparatus. FIG. 7A shows a scene in which a call instruction is detected by the branch history in the address A. Note that it is assumed that the branch predicting apparatus is in an initial state before the call instruction is detected in the address A.

As shown in the figure, in this branch predicting apparatus, a return address stack, a return address stack X, and a return stack pointer are present. The return address stack is a generally-used return address stack and is an apparatus in which, when execution of a call instruction is completed by an execution unit, an address of a return destination of a return instruction corresponding to the call instruction is stored.

The return address stack X is a second return address stack that is provided to improve prediction accuracy when, before the execution of the call instruction is completed by the execution unit, a return instruction corresponding to the call instruction is detected by the branch history. In addition, the return address stack X is a device in which, when a called instruction is detected by the branch history, an address of a return destination of a return instruction corresponding to the call instruction is stored.

The return stack pointer is a device that decides which of the entries in the return address stacks is an entry for which a branch prediction result is acquired. When a value of the return stack pointer is 0 or more, this means that an entry, for which a branch prediction result is acquired, is present in the return address stack. However, when a valid entry is present in the return address stack X, an entry indicated by the return stack pointer is not used for branch prediction.

FIG. 7A is a scene in which a call instruction is detected in the address A. A+8 is stored in STK-X1 at the top of the return address stack X as an address of a return destination and a value of the return stack pointer is decremented by one to −1. Here, when it is assume that a return instruction in the address C is detected by the branch history, since a valid entry is present in the return address stack X, the value stored in the latest entry STK-X1, that is, A+8 is acquired as a branch prediction result. A+8 is a correct address as a branch destination of a return instruction in the address C.

Figure 7B:
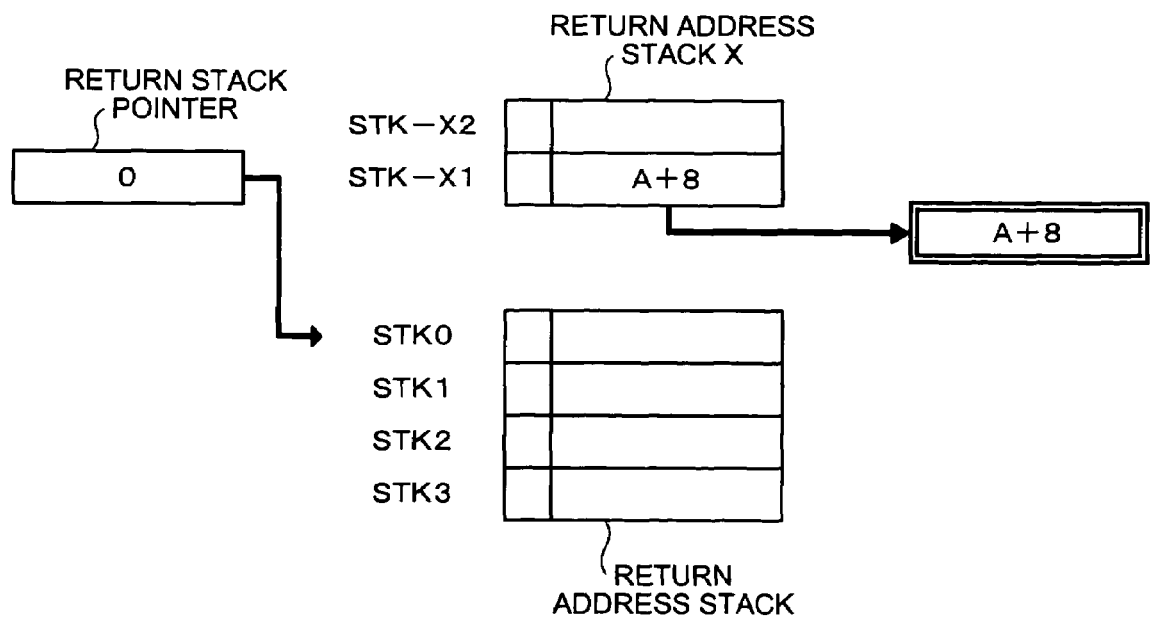
Figure 7C:
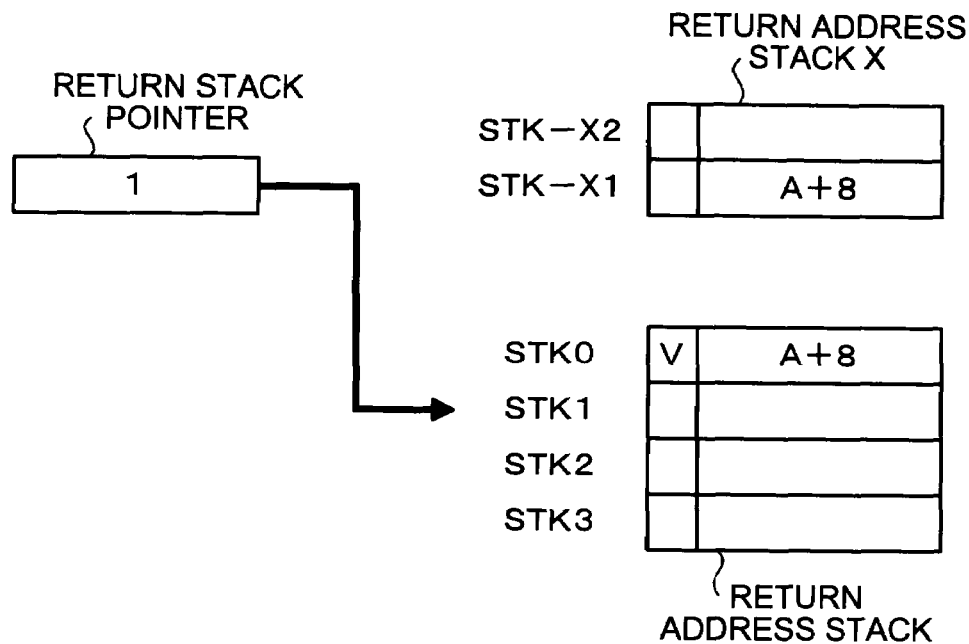

FIG. 7B shows a scene after a return instruction is detected in the address C. Since STK-X1 is used for branch prediction, a valid bit thereof is set to OFF and STK-X1 is invalidated. In addition, the value of the return stack pointer is incremented by one to 0 according to the detection of the return instruction. FIG. 7C shows a scene in which execution of a call instruction in the address A is subsequently completed. In response to the completion of the execution of the call instruction, the address A+8 of the return destination is stored in SKT0 at the top of the return address stack and the value of the return stack pointer is incremented by one to 1.

Figure 7D:
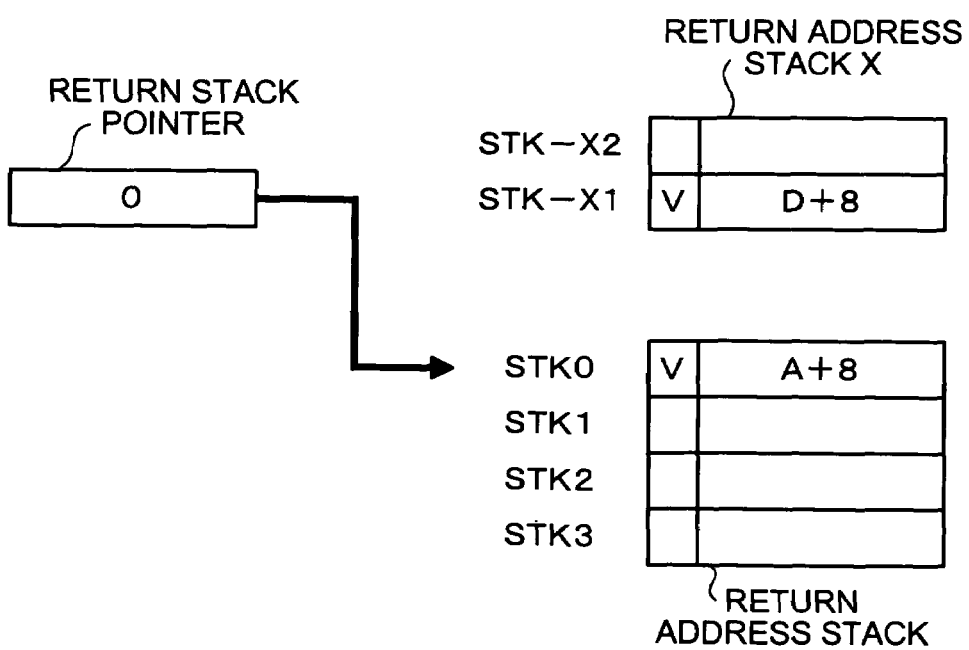
Figure 7E:
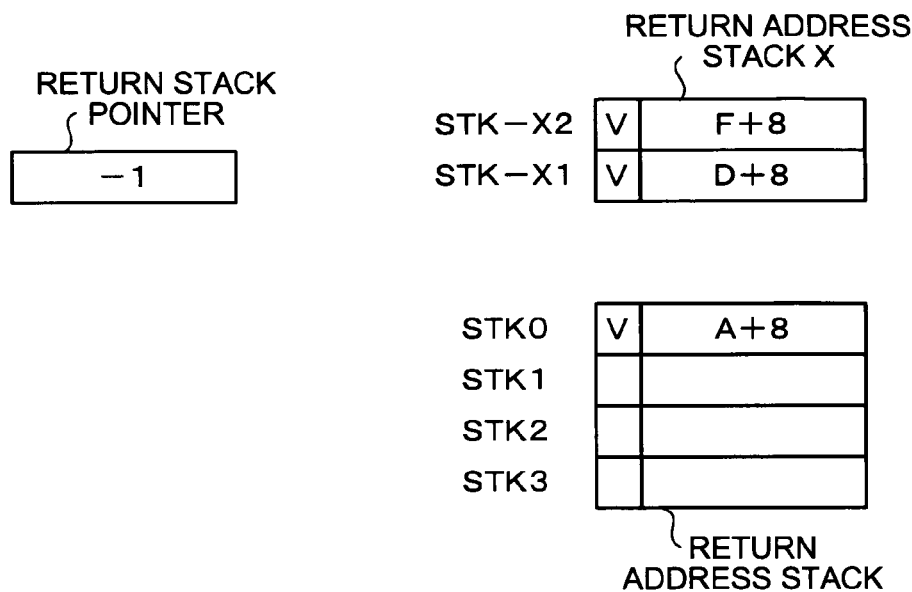

FIG. 7D shows a scene in which a call instruction is subsequently detected in the address D. In response to the detection of the call instruction, an address D+8 of a return destination is stored in STK-X1 at the top of the return address stack X and the value of the return stack pointer is decremented by one to 0. FIG. 7E shows a scene in which a call instruction is subsequently detected in the address F. In response to the detection of the call instruction, an address F+8 of a return destination is stored in STK-X2 of the second entry in the return address stack X and the value of the return stack pointer is decremented by one to −1.

Figure 7F:
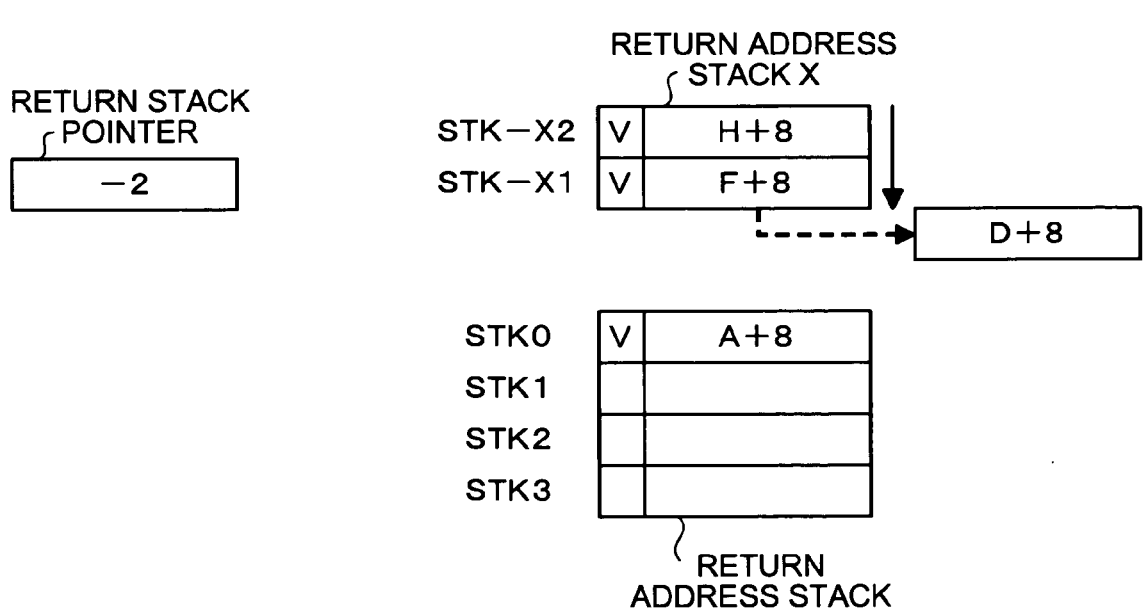

FIG. 7F shows a scene in which a call instruction is subsequently detected in the address H. In response to the detection of the call instruction, H+8, which is an address of a return address, is pushed to the return address stack X. However, since both the two entries are filled, the old information D+8 is pushed out and disappears. In this way, the return address stack X comes into a state in which H+8 is stored in STK-X2 and F+8 is stored in STK-X1. In addition, the value of the return stack pointer is decremented by one to −2.

Figure 7G:
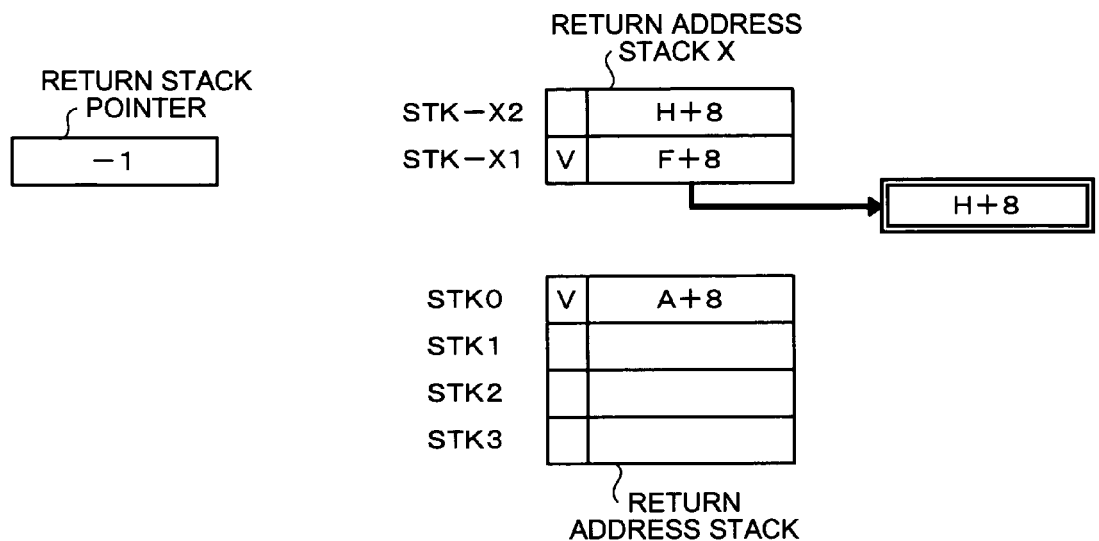

Here, when it is assumed that a return instruction in the address J is detected by the branch history, since a valid entry is present in the return address stack X, the value stored in the latest entry STK-X2, that is, H+8 is acquired as a branch prediction result. H+8 is a correct address as an address of a branch destination of the return instruction in the address J. FIG. 7G shows a scene after the return instruction is detected in the address J. Since STK-X2 is used for branch prediction, a valid bit thereof is set to OFF and STK-X2 is invalidated. In addition, the value of the return stack pointer is incremented by one to −1 according to the detection of the return instruction.

Figure 7H:
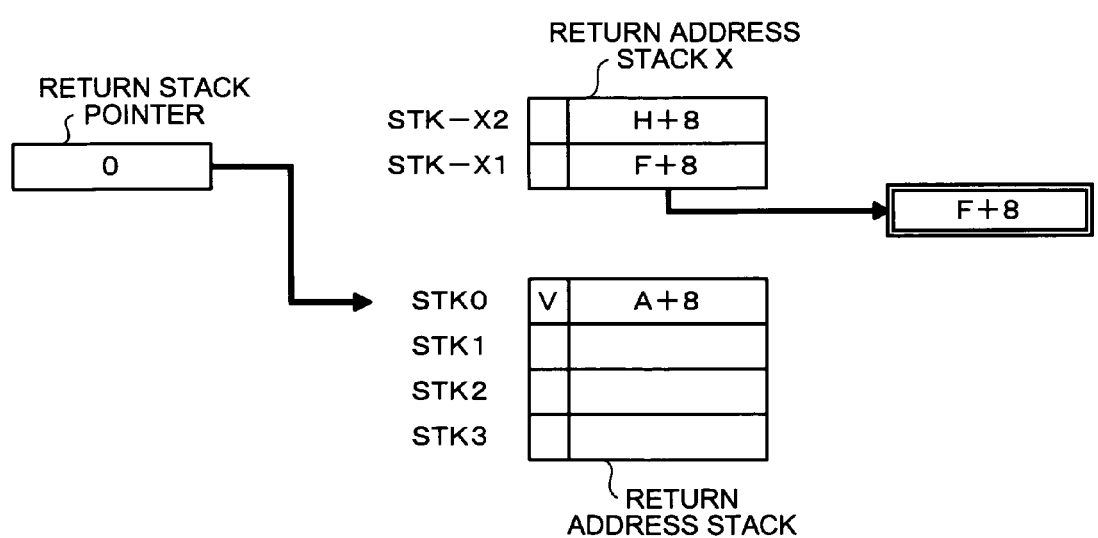

Here, when it is assumed that a return instruction in the address K is detected by the branch history, since a valid entry is present in the return address stack X, a value stored in the latest entry STK-X1, that is, F+8 is acquired as a branch prediction result. F+8 is a correct address as an address of a branch destination of the return instruction in the address K. FIG. 7H shows a scene after the return instruction is detected in the address K. Since STK-X1 is used for branch prediction, a valid bit thereof is set to OFF and STK-X1 is invalidated. In addition, the value of the return stack pointer is incremented by one to 0 according to the detection of the return instruction.

Here, when it is assumed that a return instruction in the address L is detected by the branch history, since a valid entry is not present in the return address stack X and the value of the return stack pointer is 0, the value stored in SKT0 of the return address stack, that is, A+8 is acquired as a branch prediction result. Since A+8 is not an address of a branch destination of the return instruction in the address L, wrong branch prediction is performed.

The wrong branch prediction is performed here because the fact that D+8 was pushed out in the scene in FIG. 7F because the number of entries was insufficient is not taken into account. In the branch predicting apparatus according to the present embodiment, it is imagined that a large number of entries are present in the return address stack X, and a system for managing validity of those imaginary entries with a management table is adopted.

Figure 8:
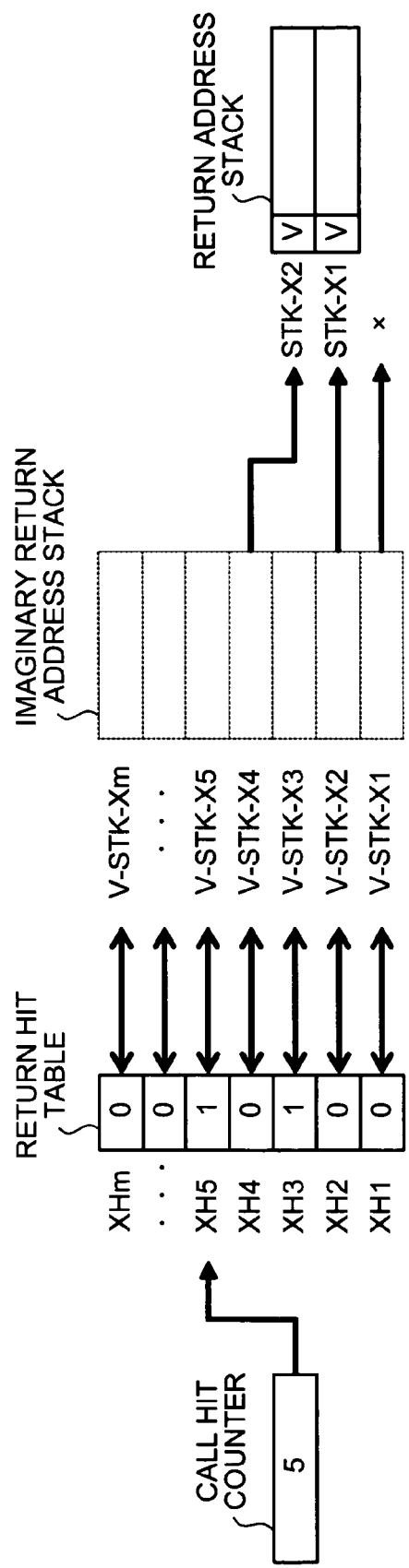
FIG. 8 is an explanatory diagram for explaining an outline of a branch predicting method according to the present embodiment.

FIG. 8 is an explanatory diagram for explaining an outline of the branch prediction system according to the present embodiment. As shown in the figure, a return hit table and a call hit counter are used in the branch prediction system according to the present embodiment.

The return hit table is a table for managing validity of respective entries in the imaginary return address stack X. Each bit in the return hit table corresponds to one entry in the imaginary return address stack X and takes 0 as an initial value. If the bit takes a value 0, this indicates that an imaginary entry corresponding thereto is valid, and if the bit takes a value 1, this indicates that an imaginary entry corresponding thereto is used for branch prediction and invalidated.

In the return hit table, the bits are used in order from a least significant bit XH1 every time a call instruction is detected, and a value of the least significant bit is discarded according to a shift operation every time the execution of the call instruction is completed. This is because, if the execution of the call instruction is completed, since an address of a return destination of a return instruction is stored in the return address stack, the entries in the imaginary return address stack X are made unnecessary.

Since the return hit table only has to have one bit for each entry of an imaginary return address stack X, it is possible to mount the return hit table at extremely low cost. For example, when an address length is assumed to be 64 bits, if eight entries are provided in an actual return address stack X, total 512 (64×8) bits are required. However, the return hit table requires only 8 bits.

The call hit counter takes 0 as an initial value and is incremented by one every time a call instruction is detected and decremented by one every time execution of the call instruction is completed. Therefore, a value of the call hit counter indicates the number of call instructions that have been detected by the branch history but execution of which has not been completed, that is, the number of entries in the imaginary return address stack X in which the value is stored.

FIG. 8 indicates that the value of the call hit counter is 5, there are five call instructions, execution of which has not been completed by the execution unit, and addresses of return destinations of return instructions corresponding to those call instructions are stored in five entries in the imaginary return address stack X.

The return instructions corresponding to some of those call instructions may have already been detected by the branch history. In an example in FIG. 8, third and fifth call instructions are pertinent to such call instructions, and values of bits in the return hit table corresponding to the call instructions are 1. When a return instruction is detected and an entry is made unnecessary, a bit corresponding to the entry is held in the return hit table to hold an order for shift-out at the time when the execution of the call instruction is completed.

It is assumed that the actual return address stack X includes only two entries because of limitation on cost or the like. In this return address stack X, an address of a return destination of a return instruction is pushed when a call instruction is detected, and a content of a latest entry is discarded by a pop operation when a return instruction is detected. When a call instruction is detected in a state in which all the entries are filled, a content of an oldest entry is pushed out and discarded.

In the example in FIG. 8, since three valid entries are present in the imaginary return address stack X but only two entries are present in the actual return address stack X, a content of an oldest entry is pushed out. However, since a record in the return hit table indicates that three entries should originally be present in the return address stack X, it is possible to prevent an address of a branch destination from being acquired by mistake from the return address stack as in the case of FIGS. 7 and 8.

In the branch prediction system according to the present embodiment, when a return instruction is detected by the branch history, if a value of the call hit counter is 1 or more, the return hit table is checked. Then, if at least one bit having a value 0 is present between a bit indicated by the call hit counter to a least significant bit, a value of a bit closest to a position indicated by the call hit counter is changed to 1, and a content in a latest entry of the actual return address stack X is acquired to set the content as a branch prediction result.

When address information has been discarded by push-out, all entries in the return address stack X may have been invalidated. In this case, since it is impossible to perform branch prediction using the return address stack X and the return address stack, a prediction result by the branch history is adopted as a branch prediction result. Although the prediction result by the branch history may be wrong, it is possible to acquire a prediction result that is much higher in accuracy than acquiring an address from the return address stack by mistake.

If a bit having a value 0 is not present in the return bit table at all, since all the entries in the imaginary return address stack X have been used, an address of a return destination is acquired from the return address stack according to the return stack pointer.

As described above, in the branch prediction system according to the present embodiment, validity of the respective entries in the imaginary return address stack X is managed by the return hit table. Thus, even when the number of entries in the actual return address stack X is not enough, it is possible to perform branch prediction while keeping high accuracy.

Actually, since it is assumed that there are few scenes in which a larger number of pieces of address information are pushed to the return address stack X, this system, which can keep accuracy of branch prediction high while holding down the number of entries in the return address stack X, has extremely high cost performance.

Figure 9:
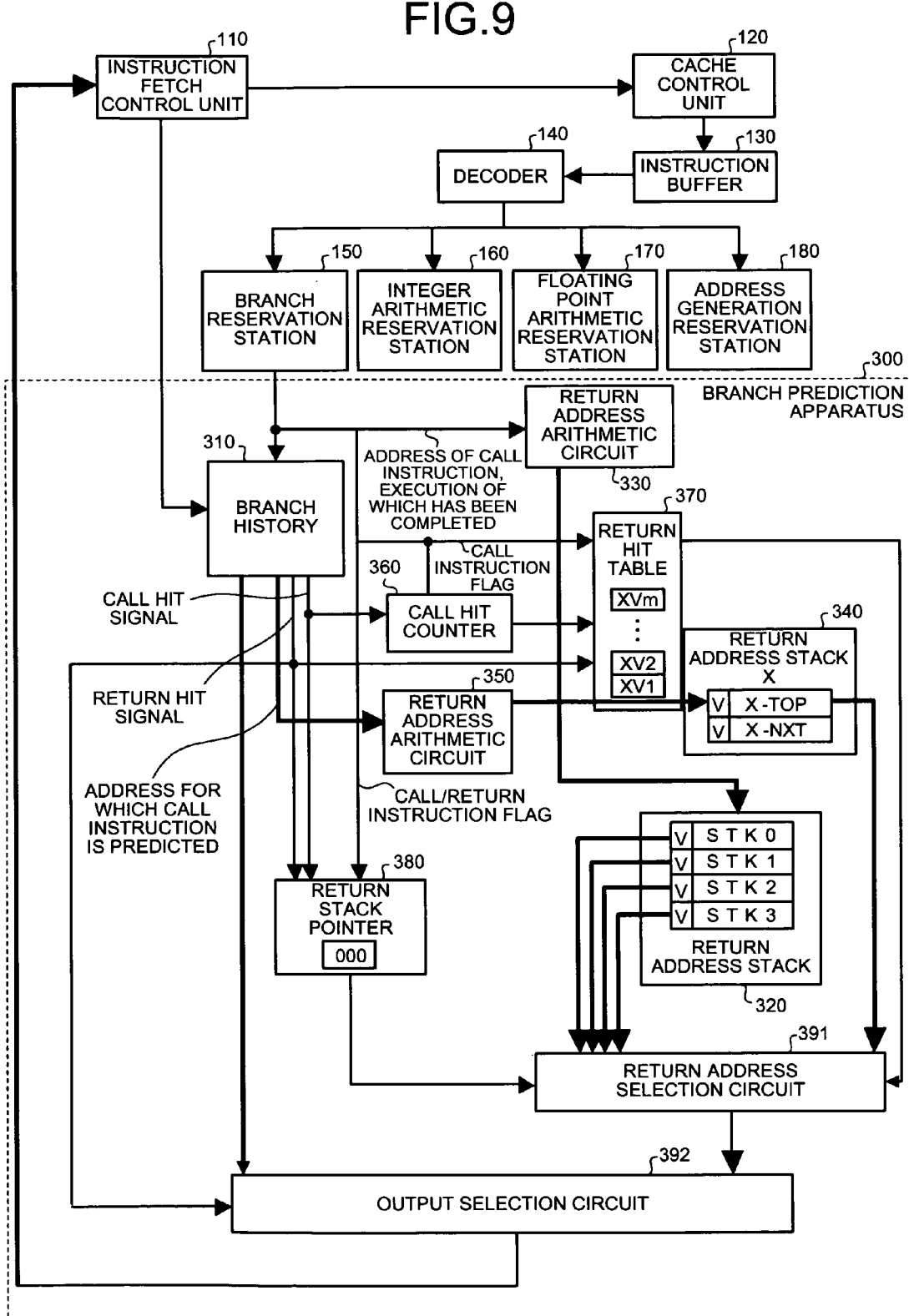
FIG. 9 is a block diagram of a structure of the branch predicting apparatus according to the present embodiment.

FIG. 9 is a block diagram of a structure of the branch predicting apparatus according to the present embodiment. Since components from the instruction fetch control unit 110 to the address generation reservation station are the same as those according to the first embodiment, explanations thereof are omitted.

A branch predicting apparatus 300 includes a branch history 310, a return address stack 320, a return address arithmetic circuit 330, a return address stack X 340, a return address arithmetic circuit 350, a call hit counter 360, a return hit table 370, a return stack pointer 380, a return address selection circuit 391, and an output selection circuit 392.

The branch history 310, the return address stack 320, and the return address arithmetic circuit 330 correspond to and have the same functions as the branch history 210, the return address stack 220, and the return address arithmetic circuit 230 according to the first embodiment, respectively.

The return address stack X 340 is a device that, when a call instruction is detected by the branch history 310, stores an address of a return destination of a return instruction corresponding to the call instruction. The return address stack X 340 has two entries X-TOP and X-NXT. In the return address stack X340, since an address is pushed at the time of detection of a call instruction and a content of a latest entry pops up at the time of detection of a return instruction, the top entry X-TOP is always the latest entry.

The return address arithmetic circuit 350 is a circuit that performs arithmetic operation for converting an address of a call instruction detected by the branch history 310 into an address of a return destination of a return instruction and sends the address to the return address stack X 340.

The call hit counter 360 is a device that keeps information on an entry in the imaginary return address stack X corresponding to the return hit table 370 up to which address information is stacked.

Figure 10:
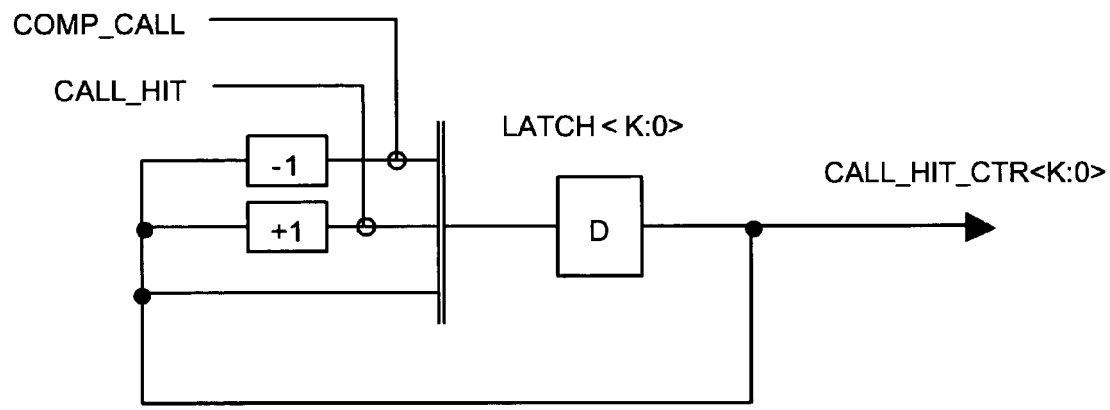
FIG. 10 is a logical circuit diagram of a circuit structure of a call hit counter.

FIG. 10 is a logical circuit diagram of a circuit structure of the call hit counter 360. As shown in the figure, the call hit counter 360 has a latch of K bits sufficient for holding the number of imaginary entries and outputs a value held by this latch as a CALL_HIT_CTR signal. The latch is set to 0 at the time of initialization and incremented by one every time a call hit signal from the branch history 310 is turned ON and decremented by one every time a call instruction flag from the branch reservation station 150 is turned ON.

Figure 11:
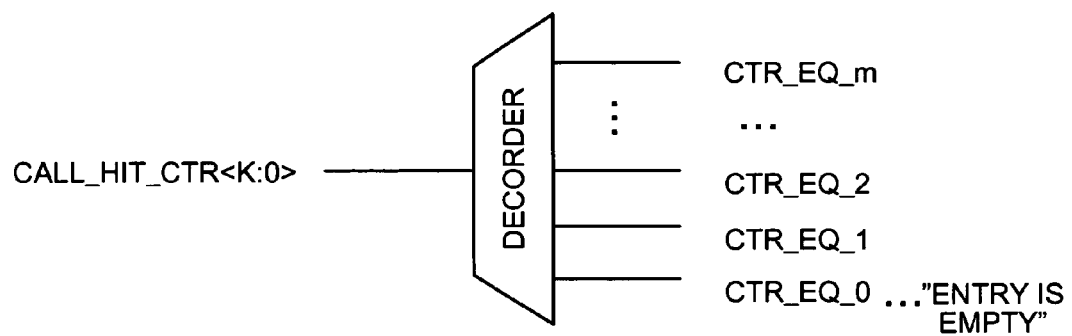
FIG. 11 is a logical circuit diagram of a decoder section of the call hit counter.

FIG. 11 is a logical circuit diagram of a decoder section of the call hit counter 360. As shown in the figure, the CALL_HIT_CTR signal outputted from the call hit counter 360 is decoded by the decoder to turn ON one of CTR_EQ_0 to CTR_EQ_m signals. For example, if a value of the CALL_HIT_CTR signal is 0, CTR_EQ_0 is turned ON and, if the value is m, CTR_EQ_m is turned ON.

The return hit table 370 is a device that holds bits indicating validity of entries in the imaginary return address stack X corresponding thereto. Each bit of the return hit table 370 has an initial value 0, which changes to 1 when an imaginary entry corresponding thereto is used for prediction. In addition, a bit corresponding to an oldest imaginary entry is shifted out every time the execution of the call instruction is completed.

Figure 12:
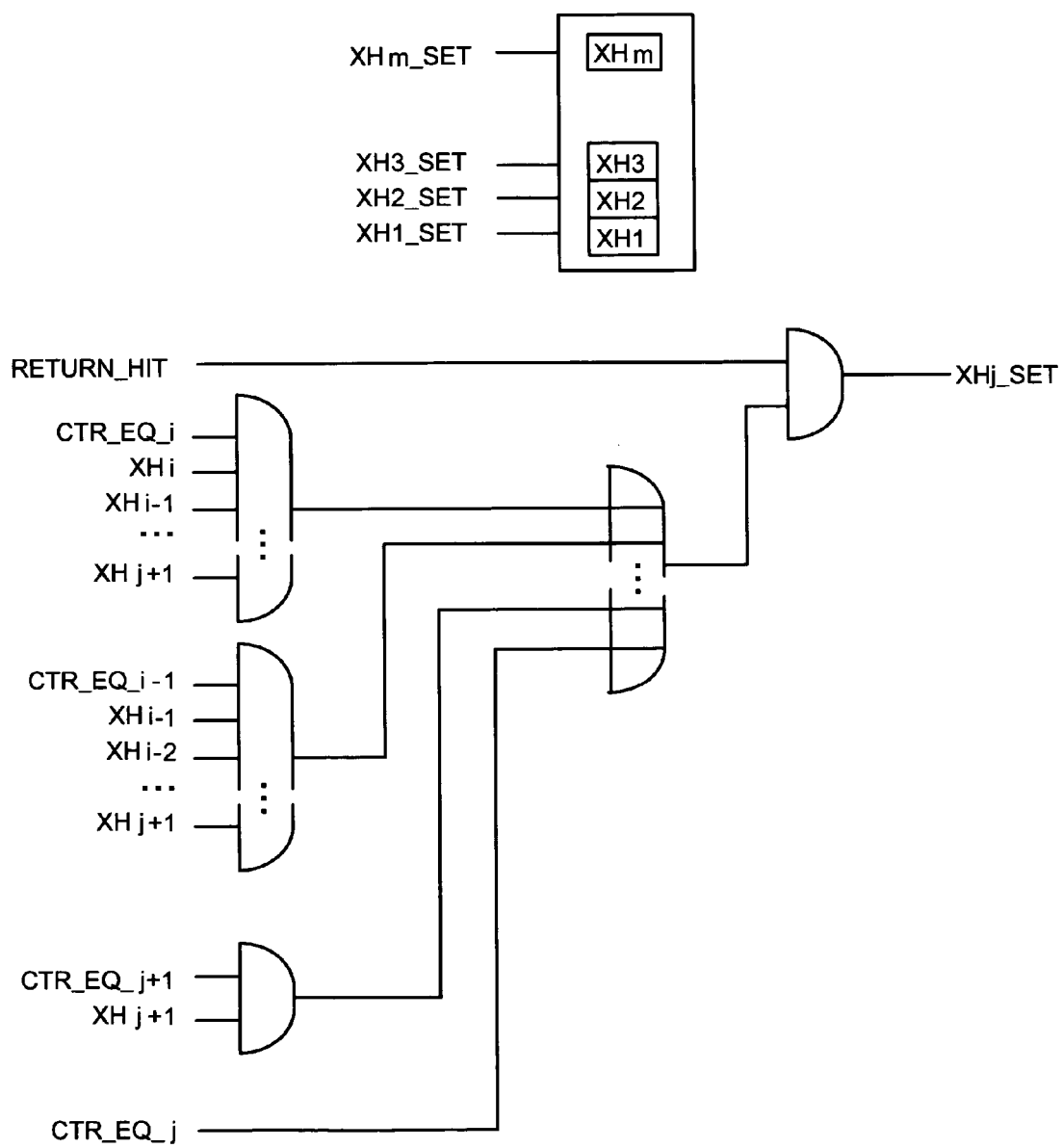
FIG. 12 is a logical circuit diagram of a circuit structure of a return hit table.

FIG. 12 is a logical circuit diagram of a circuit structure of the return hit table 370. As shown in the figure, the return hit table 370 holds information of m bits XH1 to XHm, and values of the respective bits are controlled by XH1_SET to XHm_SET signals. For example, the j-th bit XHj is controlled by an XHj_SET signal. This XHj_SET signal is turned ON when a return hit signal from the branch history 310 is ON and all bits from a bit next to the j-th bit of the return hit table 370 to a bit indicated by the call hit counter 360 have a value 1 or when a value of the call hit counter 360 is j.

Figure 13:
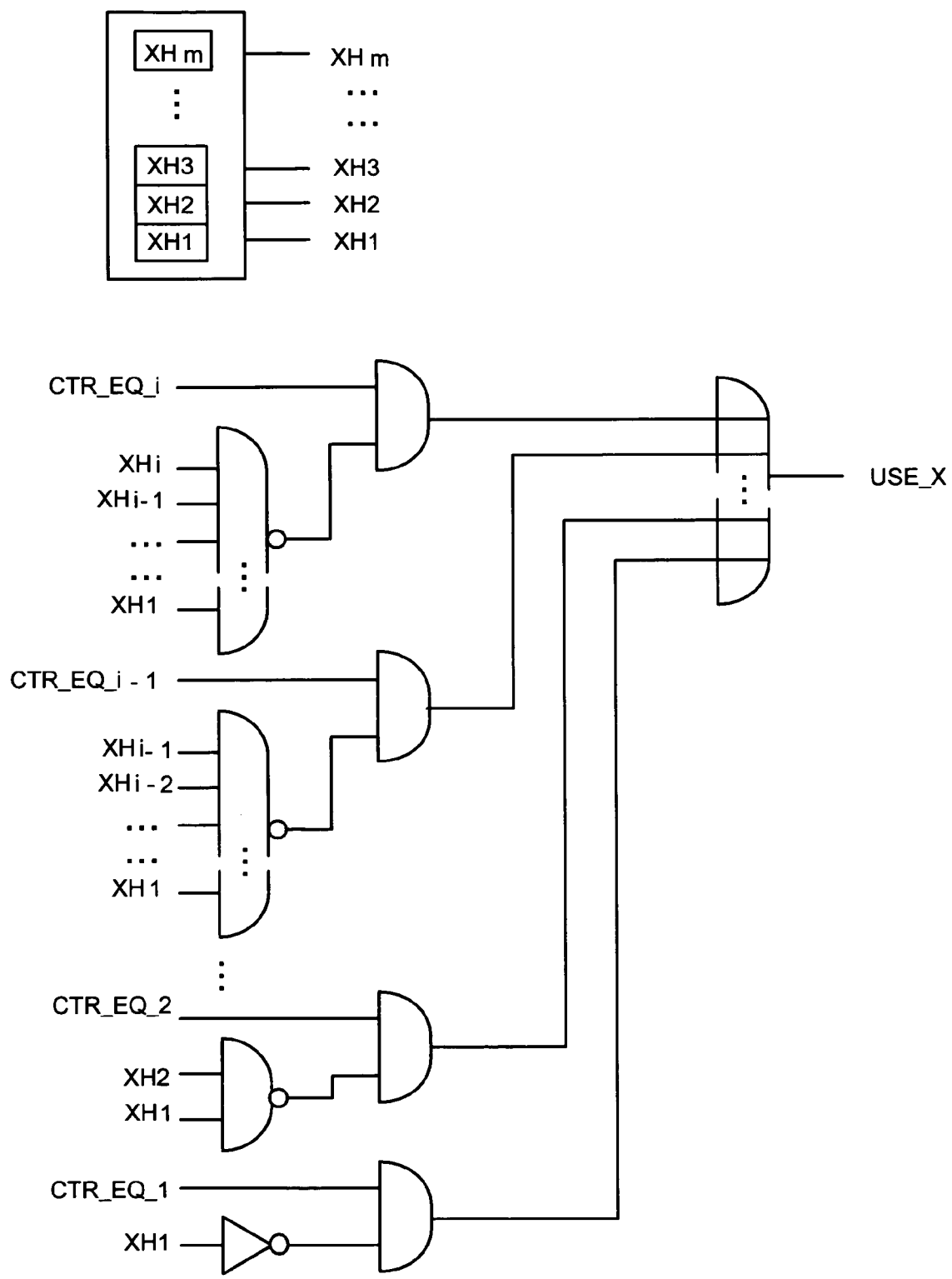
FIG. 13 is a logical circuit diagram of a circuit structure of an output section of the return hit table.

FIG. 13 is a logical circuit diagram of a circuit structure of an output section of the return hit table 370. As shown in the figure, a USE_X signal outputted from the return hit table 370 is turned ON when any one of bits from a least significant bit of the return hit table 370 to a bit indicated by the call hit counter 360 has a value 1.

The return stack pointer 380 is a device that holds entries in the return address stack that should be used when a return instruction is detected. More specifically, when values held by the return stack pointer 380 are 000, 001, 010, and 011, this means that entries STK0, SKT1, STK2, and STK3 in the return address stack 220 should be used, respectively. Note that, when a valid entry is present in the return address stack X 340, branch prediction is performed using information held by the return address stack X 340 regardless of a value held by the return stack pointer 380.

Figure 14:
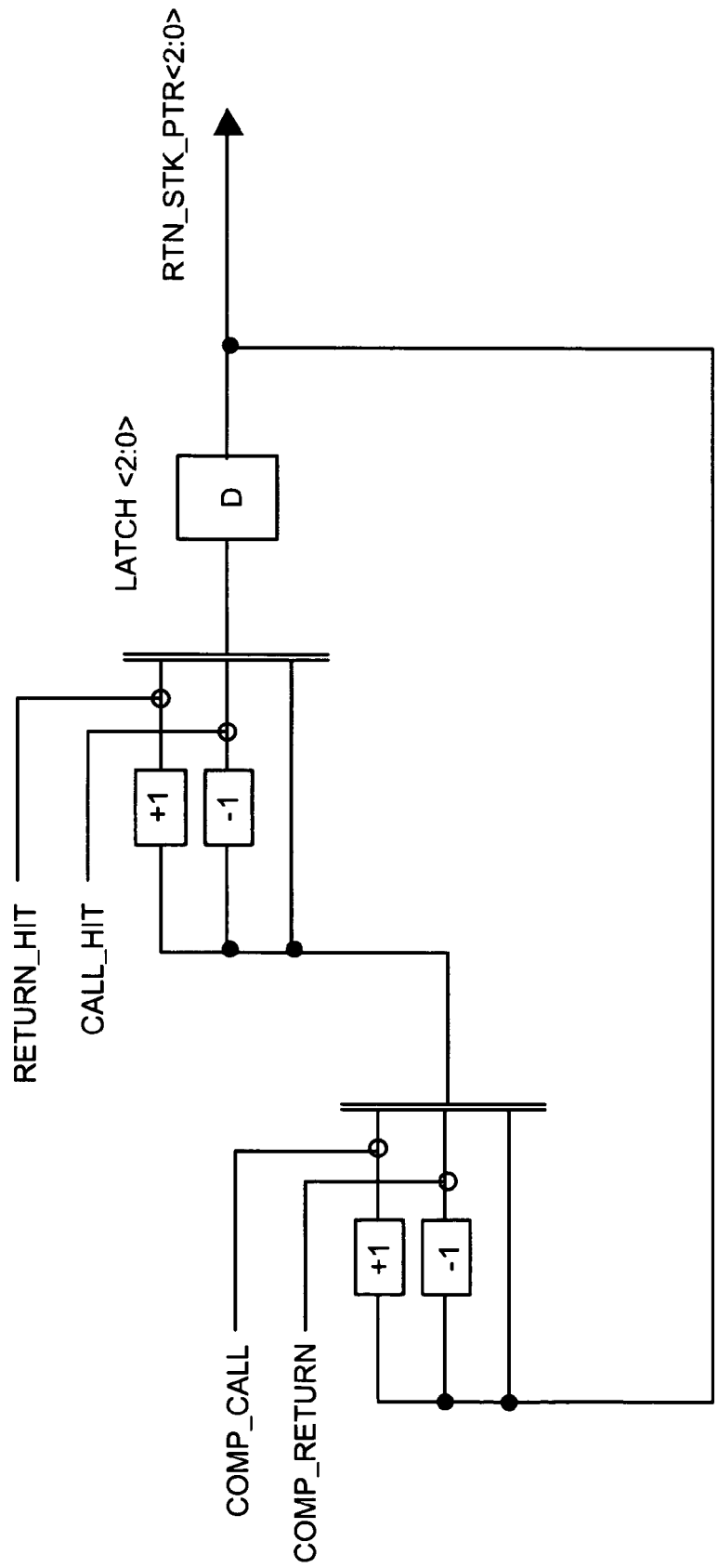
FIG. 14 is a logical circuit diagram of a circuit structure of a return stack pointer.

FIG. 14 is a logical circuit diagram of a circuit structure of the return stack pointer 380. As shown in the figure, the return stack pointer 380 has a latch consisting of three bits <2:0> and outputs a value held by this latch as a RTN_STK_PTR signal. A value of the latch is 000 in an initial state and is incremented by one every time a call instruction flag from the branch reservation station 150 is turned ON and is decremented by one every time a return instruction flag from the branch reservation station 150 is turned ON. In addition, the value of the latch is decremented by one every time a call hit signal from the branch history 310 is turned ON and is incremented by one every time a return hit signal from the branch history 310 is turned ON.

Figure 15:
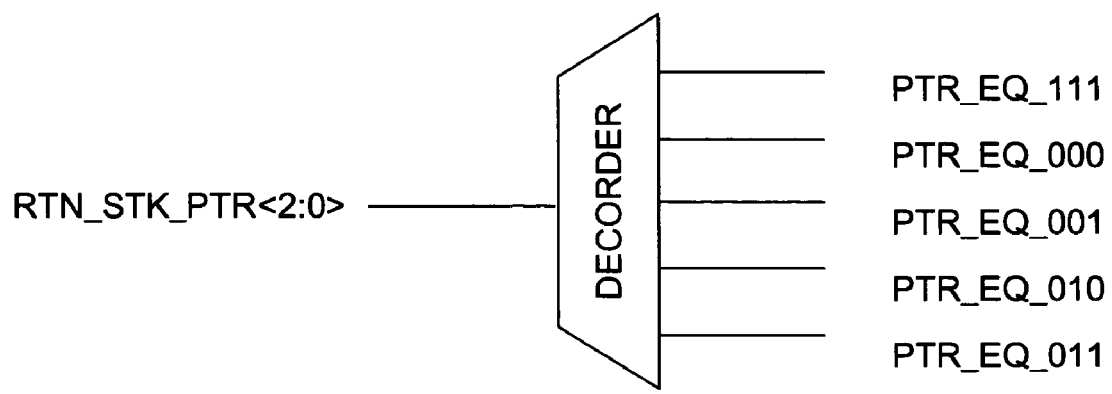
FIG. 15 is a logical circuit diagram of a decoder section of the return stack pointer.

FIG. 15 is a logical circuit diagram of a decoder section of the return stack pointer 380. As shown in the figure, a RTN_STK_PTR signal outputted from the return stack pointer 380 is decoded by the decoder to turn ON any one of PTR_EQ_000 to PTR_EQ_111 signals. More specifically, when a value of the RTN_STK_PTR signal is 0 to 3, the PTR_EQ_000 to PTR_EQ_011 signals are turned ON, respectively, and when a value of the RTN_STK_PTR signal is negative, the PTR_EQ_111 signal is turned ON.

Note that, when entries in the return address stack 320 increases, the number of bits of the latch of the return stack pointer 380 is increased to a width enough for specifying those entries.

The return address selection circuit 391 is a circuit that selects an appropriate address of a branch destination based on information of the return address stack 320, the return address stack X 340, and the return stack pointer 380 and sends the address to the output selection circuit 392.

The output selection circuit 392 is a circuit that selects appropriate branch information from plural pieces of branch information and sends the branch information to the instruction fetch control unit 110. More specifically, when the branch history 310 detects a return instruction, if address information has been sent from the return address selection circuit 391, the output selection circuit 392 sends the address as an address of a return destination of the return instruction. Otherwise, the output selection circuit 392 sends an address sent by the branch history 310 as an address of a return destination of the return instruction.

Figure 16:
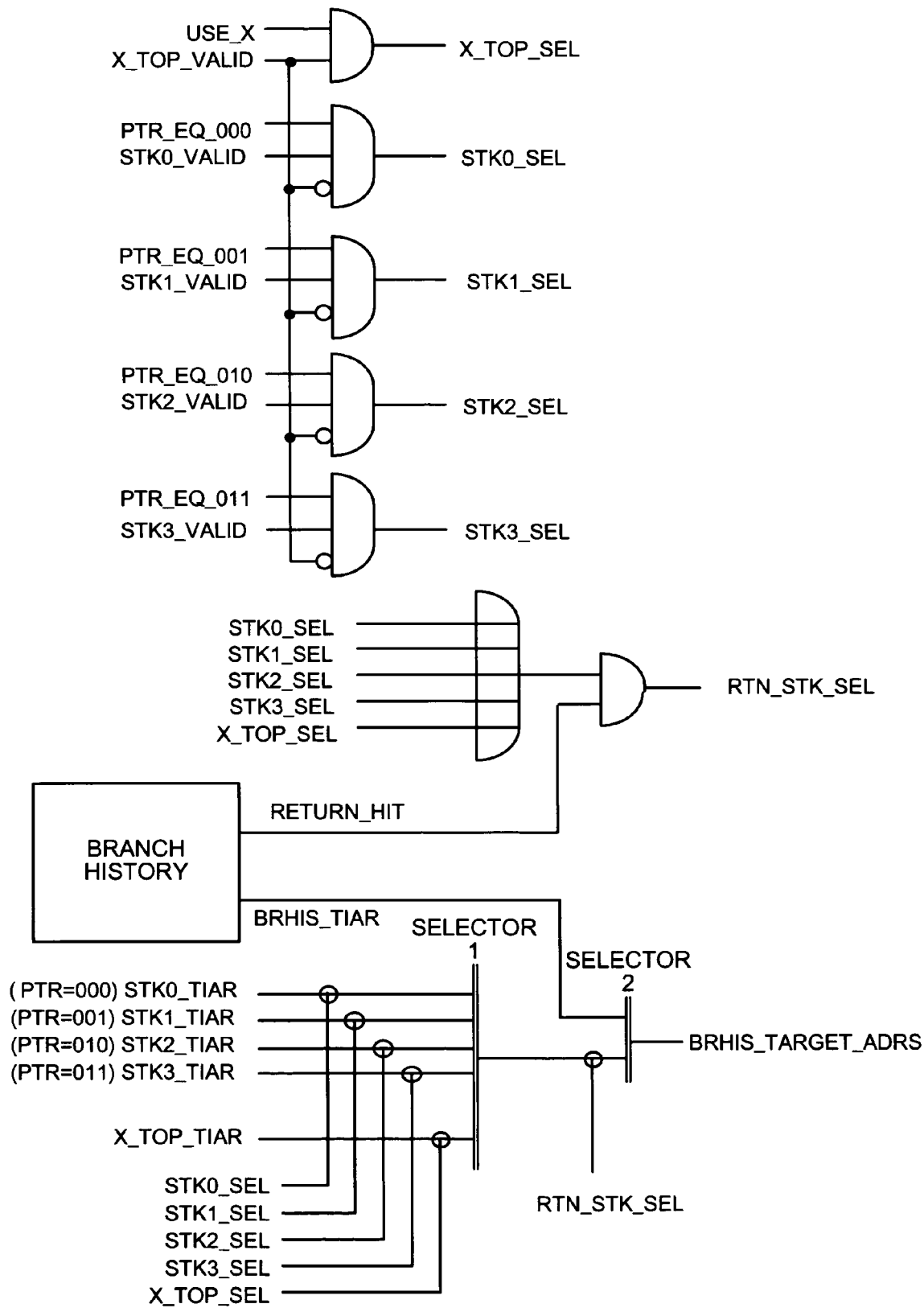
FIG. 16 is a logical circuit diagram of circuit structures of a return address selection circuit and an output selection circuit.

FIG. 16 is a logical circuit diagram of circuit structures of the return address selection circuit 391 and the output selection circuit 392. As shown in the figure, when an X_TOP_VALID signal indicating validity of a top entry in the return address stack X340 is ON, if a USE_X signal outputted from the return hit table 370 is ON, an X_TOP_SEL signal is turned ON and indicates that an address of a return destination of a return instruction should be acquired from the return address stack X340.

In addition, when the X_TOP_VALID signal is not ON, if an entry in the return address stack 320 indicated by the return stack pointer 380 is valid, any one of STK0_SEL to STK3_SEL signals corresponding to the entry is turned ON and indicates that an address of a return destination of a return instruction should be acquired from the return address stack 320.

Two or more of the X_TOP_SEL signal and the STK0_SEL to STK3_SEL signals are never turned ON simultaneously, and a first selector equivalent to the return address selection circuit 391 outputs a content of an entry corresponding to an ON signal to a second selector as a branch prediction result. When none of the X_TOP_SEL signal and the STK0_SEL to STK3_SEL signals are not ON, output to the second selector is not performed.

If any one of the X_TOP_SEL signal and the STK0_SEL to STK3_SEL signals is ON and a return hit signal from the branch history 310 is ON, the second selector equivalent to the output selection circuit 392 outputs an address, which is outputted from the first selector, to the instruction fetch control unit 110 as a branch prediction result. In other cases, the second selector outputs an address outputted from the branch history 310 to the instruction fetch control unit 110 as a branch prediction result.

Note that, when branch prediction fails, the return address stack 320, the return address stack X 340, the call hit counter 360, the return hit table 370, and the return stack point 380 are reset to an initial state.

In the explanation according to the present embodiment, the respective bits of the return hit table 370 are initialized at a value 0 and the value is changed to 1 at the time of detection of a return instruction. However, the bits may be initialized at a value 1 and the value may be changed to 0 at the time of detection of a return instruction. A structure of the return hit table 370 in such a case will also be explained.

Figure 17:
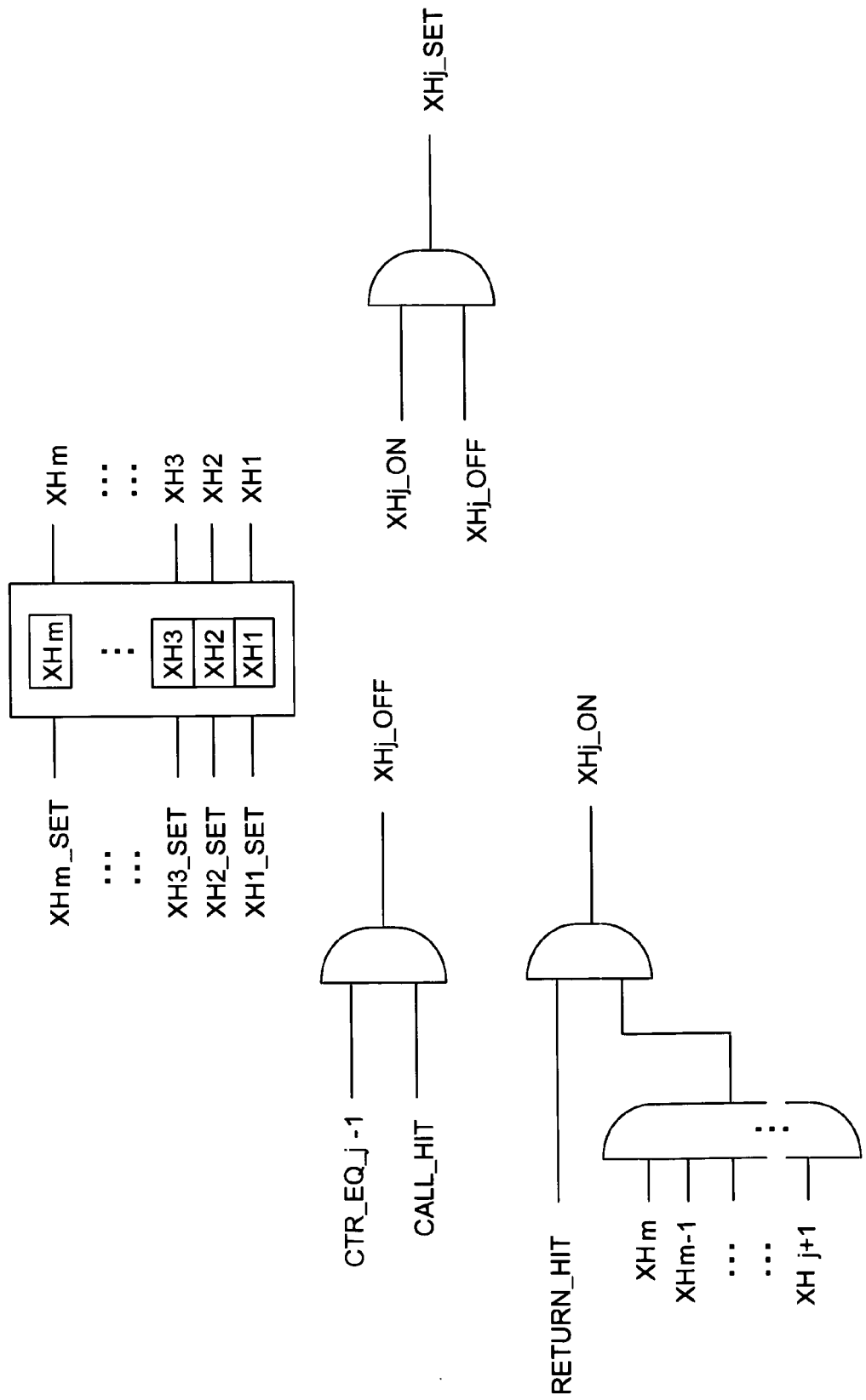
FIG. 17 is a logical circuit diagram of a circuit structure of a return hit table.

FIG. 17 is a logical circuit diagram of a circuit structure of the return hit table 370. As shown in the figure, the return hit table 370 holds information of m bits XH1 to XHm, and values of the respective bits are controlled by XH1_SET to XHm_SET signals. For example, a jth-bit XHj is controlled by the XHj_SET signal.

If a call hit signal from the branch history 310 is turned ON, this XHj_SET signal is turned OFF when a value of the call hit counter 360 at that point is j-1 to change a value of a bit corresponding thereto of the return hit table 370 to 0. In other words, when the call hit signal from the branch history 310 is turned ON, a value of a bit, which the call hit counter 360 indicates anew, is updated to 0.

If a return hit signal from the branch history 310 is turned ON, the XHj_SET signal is turned ON when all bits with values in the call hit counter 360 at that point more significant than j have a value 1 to change a value of a bit corresponding thereto of the return hit table 370 to 1. In other words, when the return hit signal from the branch history 310 is turned ON, a value of a most significant bit, a value of which in the return hit table 370 is 0, is updated to 1.

In this way, the respective bits of the return hit table 370 take a value 0 only when a valid value is present in entries in the imaginary return stack X corresponding thereto and takes a value 1 in other cases.

Figure 18:
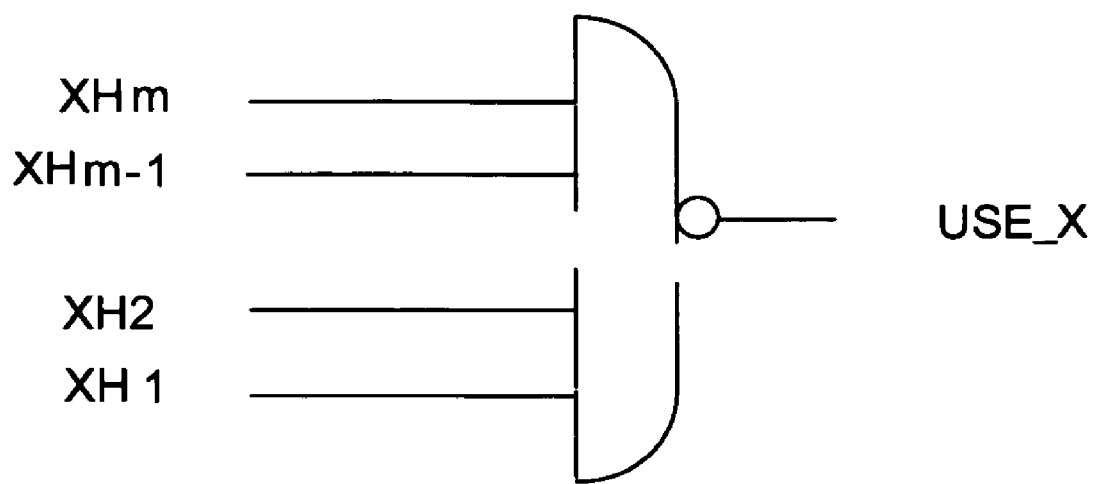
FIG. 18 is a logical circuit diagram of an output section of the return hit table.

FIG. 18 is a logical circuit diagram of an output section of the return hit table 370. As shown in the figure, a USE_X signal outputted from the return hit table 370 is turned ON when at least one bit, which does not take a value 1, is present in all the bits of the return hit table 370. When a bit, which does not take a value 1, is present in the return hit table 370, this means that a valid value is present in the entries in the imaginary return stack X.

Next, an operation of the branch predicting apparatus according to the present embodiment will be explained with a case in which the instruction stream in FIG. 6 is executed as an example. FIG. 19A to 19L are explanatory diagrams for explaining the operation of the branch predicting apparatus according to the present embodiment. Note that, in the explanation of the present embodiment, a system for initializing respective bits of a return hit table with a value 0 is used.

Figure 19A:
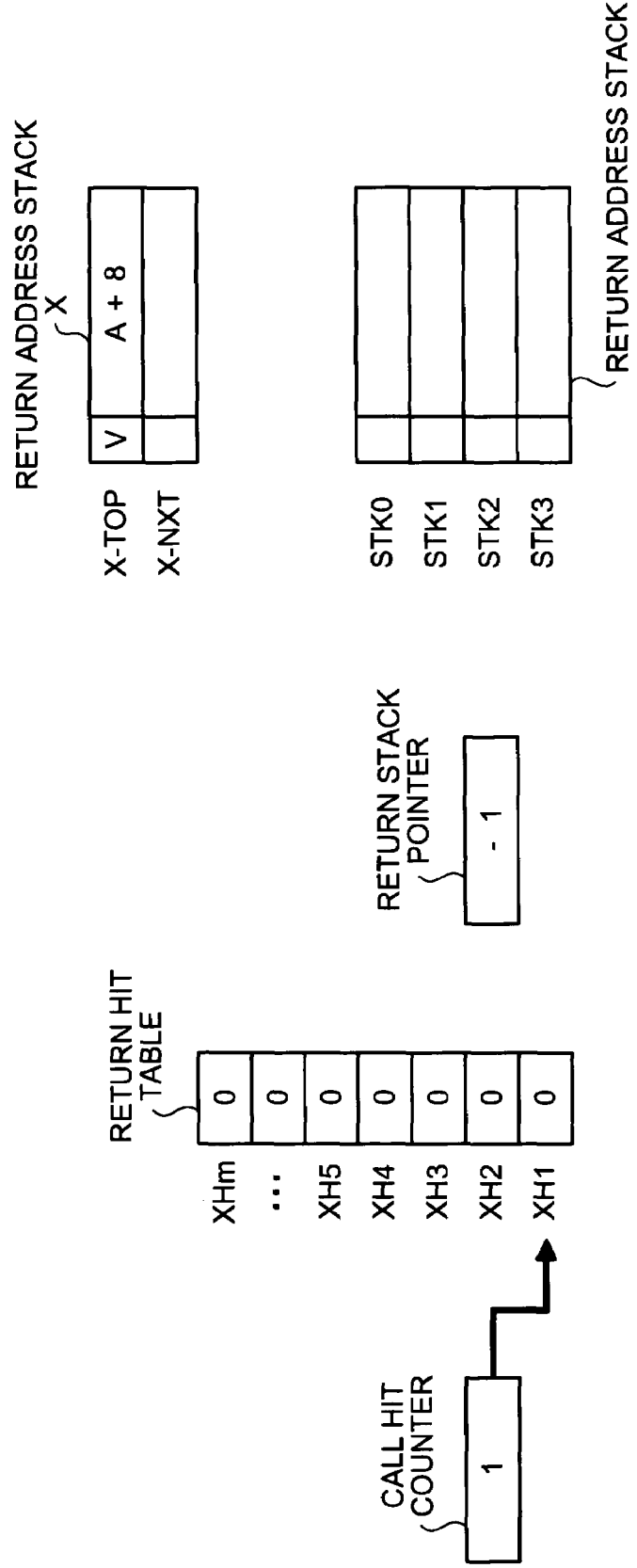
FIGS. 19A to 19L are explanatory diagrams for explaining an operation of the branch predicting apparatus according to the present embodiment.

FIG. 19A is a scene in which a call instruction is detected in the address A. A+8 is stored in X-TOP at the top of the return address stack X as an address of a return destination and a value of the return stack pointer is decremented by one to -1. In addition, a value of the call hit counter is decremented by one to 1.

Here, when it is assumed that a return instruction in the address C is detected by the branch history, since a bit with a value 0 is present between a least significant bit of the return hit table and a bit indicated by the call hit counter, a value stored in X-TOP that is a valid latest entry in the return address stack X, that is, A+8 is acquired as a branch prediction result. A+8 is a correct address as a branch destination of the return instruction in the address C.

Figure 19B:
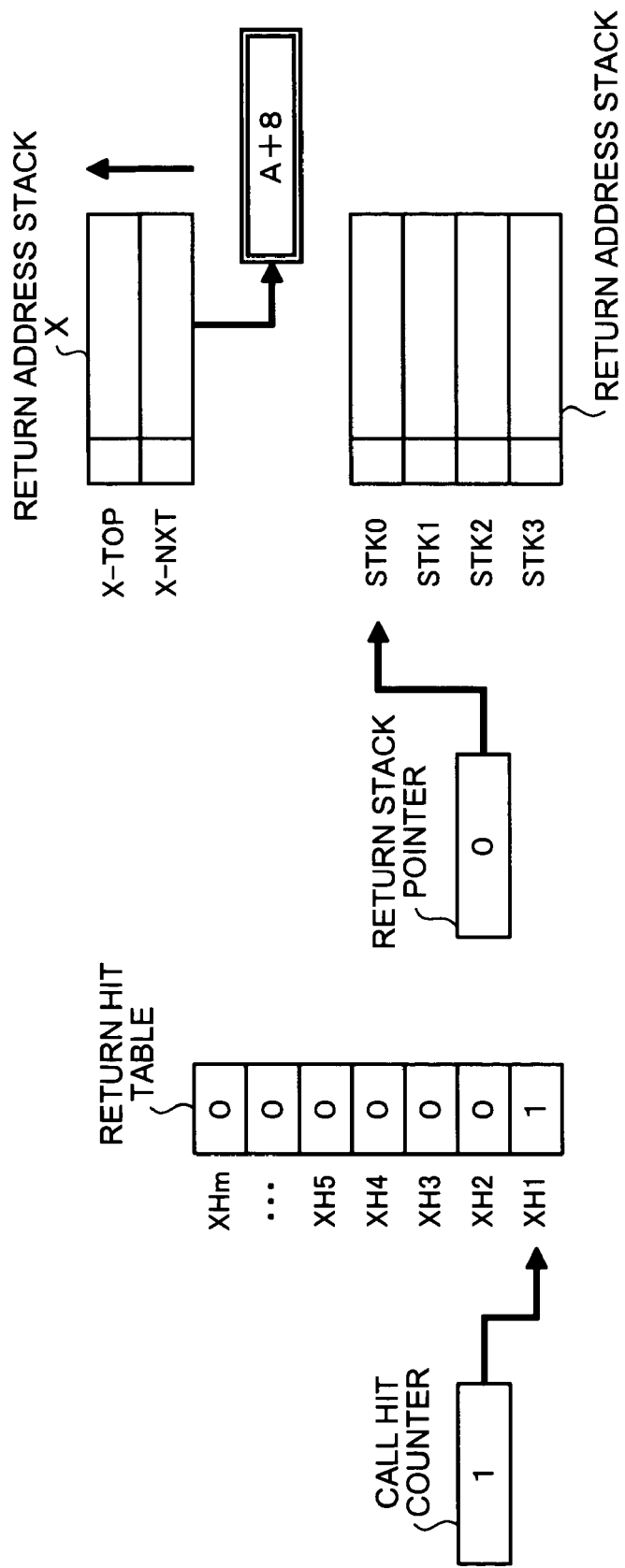

FIG. 19B shows a scene after the return instruction is detected in the address C. A pop operation is performed in the return address stack X according to the detection of the return instruction to discard information in X-TOP. In addition, the value of the return stack pointer is incremented by one to 0. In the return hit table, a value of a bit of XH1 indicated by the call hit counter changes to 1, and the return hit table stores the fact that an imaginary entry corresponding thereto has been used.

Figure 19C:
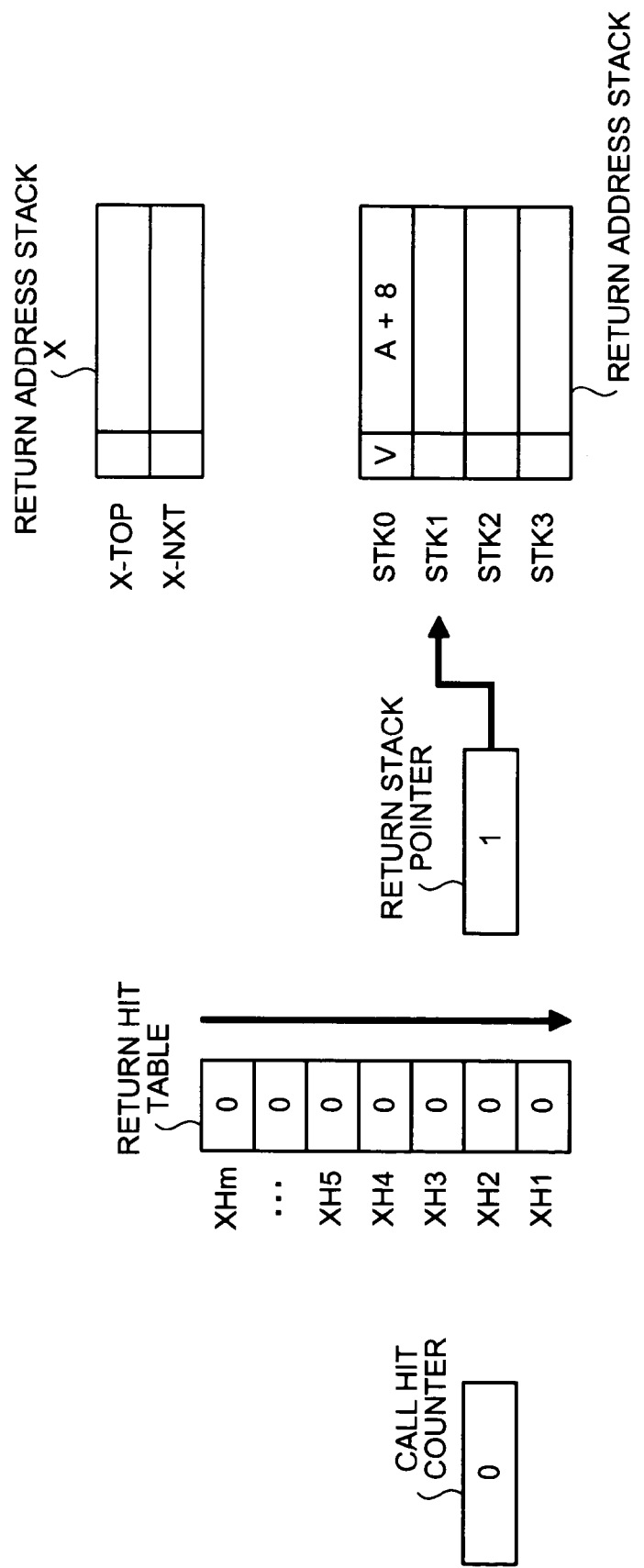

FIG. 19C shows a scene in which execution of the call instruction in the address A is subsequently completed. In response to the completion of the execution of the call instruction, the address A+8 of a return destination is stored in SKT0 at the top of the return address stack and the value of the return stack pointer is incremented by one to 1. In addition, the value of the call hit counter is decremented by one to 0. In the return hit table, a shift operation is performed to discard the least significant bit.

Figure 19D:
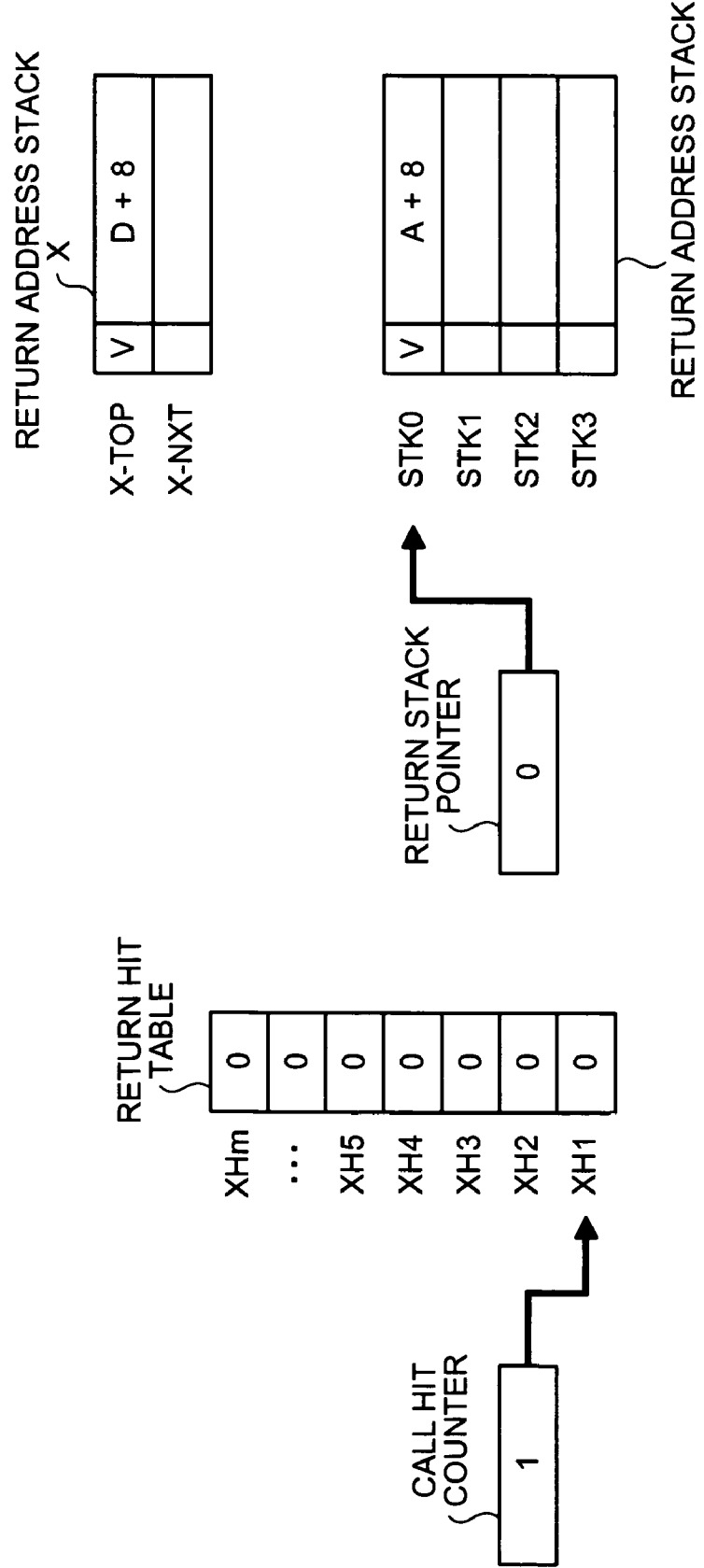

FIG. 19D shows a scene in which a call instruction is subsequently detected in the address D. In response to the detection of the call instruction, an address D+8 of a return destination is stored in X-TOP at the top of the return address stack X and the value of the return stack pointer is decremented by one to 0. In addition, the value of the call hit counter is incremented by one to 1.

Figure 19E:
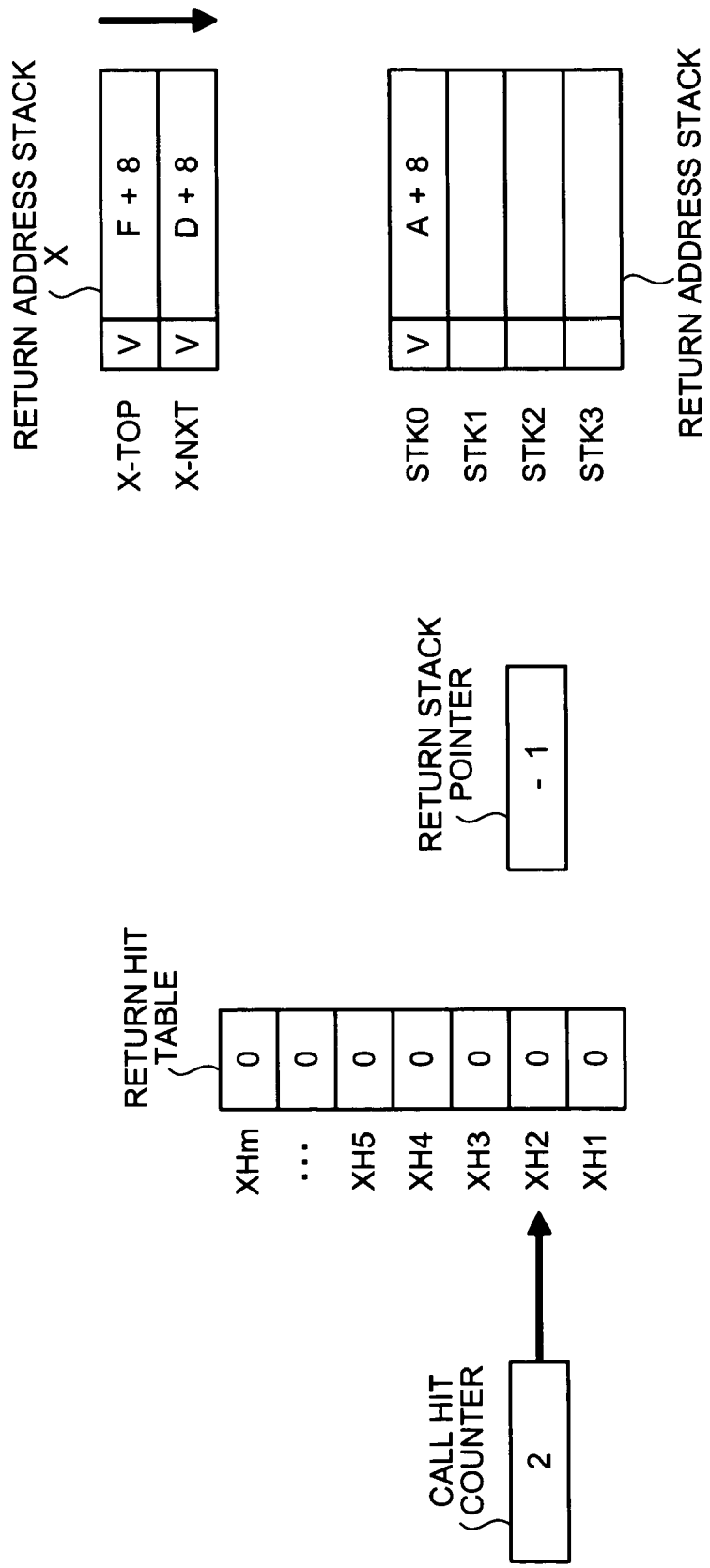

FIG. 19E shows a scene in which a call instruction is subsequently detected in the address F. In response to the detection of the call instruction, an address F+8 of a return destination is pushed to the return address stack X and the value of the return stack pointer is decremented by one to -1. In addition, the value of the call hit counter is incremented by one to 2.

Figure 19F:
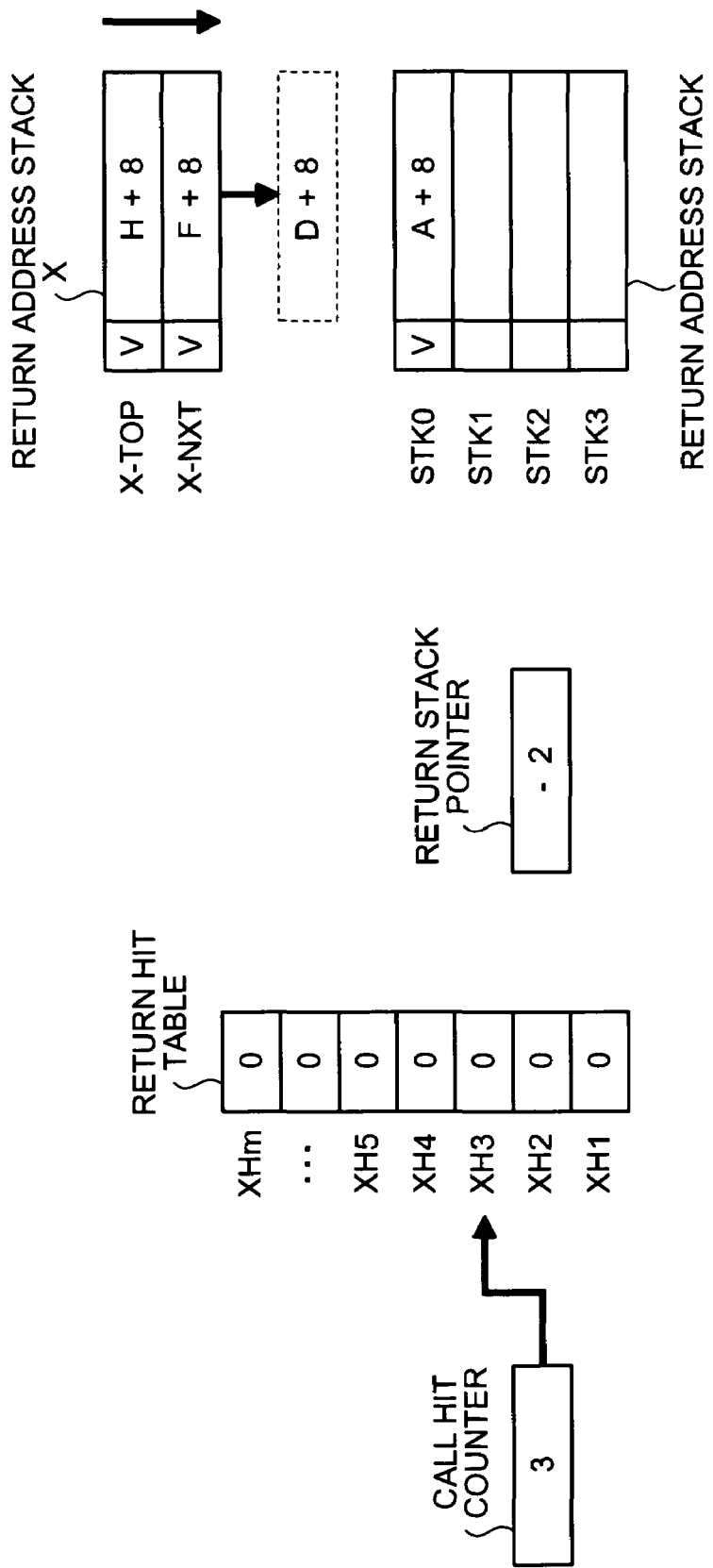

FIG. 19F shows a scene in which a call instruction is subsequently detected in the address H. In response to the detection of the call instruction, an address H+8 of a return destination is pushed to the return address stack X. However, since both two entries have already been filled, old information D+8 is pushed out and disappears. In this way, in the return address stack X, H+8 is stored in X-TOP and F+8 is stored in X-NXT. In addition, the value of the return stack pointer is decremented by one to -2 and the value of the call hit counter is incremented by one to 3.

Here, when it is assumed that a return instruction in the address J is detected by the branch history, since a bit with a value 0 is present between a least significant bit of the return hit table and a bit indicated by the call hit counter, a value stored in X-TOP that is a valid latest entry in the return address stack X, that is, H+8 is acquired as a branch prediction result. H+8 is a correct address as an address of a branch destination of the return instruction in the address J.

Figure 19G:
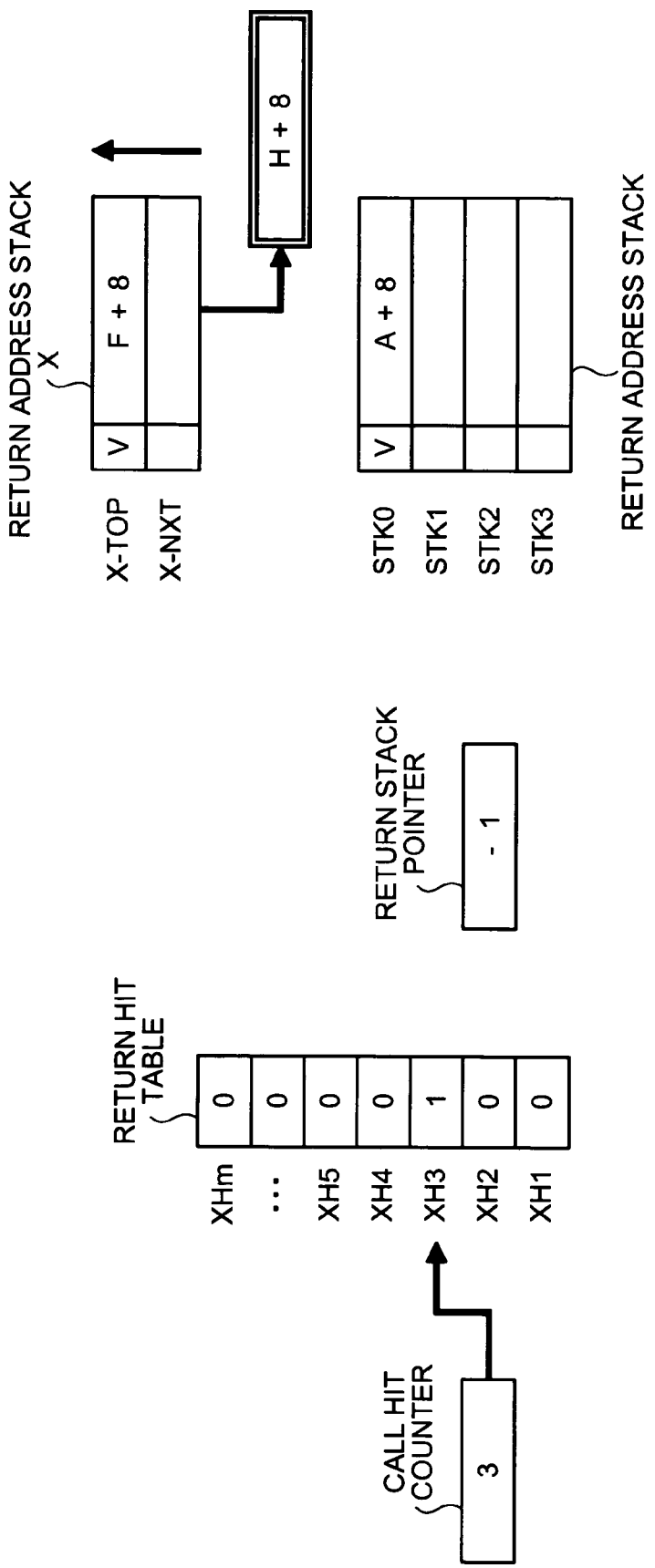

FIG. 19G shows a scene after the return instruction is detected in the address J. A pop operation is performed in the return address stack X according to the detection of the return instruction and information in X-NXT is moved to X-TOP. In addition, the value of the return stack pointer is incremented by one to -1. In the return hit table, a value of a bit of XH3 indicated by the call hit counter changes to 1, and the return hit table stores the fact that an imaginary entry corresponding thereto has been used.

Here, when it is assumed that a return instruction in the address K is detected by the branch history, since a bit with a value 0 is present between the least significant bit of the return hit table and a bit indicated by a call hit counter, a value stored in X-TOP that is a valid latest entry in the return address stack X, that is, F+8 is acquired as a branch prediction result. F+8 is a correct address as an address of a branch destination of the return instruction in the address K.

Figure 19H:
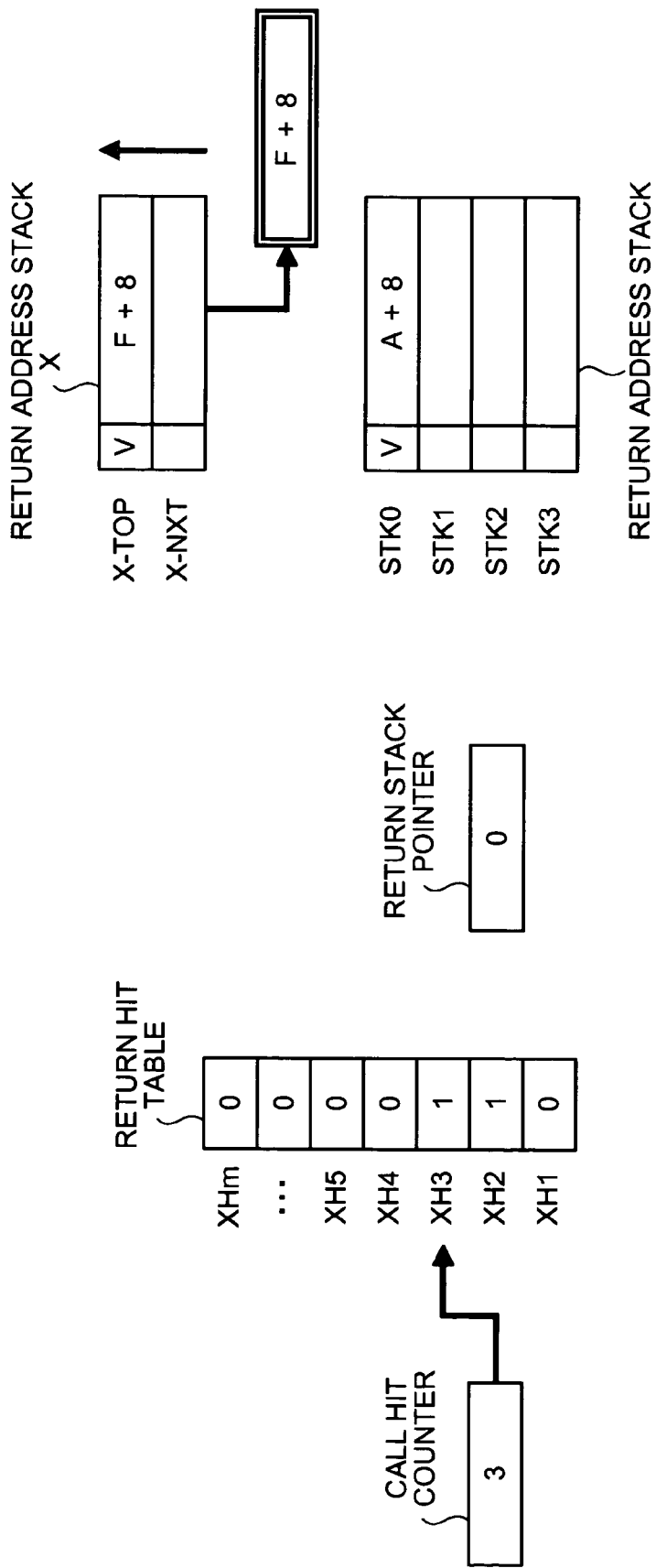

FIG. 19H shows a scene after the return instruction is detected in the address K. A pop operation is performed in the return address stack X according to the detection of the return instruction to discard information in X-TOP. In addition, the value of the return stack pointer is incremented by one to 0. In the return hit table, a bit of XH3 indicated by the call hit counter already has a value 1, a value of a bit of the next XH2 changes to 1, and the return hit table stores the fact that an imaginary entry corresponding thereto has been used.

Here, when it is assumed that a return instruction in the address L is detected by the branch history, since a bit with a value 1 is present between the least significant bit of the return hit table and a bit indicated by the call hit counter, it is attempted to acquire address information from X-TOP that is a latest entry in the return address stack X. However, since information is not present in X-TOP already, address information cannot be acquired. In this case, since a correct address of a branch destination cannot be acquired even if address information is acquired from the return address stack, a predicted value of the branch history is adopted as a prediction result.

If the branch history can predict a correct address, branch prediction will be successful. Whereas branch prediction always fails in the scene in FIG. 7H that shows the same instruction execution state, in the branch prediction system according to the present embodiment, it is possible to significantly improve accuracy of branch prediction by performing branch prediction using the branch history.

Figure 19I:
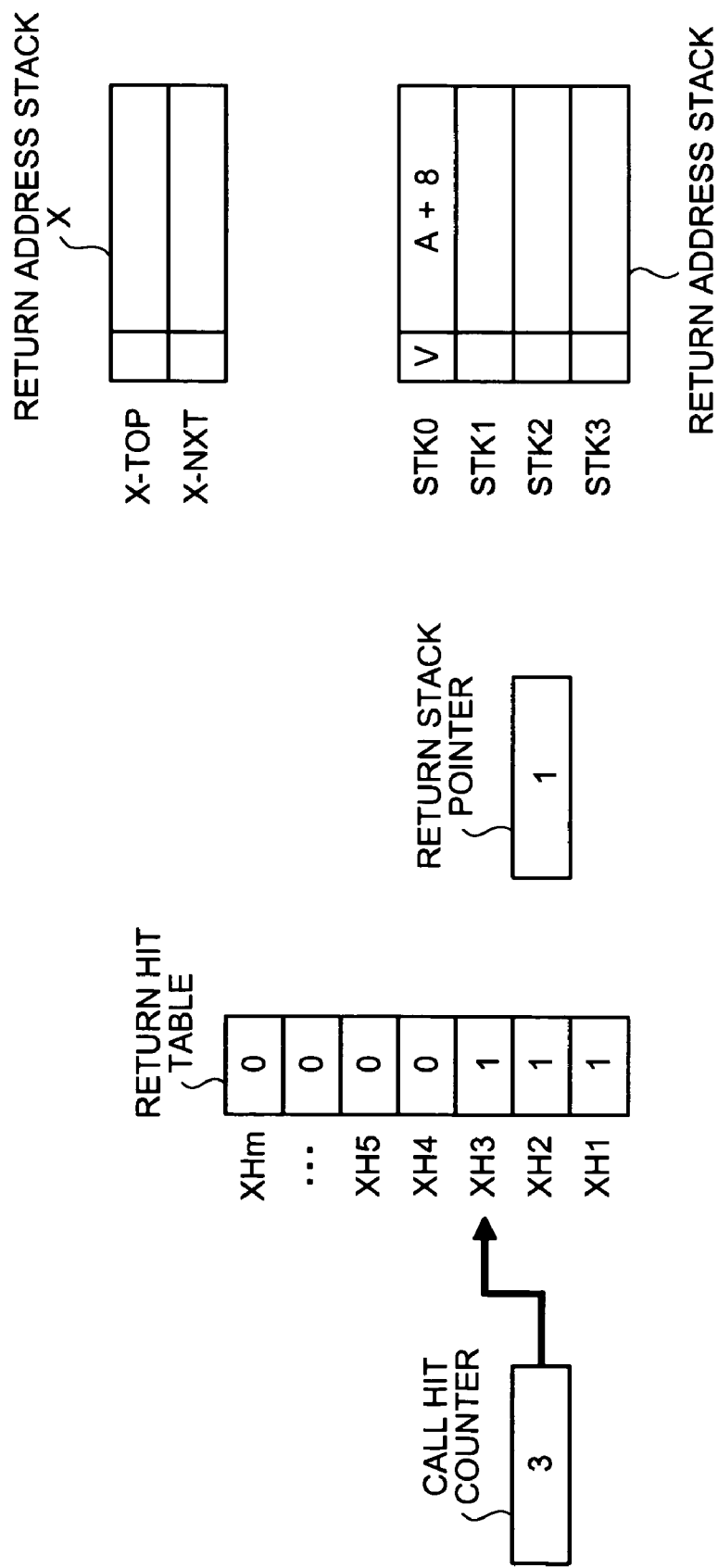

FIG. 19I shows a scene after the return instruction is detected in the address L. A pop operation is performed in the return address stack X according to the detection of the return instruction. In addition, the value of the return stack pointer is incremented by one to 1. Since the bit of XH3 and the bit of HX2 already take a value 1 in the return hit table, a value of a bit of the next XH1 changes to 1, and the return hit table stores the fact that all the imaginary entries have been used.

If the execution of the call instruction in the address D is completed before the return instruction in the address L is detected, accuracy of branch prediction is further improved. Since the execution of the return instruction in the address C is required to be completed to complete the execution of the call instruction in the address D, it is assumed that the execution of the return instruction in the address C is completed in the scene of FIG. 19H.

Figure 19J:
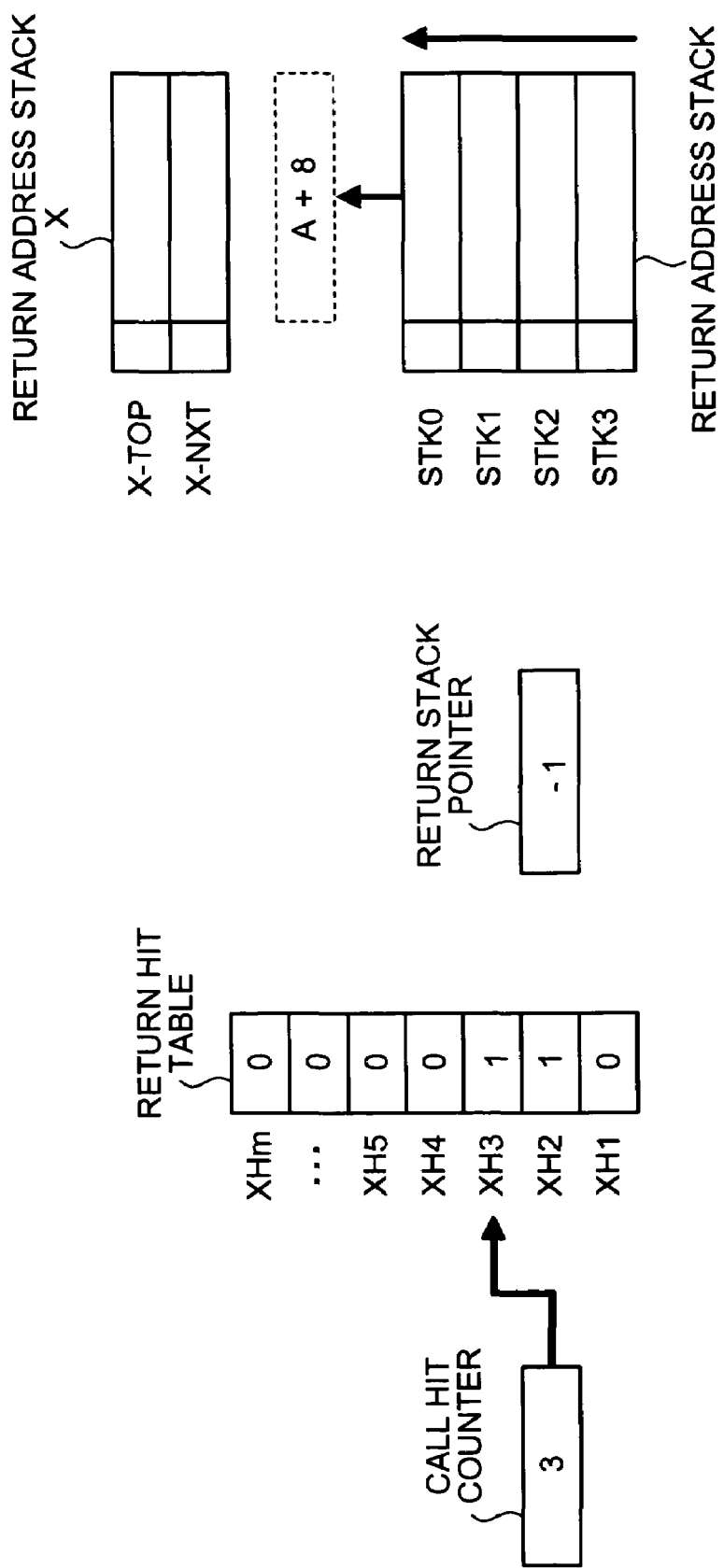

FIG. 19J shows a scene in which the execution of the return instruction in the address C is completed in the state in FIG. 19H. In response to the completion of the execution of the return instruction, a pop operation is performed in the return address stack to discard a content of SKT0 at the top. In addition, the value of the return stack pointer is decremented by one to −1.

Figure 19K:
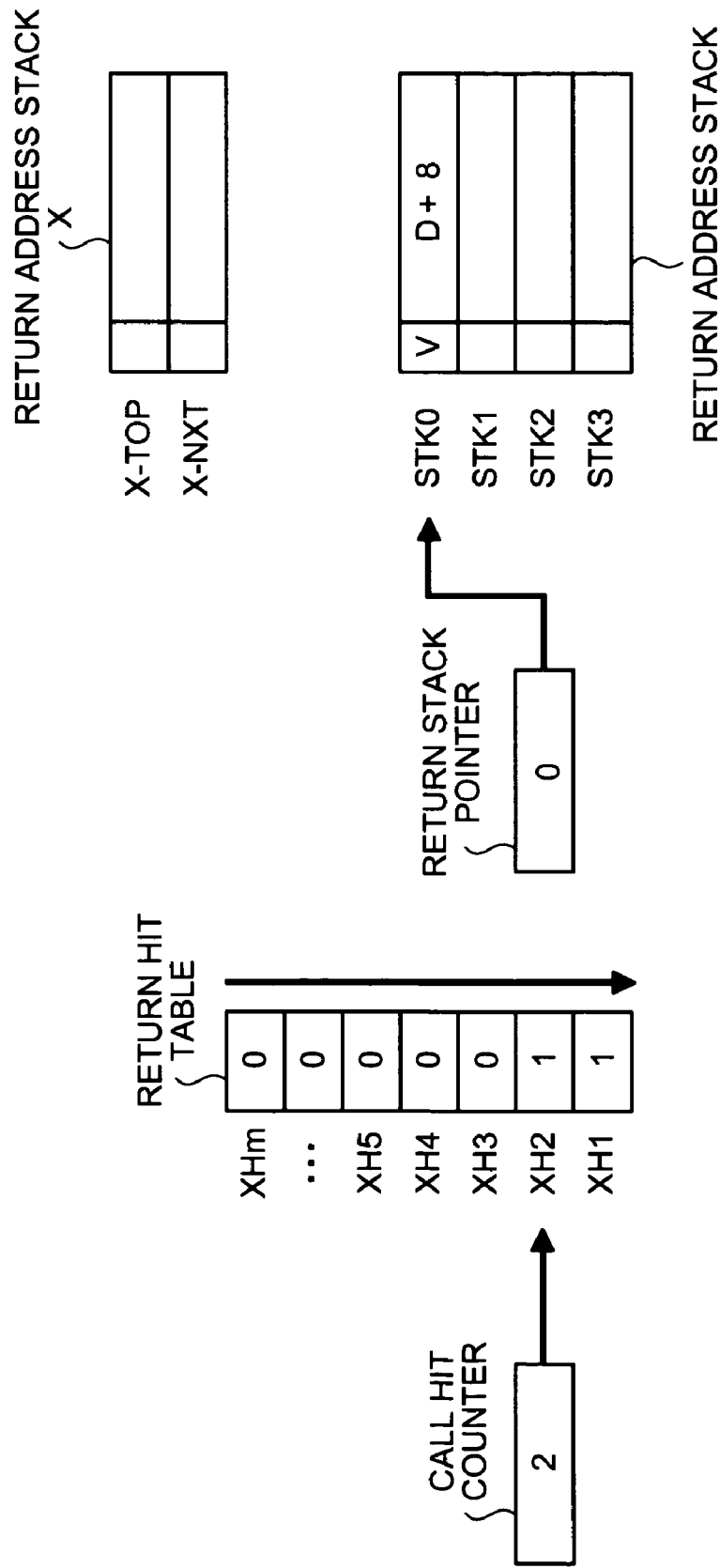

FIG. 19K shows a scene in which the execution of the call instruction in the address D is subsequently completed. In response to the completion of the execution of the call instruction, the address D+8 of a return destination is stored in SKT0 at the top of the return address stack and the value of the return stack pointer is incremented by one to 0. In addition, the value of the call hit counter is decremented by one to 2. In the return hit table, a shift operation is performed to discard the least significant bit.

Here, when it is assumed that a return instruction in the address L is detected by the branch history, since a bit with a value 0 is not present between the least significant bit of the return hit table and a bit indicated by the call hit counter, the value stored in SKT0 that is an entry in the return address stack indicated by the return stack pointer, that is, D+8 is acquired as a branch prediction result. D+8 is a correct address as an address of a branch destination of the return instruction in the address L.

In this way, if the execution of the call instruction is completed promptly, it is possible to perform branch prediction highly accurately without increasing the number of entries in the return address stack X with the branch prediction system according to the present embodiment.

Figure 19L:
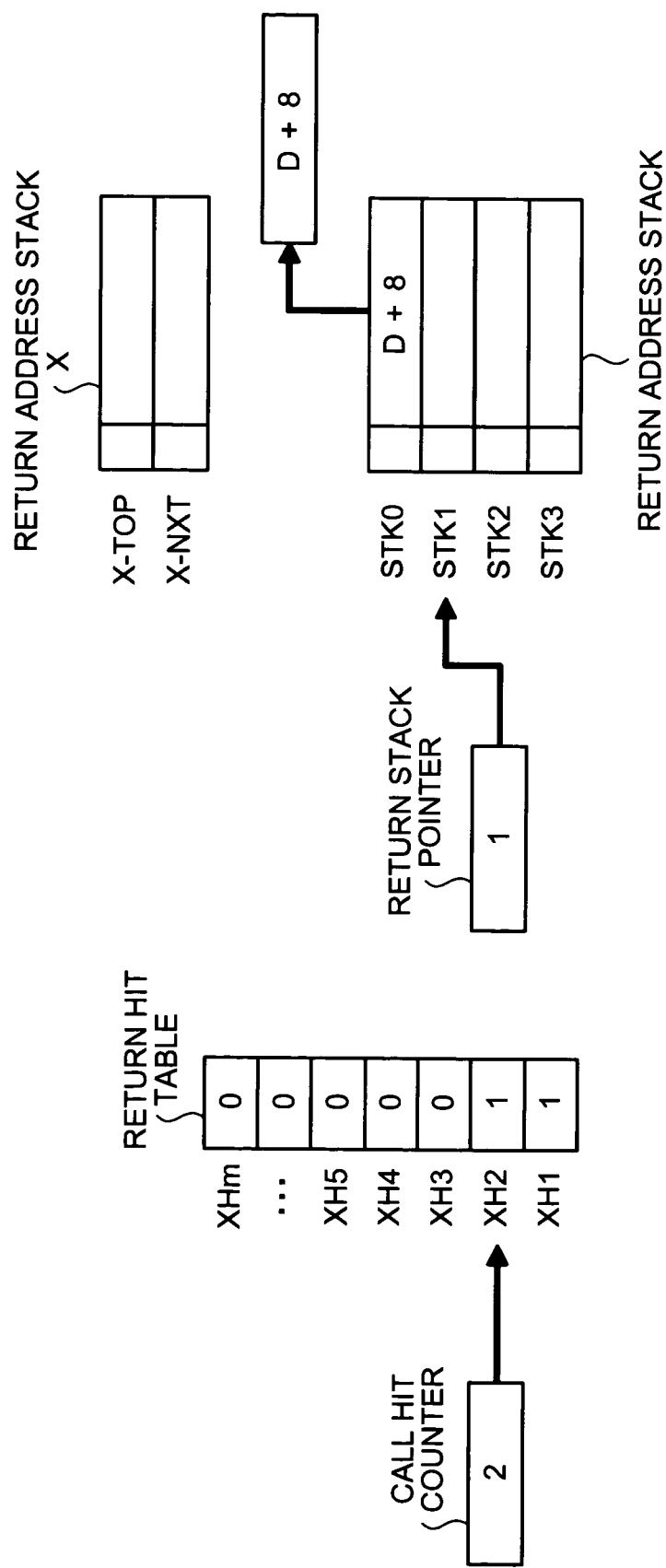

FIG. 19L shows a scene after the return instruction is detected in the address L. According to the detection of the return instruction, a pop operation is performed in the return address stack X. In addition, the value of the return stack pointer is incremented by one to 1.

As described above, according to the second embodiment, validity of entries in the imaginary return address stack X is managed by the management table consisting of a small number of bits. Thus, it is possible to perform branch prediction highly accurately while holding down the number of entries in the actual return address stack X.

Note that, in the explanation according to the present embodiment, bits in the return hit table are used in order from a least significant bit. However, the bits do not have to be used in this way. For example, it is also possible to use the bits in order from a most significant bit and to use the bits like a stack.

In the branch prediction system explained in the second embodiment, a bit of a management table for imaginary entries is updated with detection of a return instruction as an opportunity. However, it is also possible to update a bit of a management table for imaginary entries with detection of a call instruction as an opportunity. According to the a third embodiment of the present invention, a branch prediction system for updating a bit of a management table for imaginary entries with detection of a call instruction as an opportunity will be explained.

Figure 20:
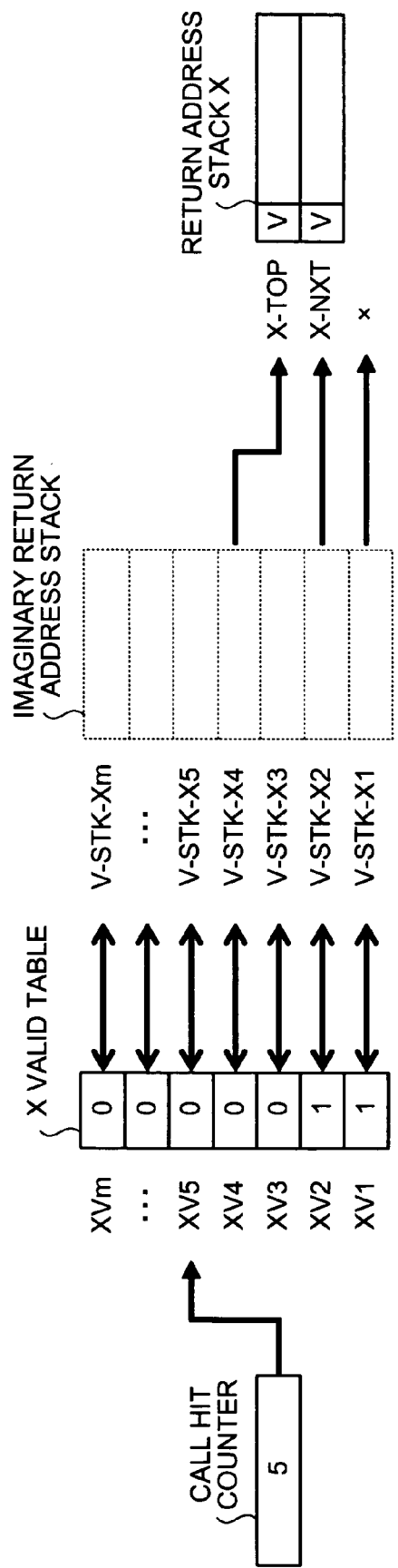
FIG. 20 is a explanatory diagram for explaining an outline of a branch prediction system according to an embodiment of the present invention.

FIG. 20 is an explanatory diagram for explaining an outline of the branch prediction system according to the third embodiment. As shown in the figure, in the branch prediction system according to the present embodiment, an X valid table and a call hit counter are used.

The X valid table is a table for managing validity of respective entries in an imaginary return address stack X. Each bit of the return hit table corresponds to one entry in the imaginary return address stack X and takes 0 as an initial value. If a bit has a value 0, this indicates that an imaginary entry corresponding thereto is invalid, and if a bit has a value 1, this indicates that an imaginary entry corresponding thereto is valid.

In the X valid table, a value 1 is set in order from a least significant bit XV1 every time a call instruction is detected and a bit with a most significant value 1 is reset to a value 0 every time a return instruction is detected. In addition, a value of the least significant bit is discarded by a shift operation every time execution of the call instruction is completed. This is because, when the execution of the call instruction is completed, since an address of a return destination of the return instruction is stored in a return address stack, entries in the imaginary return address stack X are made unnecessary.

Since the X valid table only has to have one bit for each entry of the imaginary return address stack X, it is possible to mount the X valid table at extremely low cost. For example, when an address length is assumed to be 64 bits, if eight entries are provided in the actual return address stack X, total 512 (64×8) bits are required. However, the X valid table requires only 8 bits.

The call hit counter takes 0 as an initial value and is incremented by one every time a call instruction is detected and decremented by one every time execution of the call instruction is completed. Therefore, a value of the call hit counter indicates the number of call instructions that have been detected by the branch history but execution of which has not been completed, that is, the number of entries in the imaginary return address stack X in which the value is stored.

FIG. 20 indicates that the value of the call hit counter is 5, there are five call instructions, execution of which has not been completed by the execution unit, and addresses of return destinations of return instructions corresponding to those call instructions are stored in five entries in the imaginary return address stack X.

The return instructions corresponding to some of those call instructions may have already been detected by the branch history. In an example in FIG. 20, third and fifth call instructions are pertinent to such call instructions, and values of bits in the X valid table corresponding to the call instructions are 0. When a return instruction is detected and an entry is made unnecessary, a bit corresponding to the entry is held in the X valid table to hold an order for shift-out at the time when the execution of the call instruction is completed.

It is assumed that the actual return address stack X includes only two entries because of limitation on cost or the like. In this return address stack X, an address of a return destination of a return instruction is pushed when a call instruction is detected, and a content of a latest entry is discarded by a pop operation when a return instruction is detected. When a call instruction is detected in a state in which all the entries are filled, a content of an oldest entry is pushed out and discarded.

In the example in FIG. 20, since three valid entries are present in the imaginary return address stack X but only two entries are present in the actual return address stack X, a content of an oldest entry is pushed out. However, since a record in the X valid table indicates that three entries should be originally present in the return address stack X, it is possible to prevent an address of a branch destination from being acquired by mistake from the return address stack as in the case of FIGS. 7 and 8 according to the second embodiment.

In the branch prediction system according to the present embodiment, when a return instruction is detected by the branch history, if a value of the call hit counter is 1 or more, the X valid table is checked. Then, if at least one bit having a value 1 is present among all the bits, a value of a highest bit with a value 1 is changed to 0, and a content of a latest entry in the actual return address stack X is acquired to set the content as a branch prediction result.

When address information has been discarded by push-out, all entries in the return address stack X may have been invalidated. In this case, since it is impossible to perform branch prediction using the return address stack X and the return address stack, a prediction result by the branch history is adopted as a branch prediction result.

If a bit having a value 1 is not present in the X valid table at all, since all the entries in the imaginary return address stack X have been used, an address of a return destination is acquired from the return address stack according to the return stack pointer.

As described above, in the branch prediction system according to the present embodiment, validity of the respective entries in the imaginary return address stack X is managed by the X valid table. Thus, even when the number of entries in the actual return address stack X is not enough, it is possible to perform branch prediction while keeping high accuracy.

Figure 21:
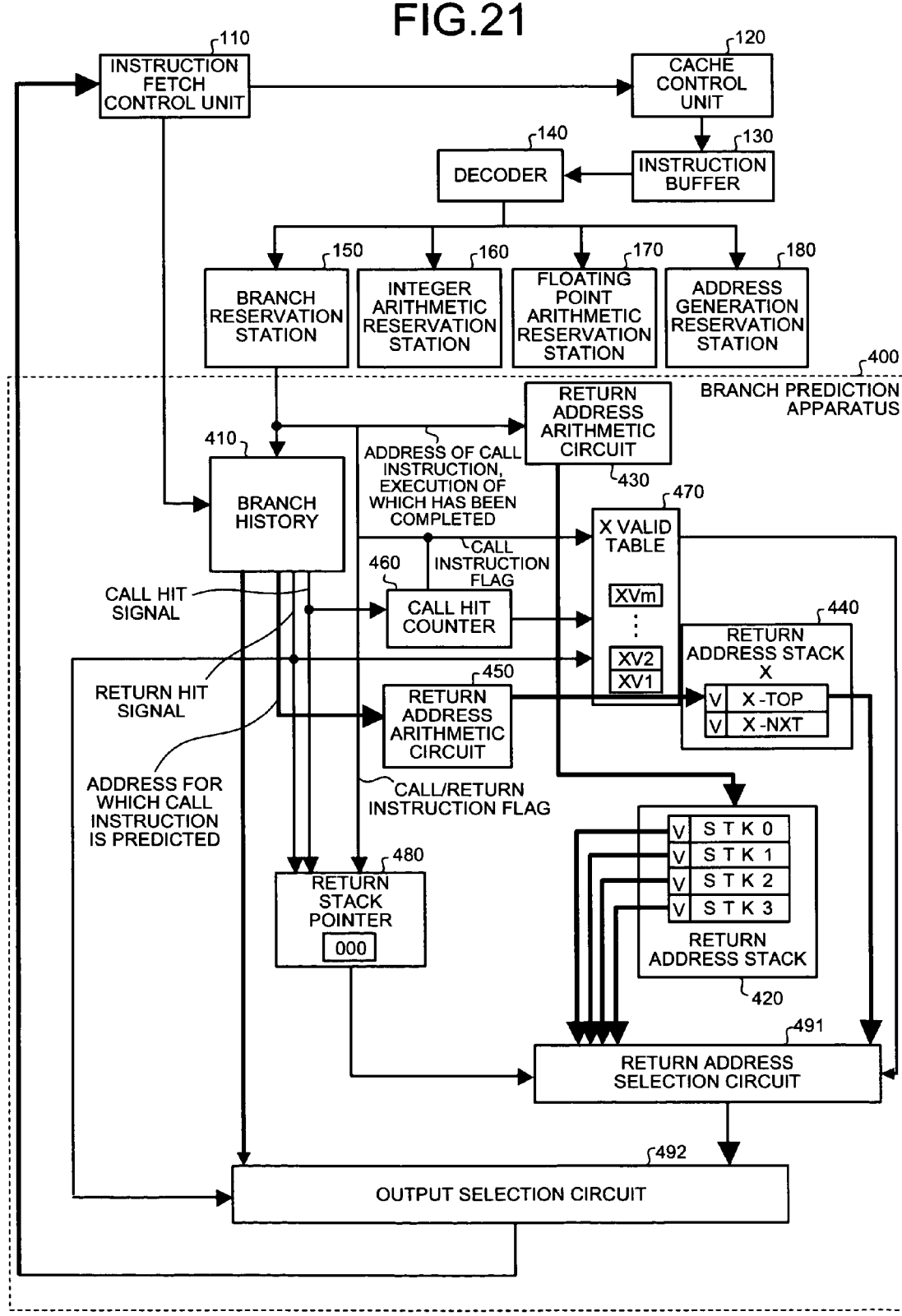
FIG. 21 is a block diagram of a structure of a branch predicting apparatus according to the present embodiment.

FIG. 21 is a block diagram of the structure of the branch predicting apparatus according to the present embodiment. Since components from the instruction fetch control unit 110 to the address generation reservation station are the same as those according to the first embodiment, explanations thereof are omitted.

A branch predicting apparatus 400 includes a branch history 410, a return address stack 420, a return address arithmetic circuit 430, a return address stack X 440, a return address arithmetic circuit 450, a call hit counter 460, an X valid table 470, a return stack pointer 480, a return address selection circuit 491, and an output selection circuit 492.

The branch history 410, the return address stack 420, the return address arithmetic circuit 430, the return address stack X 440, the return address arithmetic circuit 450, the return stack pointer 480, the return address selection circuit 491, and the output selection circuit 492 correspond to and have the same functions as the branch history 310, the return address stack 320, the return address arithmetic circuit 330, the return address stack X 340, the return address arithmetic circuit 350, the return stack pointer 380, the return address selection circuit 391, and the output selection circuit 392 according to the second embodiment, respectively.

The call hit counter 460 is a device that keeps information on an entry in the imaginary return address stack X corresponding to the X valid table 470 up to which address information is stacked. As shown in FIG. 10 according to the second embodiment, the call hit counter 460 has a latch of K bits sufficient for holding the number of imaginary entries and outputs a value held by this latch as a CALL_HIT_CTR signal. The latch is set to 0 at the time of initialization and incremented by one every time a call hit signal from the branch history 410 is turned ON and decremented by one every time a call instruction flag from the branch reservation station 150 is turned ON.

As shown in FIG. 11 according to the second embodiment, a CALL_HIT_CTR signal outputted from the call hit counter 460 is decoded by the decoder to turn ON one of CTR_EQ_0 to CTR_EQ_m signals. For example, if a value of the CALL_HIT_CTR signal is zero, CTR_EQ_0 is turned ON and, if the value is m, CTR_EQ_m is turned ON.

The X valid table 470 is a device that holds bits indicating validity of entries in the imaginary return address stack X corresponding thereto. Each bit of the X valid table 470 has an initial value 0. A value of the bit is set to 1 when a value is stored in an imaginary entry corresponding thereto and is reset to 0 when a return instruction is detected and a value of an imaginary entry corresponding thereto is used for prediction. In addition, a bit corresponding to an oldest imaginary entry is shifted out every time execution of the call instruction is completed.

Figure 22:
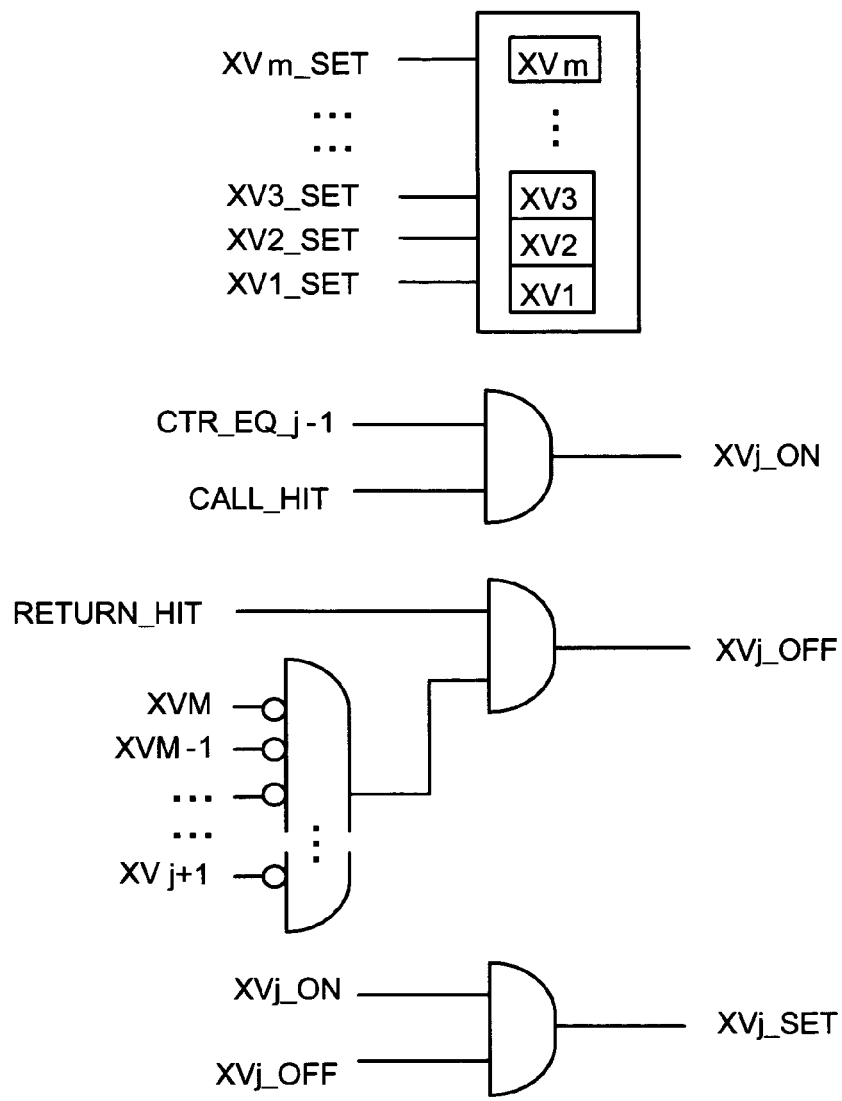
FIG. 22 is a logical circuit diagram of a circuit structure of an X valid table.

FIG. 22 is a logical circuit diagram of a circuit structure of the X valid table 470. As shown in the figure, the X valid table 470 holds information of m bits XV1 to XVm, and values of the respective bits are controlled by XV1_SET to XVm_SET signals. For example, the j-th bit XVj is controlled by an XVj_SET signal.

If a call hit signal from the branch history 410 is turned ON, this XVj_SET signal is turned ON when a value of the call hit counter 460 at that point is j-1 and changes a value of a bit corresponding thereto of the X valid table 470 to 1. In other words, when the call hit signal from the branch history 410 is turned ON, a value of a bit, which the call hit counter 460 indicates a new, is updated to 1.

If a return hit signal from the branch history 410 is turned ON, the XVj_SET signal is turned OFF when all bits with values in the call hit counter 460 at that point more significant than j have a value 0 and changes a value of a bit corresponding thereto of the X valid table 470 to a value 0. In other words, when the return hit signal from the branch history 410 is turned ON, a value of a most significant bit, which is 1 in the X valid table 470, is updated to 0.

In this way, the respective bits of the X valid table 470 take a value 1 only when a valid value is present in entries in the imaginary return stack X corresponding thereto and takes a value 0 in other cases.

Figure 23:
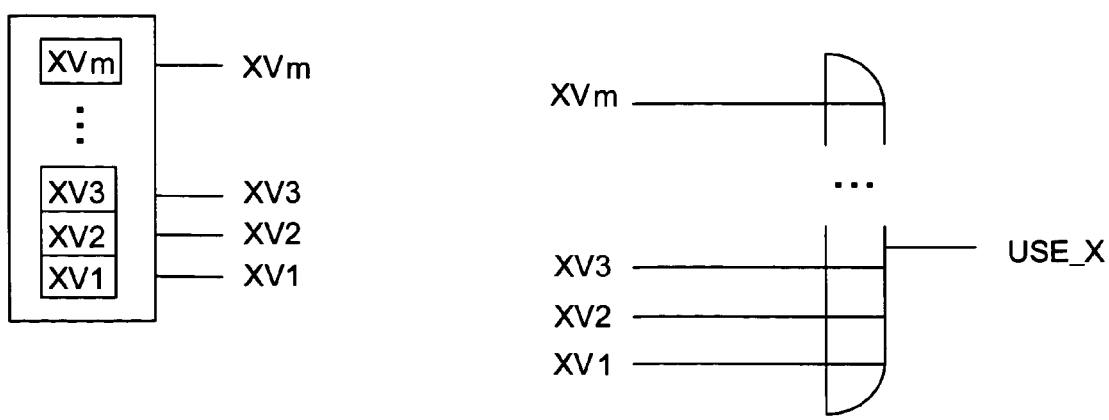
FIG. 23 is a logical circuit diagram of an output section of the X valid table.

FIG. 23 is a logical circuit diagram of an output section of the X valid table 470. As shown in the figure, a USE_X signal outputted from the X valid table 470 is turned ON when at least one bit, which takes a value 1, is present in all the bits of the X valid table 470. When a bit, which takes a value 1, is present in the X valid table 470, this means that a valid value is present in the entries in the imaginary return stack X.

Note that, when branch prediction fails, the return address stack 420, the return address stack X 440, the call hit counter 460, the X valid table 470, and the return stack point 480 are reset to an initial state.

Next, an operation of the branch predicting apparatus according to the present embodiment will be explained with a case in which the instruction stream in FIG. 6 according to the second embodiment is executed as an example. FIGS. 24A to 24I are explanatory diagrams for explaining the operation of the branch predicting apparatus according to the present embodiment. Note that, according to the present embodiment, it is assumed that all bits of the X valid table are set to a value 0 at the time of initialization.

Figure 24A:
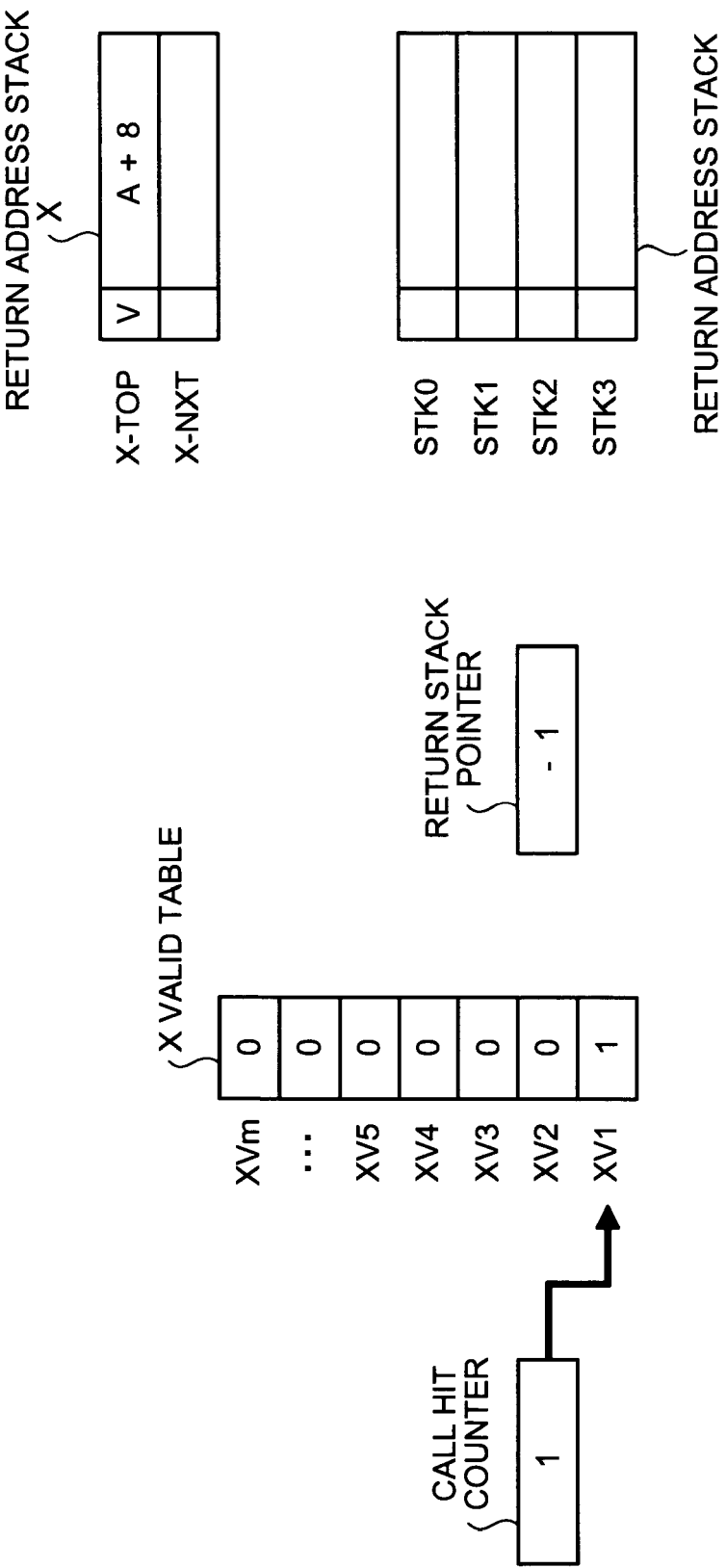
FIGS. 24A to 24I are explanatory diagrams for explaining an operation of the branch predicting apparatus according to the present embodiment.

FIG. 24A is a scene in which a call instruction is detected in the address A. A+8 is stored in X-TOP at the top of the return address stack X as an address of a return destination and a value of the return stack pointer is decremented by one to −1. In addition, a value of the call hit counter is incremented by one to 1, and a value 1 is set in XV1 of the X valid table indicated by the call hit counter.

Here, when it is assumed that a return instruction in the address C is detected by the branch history, since a bit with a value 1 is present in the X valid table, a value stored in X-TOP that is a valid latest entry in the return address stack X, that is, A+8 is acquired as a branch prediction result. A+8 is a correct address as a branch destination of the return instruction in the address C.

Figure 24B:
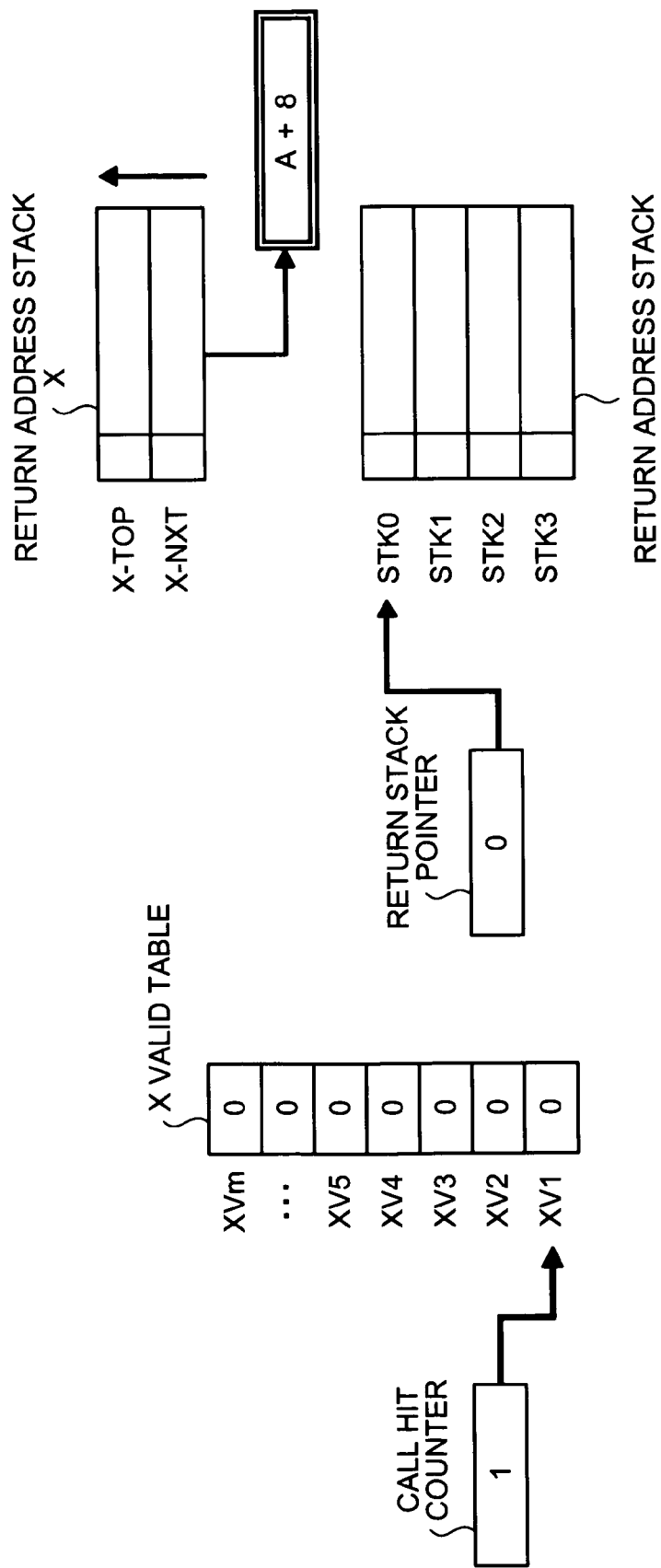

FIG. 24B shows a scene after the return instruction is detected in the address C. A pop operation is performed in the return address stack X according to the detection of the return instruction to discard information in X-TOP. In addition, the value of the return stack pointer is incremented by one to 0. In the X valid table, a value of a bit of XH1 indicated by the call hit counter changes to 1, and the X valid table stores the fact that an imaginary entry corresponding thereto has been used.

Figure 24C:
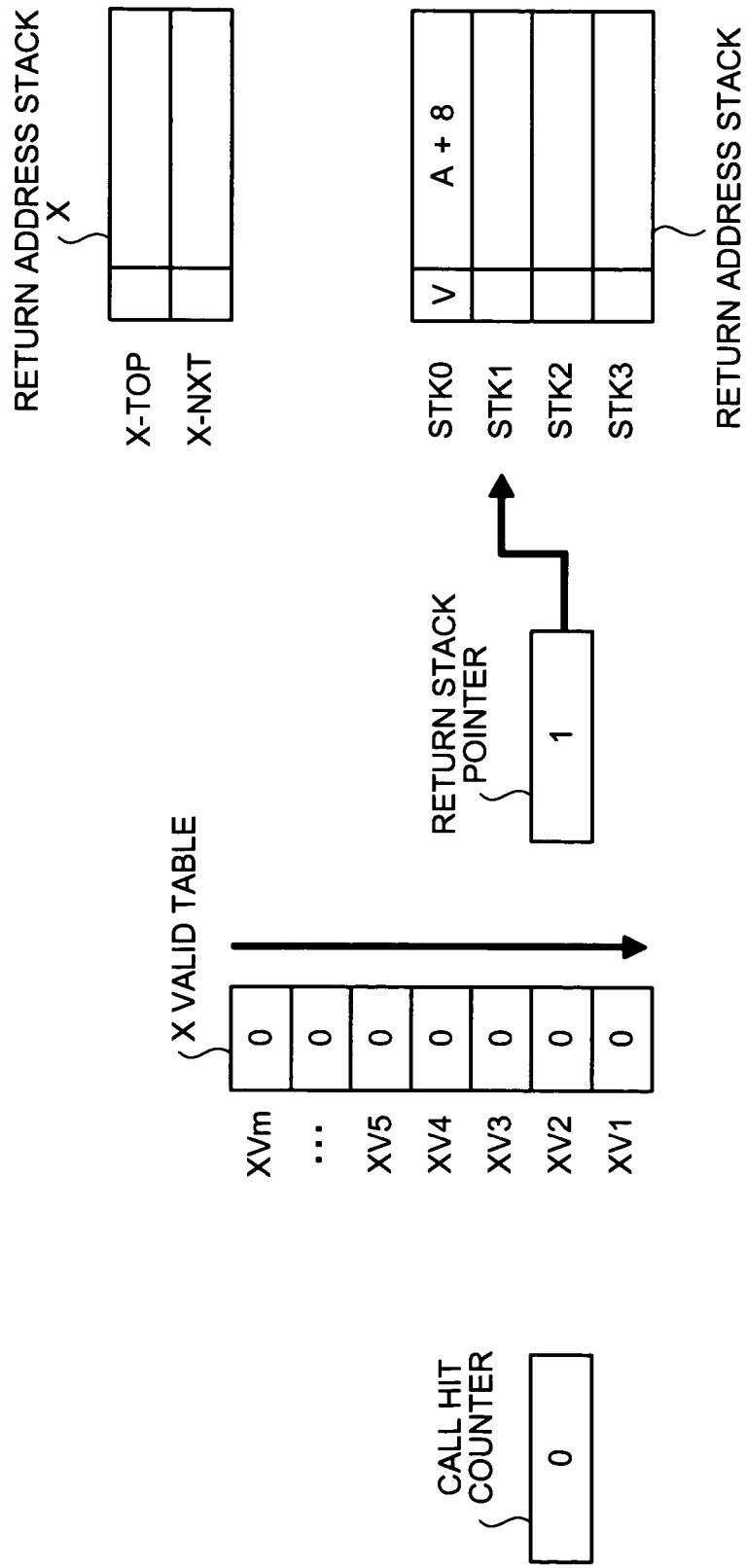

FIG. 24C shows a scene in which execution of the call instruction in the address A is subsequently completed. In response to the completion of the execution of the call instruction, the address A+8 of a return destination is stored in SKT0 at the top of the return address stack and the value of the return stack pointer is incremented by one to 1. In addition, the value of the call hit counter is decremented by one to 0. In the X valid table, a shift operation is performed to discard a least significant bit.

Figure 24D:
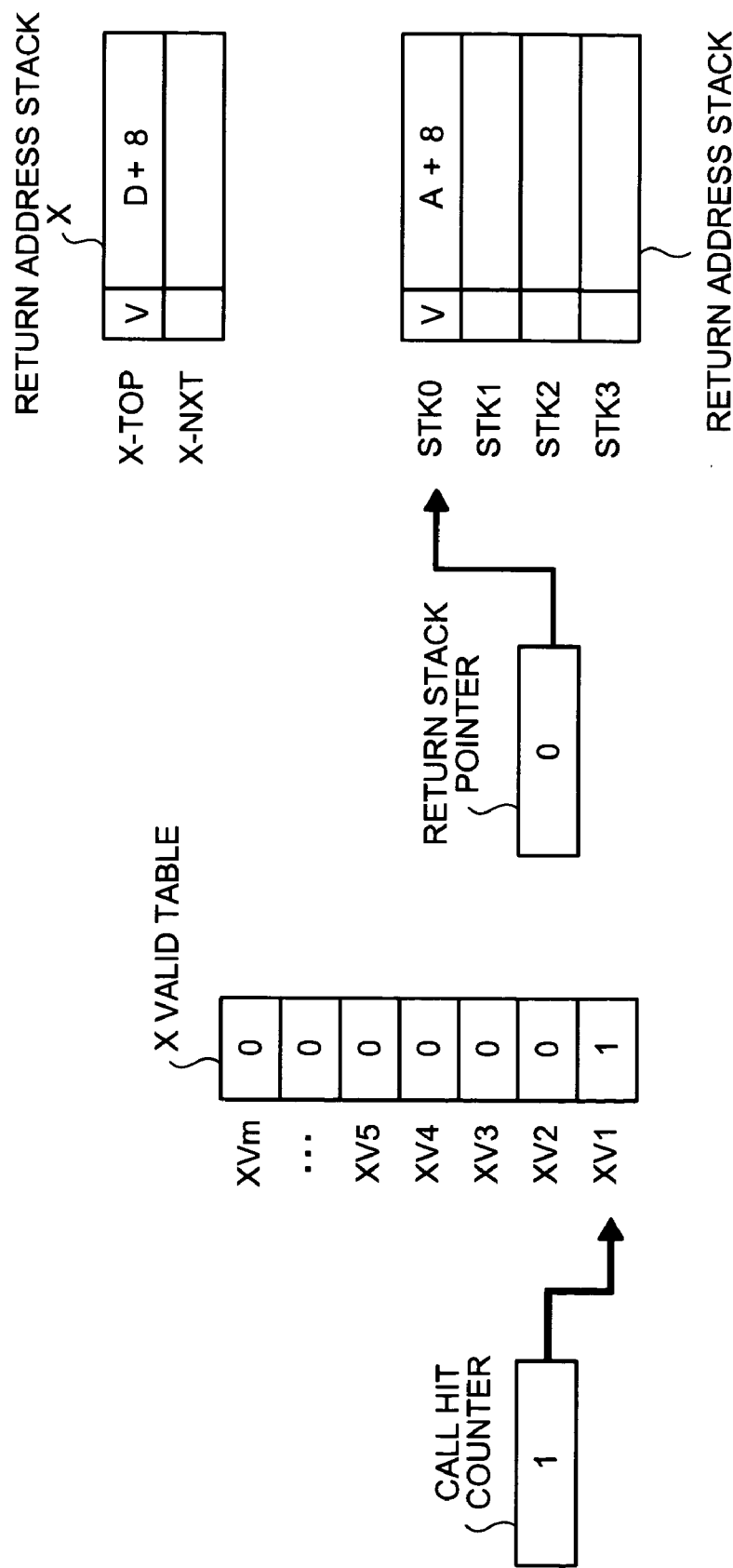

FIG. 24D shows a scene in which a call instruction is subsequently detected in the address D. In response to the detection of the call instruction, an address D+8 of a return destination is stored in X-TOP at the top of the return address stack X and the value of the return stack pointer is decremented by one to 0. In addition, the value of the call hit counter is incremented by one to 1, and a value 1 is set in XV1 of the X valid table indicated by the call hit counter.

Figure 24E:
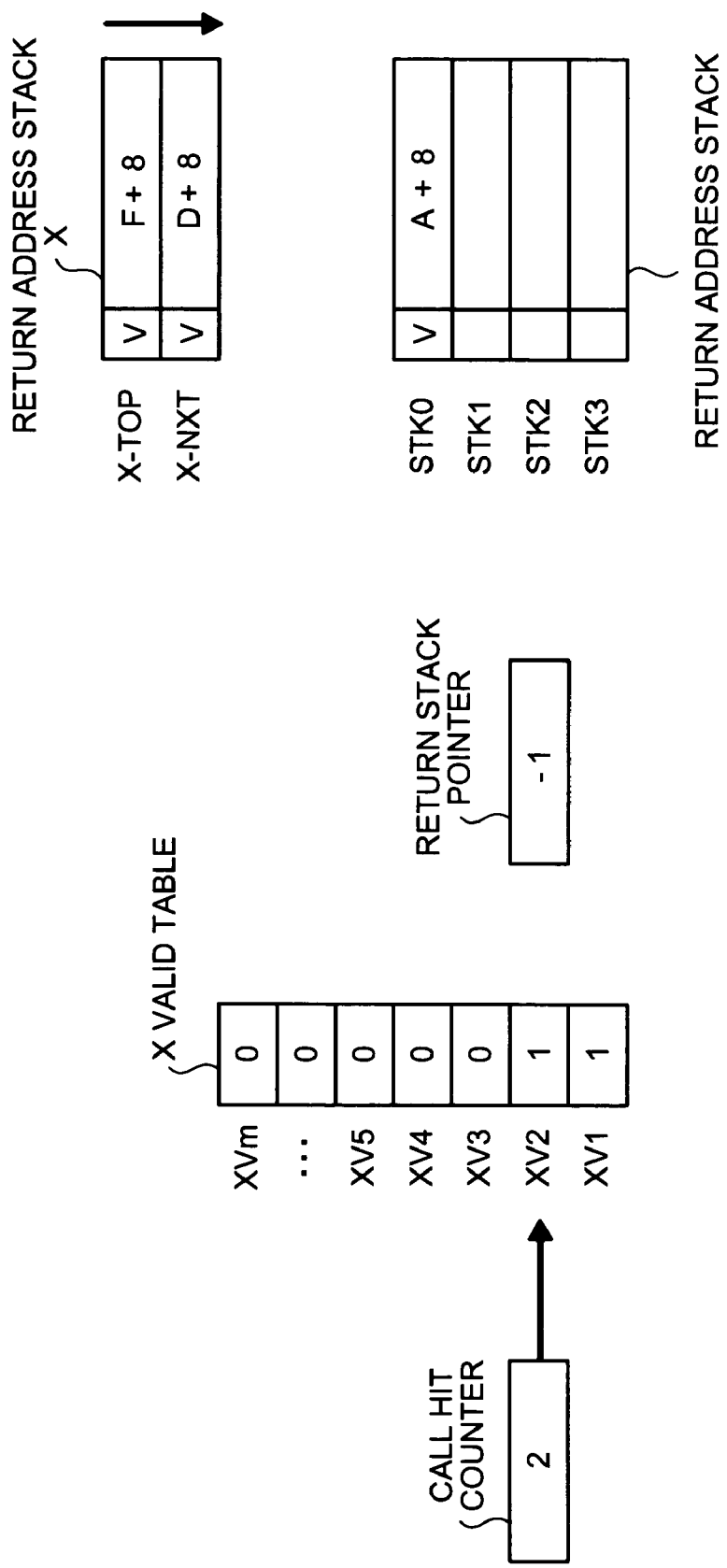

FIG. 24E shows a scene in which a call instruction is subsequently detected in the address F. In response to the detection of the call instruction, an address F+8 of a return destination is pushed to the return address stack X and the value of the return stack pointer is decremented by one to −1. In addition, the value of the call hit counter is incremented by one to 2, and a value 1 is set in XV2 of the X valid table indicated by the call hit counter.

Figure 24F:
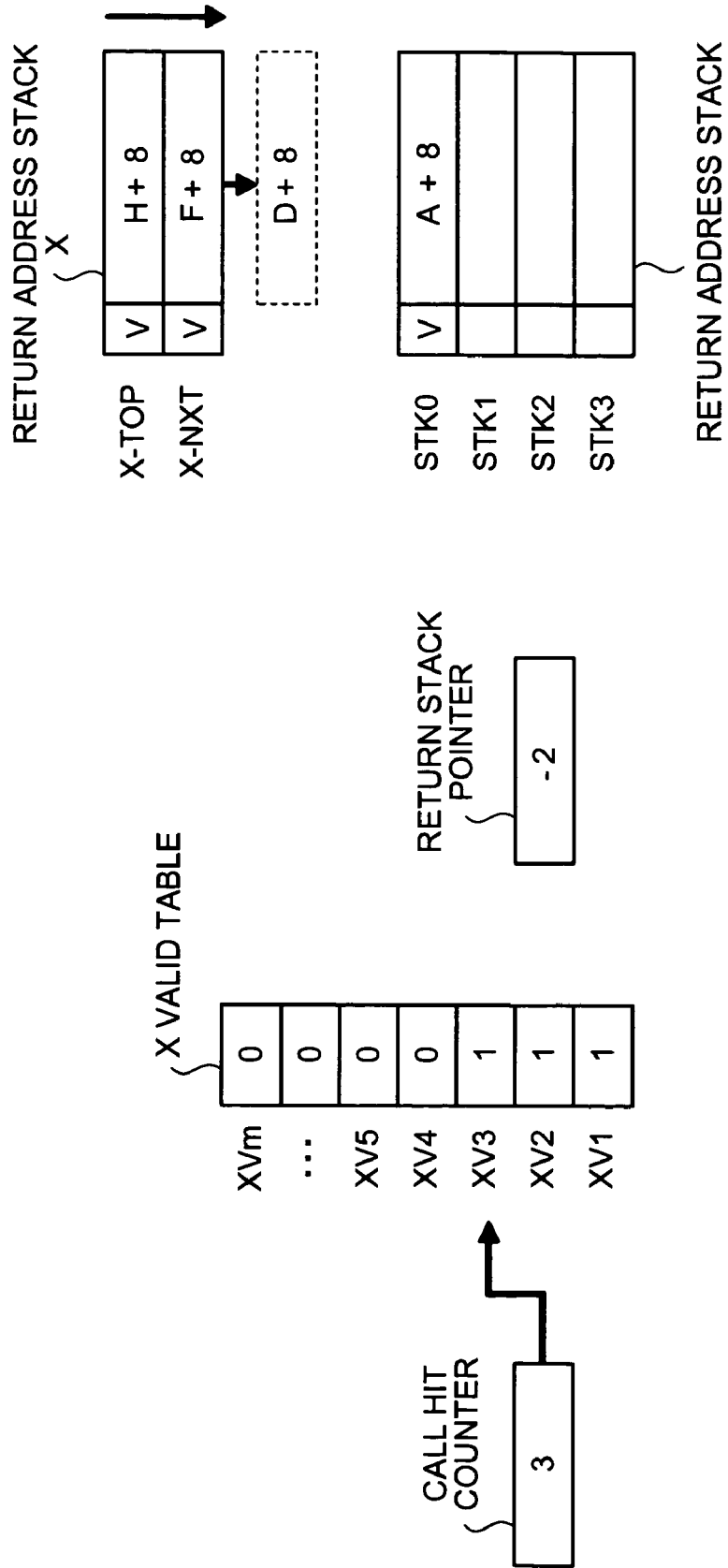

FIG. 24F shows a scene in which a call instruction is subsequently detected in the address H. In response to the detection of the call instruction, an address H+8 of a return destination is pushed to the return address stack X. However, since both two entries have already been filled, old information D+8 is pushed out and disappears. In this way, in the return address stack X, H+8 is stored in X-TOP and F+8 is stored in X-NXT. In addition, the value of the return stack pointer is decremented by one to −2 and the value of the call hit counter is incremented by one to 3, and a value 1 is set in XV3 of the X valid table indicated by the call hit counter.

Here, when it is assumed that a return instruction in the address J is detected by the branch history, since a bit with a value 1 is present in the X valid table, a value stored in X-TOP that is a valid latest entry in the return address stack X, that is, H+8 is acquired as a branch prediction result. H+8 is a correct address as an address of a branch destination of the return instruction in the address J.

Figure 24G:
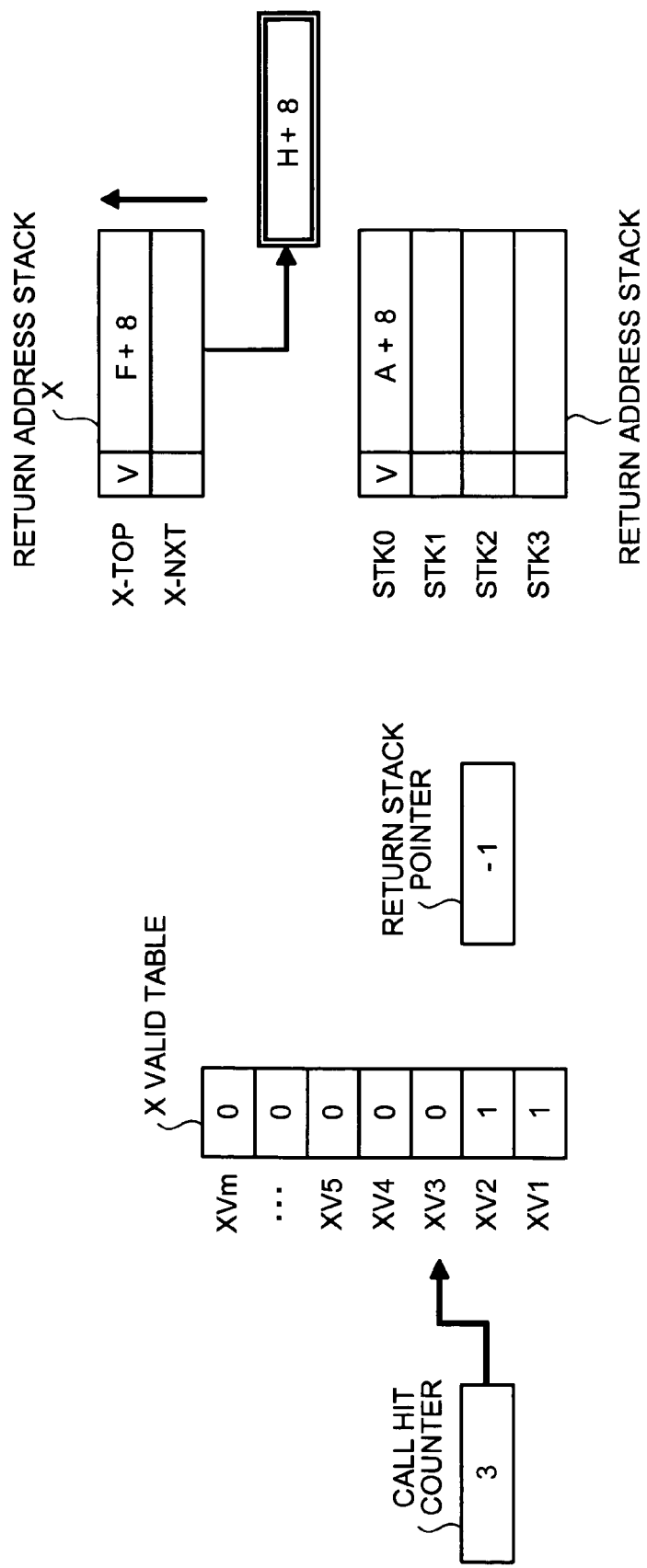

FIG. 24G shows a scene after the return instruction is detected in the address J. A pop operation is performed in the return address stack X according to the detection of the return instruction and information in X-NXT is moved to X-TOP. In addition, the value of the return stack pointer is incremented by one to −1. In the X valid table, a value 1 of a most significant bit XV3 changes to 0, and the X valid table stores the fact that an imaginary entry corresponding thereto has been used.

Here, when it is assumed that a return instruction in the address K is detected by the branch history, since a bit with a value 1 is present in the X valid table, a value stored in X-TOP that is a valid latest entry in the return address stack X, that is, F+8 is acquired as a branch prediction result. F+8 is a correct address as an address of a branch destination of the return instruction in the address K.

Figure 24H:
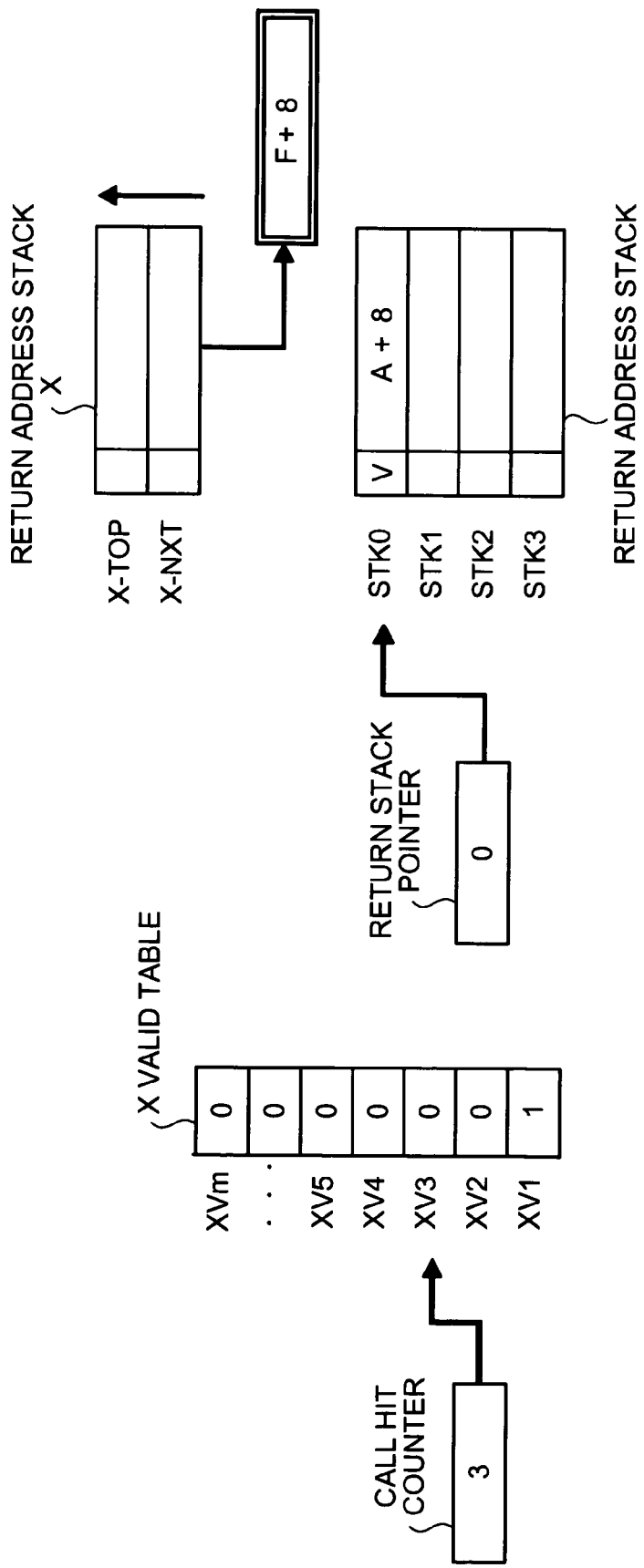

FIG. 24H shows a scene after the return instruction is detected in the address K. A pop operation is performed in the return address stack X according to the detection of the return instruction to discard information in X-TOP. In addition, the value of the return stack pointer is incremented by one to 0. In the X valid table, a value 1 of a most significant bit XV2 changes to 0, and the X valid table stores the fact that an imaginary entry corresponding thereto has been used.

Here, when it is assumed that a return instruction in the address L is detected by the branch history, since a bit with a value 1 is present in the X valid table, it is attempted to acquire address information from X-TOP that is a latest entry in the return address stack X. However, since information is not present in X-TOP already, address information cannot be acquired. In this case, since a correct address of a branch destination cannot be acquired even if address information is acquired from the return address stack, a predicted value of the branch history is adopted as a prediction result.

If the branch history can predict a correct address, branch prediction will be successful. Whereas branch prediction always fails in the scene in FIG. 7H according to the second embodiment that shows the same instruction execution state, in the branch prediction system according to the present embodiment, it is possible to significantly improve accuracy of branch prediction by performing branch prediction using the branch history.

Figure 24I:
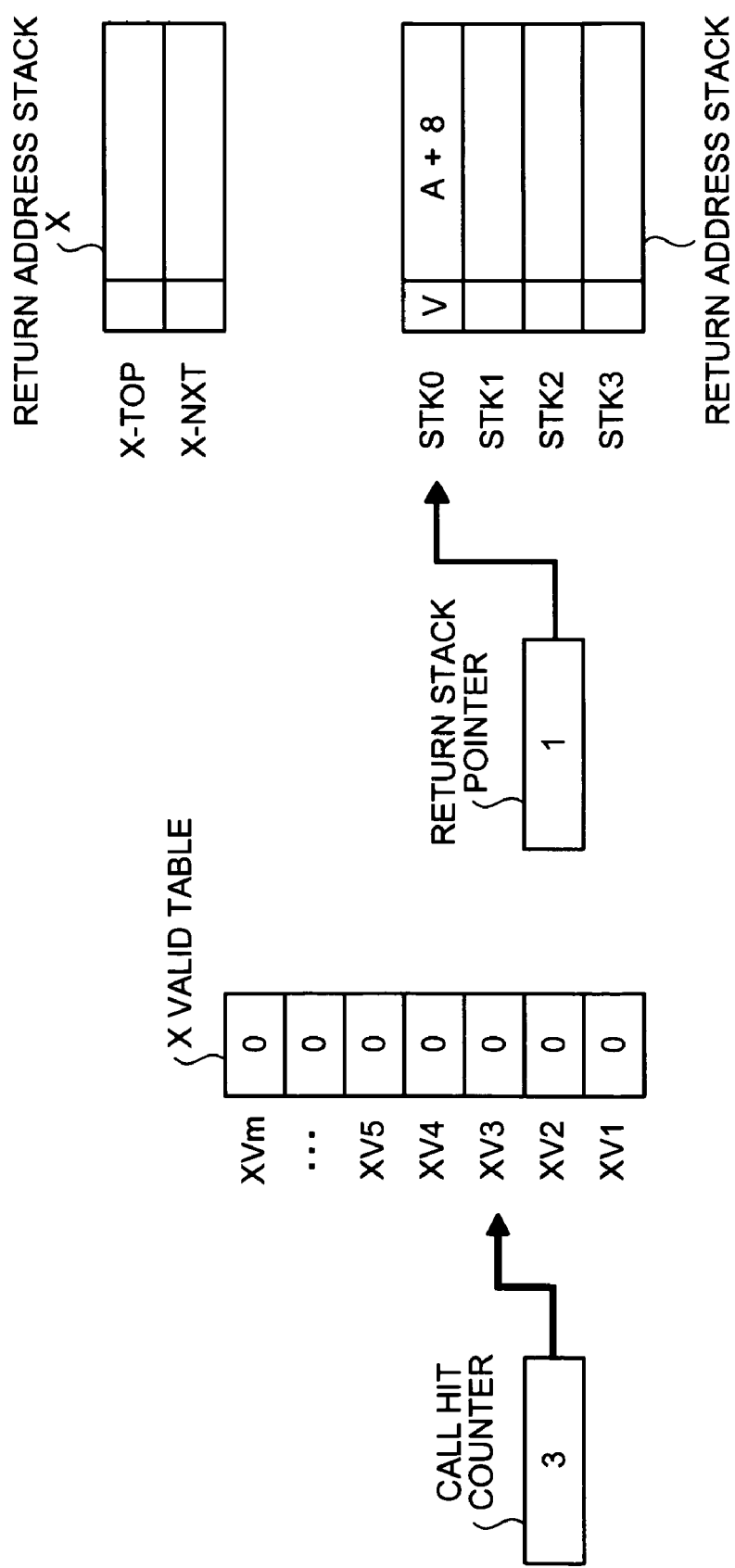

FIG. 24I shows a scene after the return instruction is detected in the address L. A pop operation is performed in the return address stack X according to the detection of the return instruction. In addition, the value of the return stack pointer is incremented by one to 1. In the X valid table, a value 1 of a most significant bit XV1 is changes to 0, and the X valid table stores the fact that all the imaginary entries have been used.

Note that, although not explained here, as in the case of the second embodiment, if execution of a call instruction is completed promptly, accuracy of branch prediction by the branch prediction system according to the present embodiment is further improved.

As described above, according to the third embodiment, validity of entries in the imaginary return address stack X is managed by the management table consisting of a small number of bits. Thus, it is possible to perform branch prediction highly accurately while holding down the number of entries in the actual return address stack X.

As it is seen if FIGS. 12 and 22 are compared, the branch prediction system according to the present embodiment can realize advantages, which are the same as those explained according to the second embodiment, with a more simple mechanism.

Note that, in the explanation according to the present embodiment, bits in the X valid table are used in order from a least significant bit. However, the bits do not have to be used in this way. For example, it is also possible to use the bits in order from a most significant bit and to use the bits like a stack. In addition, it is also possible to reverse ON/OFF of bits from that according to the present embodiment.

According to the present invention, when a valid entry is present in the second return address stack, an address of a branch destination is acquired from the second return address stack regardless of a value of the return stack pointer. Thus, there is an effect that it is possible to acquire address information stored in the first return address stack and the second return address stack in an appropriate order to perform highly accurate branch prediction.

Furthermore, according to the present invention, when plural valid entries are present in the second return address stack, valid address information stored last in the second return address stack is acquired. Thus, there is an effect that it is possible to perform highly accurate branch prediction even when there are plural call instructions that have been detected by the branch history but execution of which has not been completed.

Moreover, according to the present invention, an address of a branch destination is acquired from the first return address stack when valid address information is not stored in the second return address stack. Thus, there is an effect that it is possible to acquire address information stored in the first return address stack and the second return address stack in an appropriate order to perform highly accurate branch prediction.

Furthermore, according to the present invention, a prediction result of the branch history is used when valid address information is not stored in the first and the second return address stacks. Thus, there is an effect that it is possible to acquire address information stored in the first return address stack and the second return address stack and information of the branch history in an appropriate order to perform highly accurate branch prediction.

Moreover, according to the present invention, validity of an entry in an imaginary second return address stack is managed by the call-instruction-state holding unit. Thus, there is an effect that it is possible to perform branch prediction highly accurately while holding down the number of entries in an actual second return address stack.

Furthermore, according to the present invention, the number of call instructions, information on which is held by the call-instruction-state holding unit, is held in the counter. Thus, there is an effect that it is possible to simplify a mechanism of the call-instruction-state holding unit.

Moreover, according to the present invention, it is judged whether valid address information is stored in the second return address stack based on information stored in the call-instruction-state holding unit. Thus, there is an effect that it is possible to acquire address information stored in the first return address stack and the second return address stack and information of the branch history in an appropriate order to perform highly accurate branch prediction.

Furthermore, according to the present invention, validity of an entry in the imaginary second return address stack is managed by a management table consisting of a small number of bits. Thus, there is an effect that it is possible to perform branch prediction highly accurately while reducing the number of entries in the actual second return address stack to control an increase in cost.

Moreover, according to the present invention, various kinds of information for branch prediction are initialized when the branch prediction fails such that the branch prediction is not continued based on wrong information. Thus, there is an effect that it is possible to perform branch prediction highly accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A branch predicting apparatus that performs a branch prediction in a pipeline processor, the branch predicting apparatus comprising:
a branch history that stores execution history information of branch instructions including a call instruction and a return instruction, and searches through the execution history information to predict presence of a branch instruction and a branch destination corresponding to the branch instruction;
a first return address stack that stores, when an execution of a call instruction of a subroutine is completed, address information of a return destination of a return instruction corresponding to the call instruction;

a second return address stack that stores, when presence of a call instruction of a subroutine is predicted by the branch history, address information of a return destination of a return instruction corresponding to the call instruction; and an output selecting unit that selects, when presence of a return instruction is predicted by the branch history, if address information is stored in the second return address stack, the address information stored in the second return address stack as a result of the branch prediction, and outputs the address information selected, wherein the second return address stack expels an oldest piece of address information when an execution of any one of the call instructions is completed.

2. The branch predicting apparatus according to claim 1, wherein when the branch prediction fails, all contents of the second address stack are erased.

3. The branch predicting apparatus according to claim 1, wherein when the presence of the return instruction is predicted by the branch history, if a plurality of pieces of address information are stored in the second return address stack, the output selecting unit selects valid address information stored in the second return address stack last, as the result of the branch prediction, and outputs the valid address information selected.

4. The branch predicting apparatus according to claim 1, wherein when the presence of the return instruction is predicted by the branch history, if the address information is not stored in the second return address stack, the output selecting unit selects the address information stored in the first return address stack, as the result of the branch prediction, and outputs the address information selected.

5. The branch predicting apparatus according to claim 1, wherein when the presence of the return instruction is predicted by the branch history, if the address information is stored in neither of the first return address stack and the second return address stack, the output selecting unit selects a prediction result of the branch history as the result of the branch prediction, and outputs the prediction result selected.

6. The branch predicting apparatus according to claim 1, further comprising a call-instruction-state holding unit that holds a state of a call instruction including information on whether an execution of the call instruction, of which the presence is predicted by the branch history, is completed, and information on whether a branch prediction of a return instruction corresponding to the call instruction is completed.

7. The branch predicting apparatus according to claim 6, wherein when the branch prediction fails, all contents of the call-instruction-state holding unit are erased.

8. The branch predicting apparatus according to claim 6, further comprising a counter that holds number of call instructions for which the call-instruction-state holding unit holds the state.

9. The branch predicting apparatus according to claim 8, wherein when the branch prediction fails, all contents of the counter are erased.

10. The branch predicting apparatus according to claim 6, wherein when the presence of the return instruction is predicted by the branch history, if it is found by the call-instruction-state holding unit that a call instruction, of which the presence is predicted by the branch history but an execution is not completed, and that a branch prediction of a corresponding return instruction is not completed, is present, the output selecting unit selects the address information stored in the second return address stack as the result of the branch prediction, and outputs the address information selected.

11. The branch predicting apparatus according to claim 10, wherein when the presence of the return instruction is predicted by the branch history, if it is found by the call-instruction-state holding unit that a call instruction, of which the presence is predicted by the branch history but an execution is not completed, and that a branch prediction of a corresponding return instruction is not completed, is present, and if the address information is not stored in the second return address stack, the output selecting unit selects a prediction result of the branch history as the result of the branch prediction, and outputs the prediction result selected.

12. The branch predicting apparatus according to claim 6, wherein when the presence of the return instruction is predicted by the branch history, if it is found by the call-instruction-state holding unit that a call instruction, of which the presence is predicted by the branch history but an execution is not completed, and that a branch prediction of a corresponding return instruction is not completed, is not present, the output selecting unit selects the address information stored in the first return address stack as the result of the branch prediction, and outputs the address information selected.

13. The branch predicting apparatus according to claim 12, wherein when the presence of the return instruction is predicted by the branch history, if it is found by the call-instruction-state holding unit that a call instruction, of which the presence is predicted by the branch history but an execution is not completed, and that a branch prediction of a corresponding return instruction is not completed, is not present, and if the address information is not stored in the first return address stack, the output selecting unit selects a prediction result of the branch history as the result of the branch prediction, and outputs the prediction result selected.

14. The branch predicting apparatus according to claim 6, wherein the call-instruction-state holding unit holds the state of the call instruction, of which the presence is predicted by the branch history, by switching a bit on and off for each instruction.

15. The branch predicting apparatus according to claim 14, wherein when the presence of the call instruction is predicted by the branch history, the call-instruction-state holding unit adds one bit that is an object of management, and sets a value of the bit to "0", when the presence of the return instruction is predicted by the branch history, the call-instruction-state holding unit changes a value of a latest bit having a value "0" to "1" from among the bits that are objects of management, and when an execution of any one of the call instructions is completed, the call-instruction-state holding unit removes an oldest bit from the objects of management.

16. The branch predicting apparatus according to claim 14, wherein when the presence of the call instruction is predicted by the branch history, the call-instruction-state holding unit adds one bit that is an object of management, and sets a value of the bit to "1", when the presence of the return instruction is predicted by the branch history, the call-instruction-state holding unit changes a value of a latest bit having a value "1" to "0" from among the bits that are objects of management, and when an execution of any one of the call instructions is completed, the call-instruction-state holding unit removes an oldest bit from the objects of management.

17. The branch predicting apparatus according to claim 14, wherein
the call-instruction-state holding unit sets values of all bits possessed to "0" at a time of initialization,
when the presence of the call instruction is predicted by the branch history, the call-instruction-state holding unit adds one bit that is an object of management, and sets a value of the bit to "1",
when the presence of the return instruction is predicted by the branch history, the call-instruction-state holding unit changes a latest bit having a value "1" to "0" from among the whole bits, and
when an execution of any one of the call instructions is completed, the call-instruction-state holding unit removes an oldest bit from the objects of management.

18. The branch predicting apparatus according to claim 14, wherein
the call-instruction-state holding unit sets values of all bits possessed to "1", at a time of initialization,
when the presence of the call instruction is predicted by the branch history, the call-instruction-state holding unit adds one bit that is an object of management, and sets a value of the bit to "0",
when the presence of the return instruction is predicted by the branch history, the call-instruction-state holding unit changes a latest bit having a value "0" to "1" from among the whole bits, and
when an execution of any one of the call instructions is completed, the call-instruction-state holding unit removes an oldest bit from the objects of management.

19. A branch predicting method of performing a branch prediction in a pipeline processor, the branch predicting method comprising:
predicting presence of a branch instruction and a branch destination corresponding to the branch instruction using a branch history that stores execution history information of branch instructions including a call instruction and a return instruction;
a first storing including storing, when presence of a call instruction of a subroutine is predicted at the predicting, address information of a return destination of a return instruction corresponding to the call instruction in a storing unit;
a second storing including storing, when an execution of a call instruction of a subroutine is completed, address information of a return destination of a return instruction corresponding to the call instruction in the storing unit;
an output selecting including:
selecting, when presence of a return instruction is predicted at the predicting, if the address information is stored at the second storing, the address information stored at the first storing as a result of the branch prediction, and
outputting the address information; and
expelling an oldest piece of address information from the second return address stack when an execution of any one of the call instructions is completed.

* * * * *

UNITED STATES PATENT AND TRADEMARK OFFICE
CERTIFICATE OF CORRECTION

PATENT NO. : 7,320,066 B2  Page 1 of 1
APPLICATION NO. : 11/065712
DATED : January 15, 2008
INVENTOR(S) : Megumi Yokoi It is certified that error appears in the above-identified patent and that said Letters Patent is hereby corrected as shown below:

Column 30, line 26, after "outputting the address information" insert --selected--.

Signed and Sealed this

Tenth Day of June, 2008

JON W. DUDAS
*Director of the United States Patent and Trademark Office*